United States Patent
Winterbottom et al.

(10) Patent No.: US 12,259,575 B2
(45) Date of Patent: *Mar. 25, 2025

(54) CLOCK SIGNAL DISTRIBUTION USING PHOTONIC FABRIC

(71) Applicant: Celestial AI Inc., Santa Clara, CA (US)

(72) Inventors: Philip Winterbottom, Santa Clara, CA (US); Martinus Bos, San Jose, CA (US); Jason Rupert Redgrave, Mountain View, CA (US)

(73) Assignee: Celestial AI Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,708

(22) Filed: Feb. 28, 2024

(65) Prior Publication Data
US 2024/0201437 A1 Jun. 20, 2024

Related U.S. Application Data

(63) Continuation of application No. 17/807,699, filed on Jun. 17, 2022.
(Continued)

(51) Int. Cl.
| G02B 6/12 | (2006.01) |
| G02B 6/30 | (2006.01) |
| G02B 6/43 | (2006.01) |
| G06F 7/50 | (2006.01) |
| G06F 7/53 | (2006.01) |

(Continued)

(52) U.S. Cl.
CPC ..... *G02B 6/12004* (2013.01); *G02B 6/12002* (2013.01); *G02B 6/30* (2013.01); *G02B 6/43* (2013.01); *G06F 7/50* (2013.01); *G06F 7/5318* (2013.01); *G06F 7/5443* (2013.01); *G06N 3/04* (2013.01); *G06N 3/067* (2013.01); *G06N 3/0675* (2013.01)

(58) Field of Classification Search
CPC ........ H04J 3/0641; H04J 3/0644; G02B 6/12; G02B 6/12002; G02B 6/30; G02B 6/34; G02B 6/43; G06F 7/50; G06F 7/5318; G06F 7/5443; G06N 3/04; G06N 3/067; G06N 3/0675; G06N 3/045; G06N 3/048
See application file for complete search history.

(56) References Cited

U.S. PATENT DOCUMENTS

| 4,912,706 A * | 3/1990 | Eisenberg .......... H04Q 11/0001 398/55 |
| 4,934,775 A | 6/1990 | Koai |

(Continued)

FOREIGN PATENT DOCUMENTS

| AU | 2019100030 A | 2/2019 |
| AU | 2019100679 A | 8/2019 |

(Continued)

OTHER PUBLICATIONS

U.S. Appl. No. 63/049,928, filed Jul. 9, 2020, Pleros et al.
(Continued)

*Primary Examiner* — Michael P Mooney
(74) *Attorney, Agent, or Firm* — RAY QUINNEY & NEBEKER; James S. Bullough

(57) ABSTRACT

Various embodiments provide for clock signal distribution within a processor, such as a machine learning (ML) processor, using a photonic fabric.

20 Claims, 21 Drawing Sheets

Related U.S. Application Data

(60) Provisional application No. 63/212,353, filed on Jun. 18, 2021.

(51) Int. Cl.
  *G06F 7/544* (2006.01)
  *G06N 3/04* (2023.01)
  *G06N 3/067* (2006.01)

(56) References Cited

U.S. PATENT DOCUMENTS

| | | |
|---|---|---|
| 5,457,563 A | 10/1995 | Van Deventer |
| 6,249,621 B1 | 6/2001 | Sargent et al. |
| 6,714,552 B1 | 3/2004 | Cotter |
| 7,034,641 B1 | 4/2006 | Clarke et al. |
| 7,778,501 B2 | 8/2010 | Beausoleil et al. |
| 7,889,996 B2 | 2/2011 | Zheng et al. |
| 7,894,699 B2 | 2/2011 | Beausoleil |
| 7,961,990 B2 | 6/2011 | Krishnamoorthy et al. |
| 8,064,739 B2 | 11/2011 | Binkert et al. |
| 8,213,751 B1 | 7/2012 | Ho et al. |
| 8,260,147 B2 | 9/2012 | Scandurra et al. |
| 8,285,140 B2 | 10/2012 | McCracken et al. |
| 8,326,148 B2 | 12/2012 | Bergman et al. |
| 8,340,517 B2 | 12/2012 | Shacham et al. |
| 8,447,146 B2 | 5/2013 | Beausoleil et al. |
| 8,611,747 B1 | 12/2013 | Wach |
| 9,036,482 B2 | 5/2015 | Lea |
| 9,369,784 B2 | 6/2016 | Zid et al. |
| 9,495,295 B1 | 11/2016 | Dutt et al. |
| 9,791,761 B1 | 9/2017 | Li et al. |
| 9,831,360 B2 | 11/2017 | Knights et al. |
| 9,882,655 B2 | 1/2018 | Li et al. |
| 10,031,287 B1 | 7/2018 | Heroux et al. |
| 10,107,959 B2 | 10/2018 | Heroux et al. |
| 10,117,007 B2 | 10/2018 | Song et al. |
| 10,185,085 B2 | 1/2019 | Huangfu et al. |
| 10,225,632 B1 | 3/2019 | Dupuis et al. |
| 10,250,958 B2 | 4/2019 | Chen et al. |
| 10,281,747 B2 | 5/2019 | Padmaraju et al. |
| 10,365,445 B2 | 7/2019 | Badihi et al. |
| 10,564,512 B2 | 2/2020 | Sun et al. |
| 10,598,852 B1 | 3/2020 | Zhao et al. |
| 10,651,933 B1 | 5/2020 | Chiang et al. |
| 10,837,827 B2 | 11/2020 | Nahmias et al. |
| 10,908,369 B1 | 2/2021 | Mahdi et al. |
| 10,915,297 B1 | 2/2021 | Halutz et al. |
| 10,935,722 B1 | 3/2021 | Li et al. |
| 10,951,325 B1 | 3/2021 | Rathinasamy et al. |
| 10,962,728 B2 | 3/2021 | Nelson et al. |
| 10,976,491 B2 | 4/2021 | Coolbaugh et al. |
| 11,107,770 B1 | 8/2021 | Ramalingam et al. |
| 11,165,509 B1 | 11/2021 | Nagarajan et al. |
| 11,165,711 B2 | 11/2021 | Mehrvar et al. |
| 11,233,580 B2 | 1/2022 | Meade et al. |
| 11,321,092 B1 | 5/2022 | Raikin et al. |
| 11,336,376 B1 | 5/2022 | Xie |
| 11,493,714 B1 | 11/2022 | Mendoza et al. |
| 11,500,153 B2 | 11/2022 | Meade et al. |
| 11,509,397 B2 | 11/2022 | Ma et al. |
| 11,769,710 B2 | 9/2023 | Refai-Ahmed et al. |
| 11,817,903 B2 | 11/2023 | Pleros et al. |
| 2004/0213229 A1 | 10/2004 | Chang et al. |
| 2006/0159387 A1 | 7/2006 | Handelman |
| 2006/0204247 A1 | 9/2006 | Murphy |
| 2011/0206379 A1 | 8/2011 | Budd |
| 2012/0020663 A1 | 1/2012 | McLaren |
| 2012/0251116 A1 | 10/2012 | Li et al. |
| 2013/0275703 A1 | 10/2013 | Schenfeld |
| 2013/0308942 A1 | 11/2013 | Ji et al. |
| 2015/0109024 A1 | 4/2015 | Abdelfattah et al. |
| 2015/0354938 A1 | 12/2015 | Mower et al. |
| 2016/0116688 A1 | 4/2016 | Hochberg et al. |
| 2016/0131862 A1 | 5/2016 | Rickman et al. |
| 2016/0344507 A1 | 11/2016 | Marquardt et al. |
| 2017/0045697 A1 | 2/2017 | Hochberg et al. |
| 2017/0194309 A1 | 7/2017 | Evans et al. |
| 2017/0194310 A1 | 7/2017 | Evans et al. |
| 2017/0207600 A1 | 7/2017 | Klamkin et al. |
| 2017/0220352 A1 | 8/2017 | Woo et al. |
| 2017/0261708 A1 | 9/2017 | Ding et al. |
| 2017/0285372 A1 | 10/2017 | Baba et al. |
| 2018/0107030 A1 | 4/2018 | Morton et al. |
| 2018/0260703 A1 | 9/2018 | Soljacic et al. |
| 2019/0026225 A1 | 1/2019 | Gu et al. |
| 2019/0049665 A1 | 2/2019 | Ma et al. |
| 2019/0205737 A1 | 7/2019 | Bleiweiss et al. |
| 2019/0265408 A1 | 8/2019 | Ji et al. |
| 2019/0266088 A1 | 8/2019 | Kumar |
| 2019/0266089 A1 | 8/2019 | Kumar |
| 2019/0294199 A1 | 9/2019 | Carolan et al. |
| 2019/0317285 A1 | 10/2019 | Liff |
| 2019/0317287 A1 | 10/2019 | Raghunathan et al. |
| 2019/0356394 A1 | 11/2019 | Bunandar et al. |
| 2019/0372589 A1 | 12/2019 | Gould |
| 2019/0385997 A1 | 12/2019 | Choi et al. |
| 2020/0006304 A1 | 1/2020 | Chang et al. |
| 2020/0125716 A1 | 4/2020 | Chittamuru et al. |
| 2020/0142441 A1 | 5/2020 | Bunandar et al. |
| 2020/0158967 A1 | 5/2020 | Winzer et al. |
| 2020/0174707 A1 | 6/2020 | Johnson et al. |
| 2020/0200987 A1 | 6/2020 | Kim |
| 2020/0213028 A1 | 7/2020 | Behringer et al. |
| 2020/0250532 A1 | 8/2020 | Shen et al. |
| 2020/0284981 A1 | 9/2020 | Harris et al. |
| 2020/0310761 A1 | 10/2020 | Rossi et al. |
| 2020/0409001 A1 | 12/2020 | Liang et al. |
| 2020/0410330 A1 | 12/2020 | Liu et al. |
| 2021/0036783 A1 | 2/2021 | Bunandar et al. |
| 2021/0064958 A1 | 3/2021 | Lin et al. |
| 2021/0072784 A1 | 3/2021 | Lin et al. |
| 2021/0116637 A1 | 4/2021 | Li et al. |
| 2021/0132309 A1 | 5/2021 | Zhang et al. |
| 2021/0132650 A1 | 5/2021 | Wenhua et al. |
| 2021/0133547 A1 | 5/2021 | Wenhua et al. |
| 2021/0173238 A1 | 6/2021 | Hosseinzadeh |
| 2021/0257396 A1 | 8/2021 | Piggott et al. |
| 2021/0271020 A1 | 9/2021 | Islam et al. |
| 2021/0286129 A1 | 9/2021 | Fini et al. |
| 2021/0305127 A1 | 9/2021 | Refai-Ahmed et al. |
| 2021/0406164 A1 | 12/2021 | Grymel et al. |
| 2021/0409848 A1 | 12/2021 | Saunders et al. |
| 2022/0003948 A1 | 1/2022 | Zhou et al. |
| 2022/0004029 A1 | 1/2022 | Meng |
| 2022/0012578 A1 | 1/2022 | Brady et al. |
| 2022/0012582 A1 | 1/2022 | Pleros et al. |
| 2022/0044092 A1 | 2/2022 | Pleros et al. |
| 2022/0091332 A1 | 3/2022 | Yoo et al. |
| 2022/0092016 A1 | 3/2022 | Kumashikar |
| 2022/0159860 A1 | 5/2022 | Winzer et al. |
| 2022/0171142 A1 | 6/2022 | Wright et al. |
| 2022/0302033 A1 | 9/2022 | Cheah et al. |
| 2022/0342164 A1 | 10/2022 | Chen et al. |
| 2022/0374575 A1 | 11/2022 | Ramey et al. |
| 2022/0382005 A1 | 12/2022 | Rusu |
| 2023/0089415 A1 | 3/2023 | Zilkie et al. |
| 2023/0197699 A1 | 6/2023 | Spreitzer et al. |
| 2023/0251423 A1 | 8/2023 | Lopez et al. |
| 2023/0258886 A1 | 8/2023 | Liao |
| 2023/0282547 A1 | 9/2023 | Refai-Ahmed et al. |
| 2023/0308188 A1 | 9/2023 | Dorta-Quinones |
| 2023/0314702 A1 | 10/2023 | Yu |
| 2023/0376818 A1 | 11/2023 | Nowak |
| 2023/0393357 A1 | 12/2023 | Ranno |

FOREIGN PATENT DOCUMENTS

| | | |
|---|---|---|
| AU | 2019100750 A | 8/2019 |
| CN | 102281478 A | 12/2011 |
| CN | 102333250 A | 1/2012 |
| CN | 102413039 A | 4/2012 |
| CN | 102638311 A | 8/2012 |
| CN | 102645706 A | 8/2012 |
| CN | 202522621 U | 11/2012 |

(56) References Cited

FOREIGN PATENT DOCUMENTS

| | | |
|---|---|---|
| CN | 103369415 A | 10/2013 |
| CN | 103442311 A | 12/2013 |
| CN | 103580890 A | 2/2014 |
| CN | 104539547 A | 4/2015 |
| CN | 105451103 A | 3/2016 |
| CN | 205354341 U | 6/2016 |
| CN | 105812063 A | 7/2016 |
| CN | 105847166 A | 8/2016 |
| CN | 106126471 A | 11/2016 |
| CN | 106331909 A | 1/2017 |
| CN | 106407154 A | 2/2017 |
| CN | 106533993 A | 3/2017 |
| CN | 106549874 A | 3/2017 |
| CN | 106796324 | 5/2017 |
| CN | 106888050 A | 6/2017 |
| CN | 106911521 A | 6/2017 |
| CN | 106936708 A | 7/2017 |
| CN | 106936736 A | 7/2017 |
| CN | 106980160 A | 7/2017 |
| CN | 107911761 A | 4/2018 |
| CN | 108599850 A | 9/2018 |
| CN | 207835452 U | 9/2018 |
| CN | 108737011 A | 11/2018 |
| CN | 110266585 A | 9/2019 |
| CN | 110505021 A | 11/2019 |
| CN | 111208690 A | 5/2020 |
| CN | 111752891 A | 10/2020 |
| CN | 111770019 A | 10/2020 |
| CN | 111786911 A | 10/2020 |
| FR | 3007537 A | 12/2014 |
| GB | 2223867 | 4/1990 |
| IN | 201621017235 A | 7/2016 |
| IN | 202121008267 A | 4/2021 |
| JP | 6747660 B | 8/2020 |
| JP | 2020155112 | 9/2020 |
| KR | 101242172 B | 3/2013 |
| KR | 101382606 B | 4/2014 |
| KR | 101465420 B | 11/2014 |
| KR | 101465498 B | 11/2014 |
| KR | 101541534 B | 8/2015 |
| KR | 101548695 B | 9/2015 |
| KR | 101766786 B | 8/2017 |
| KR | 101766792 B | 8/2017 |
| WO | WO2015176289 | 11/2015 |
| WO | WO2020072925 | 4/2020 |
| WO | WO2020102204 | 5/2020 |
| WO | WO2020191217 | 9/2020 |
| WO | WO2021021787 | 2/2021 |
| WO | WO2022032105 | 2/2022 |
| WO | WO2022133490 | 6/2022 |
| WO | WO2023177417 | 9/2022 |
| WO | WO2022266676 | 12/2022 |
| WO | WO2023177922 | 9/2023 |

OTHER PUBLICATIONS

U.S. Appl. No. 63/062,163, filed Aug. 6, 2020, Pleros et al.
U.S. Appl. No. 63/199,286, filed Dec. 17, 2020, Ma et al.
U.S. Appl. No. 63/199,412, filed Dec. 23, 2022, Ma et al.
U.S. Appl. No. 63/201,155, filed Apr. 15, 2021, Ma et al.
U.S. Appl. No. 63/261,974, filed Oct. 1, 2021, Pleros et al.
U.S. Appl. No. 63/212,353, filed Jun. 18, 2021, Winterbottom et al.
U.S. Appl. No. 17/807,692, filed Jun. 17, 2022, Winterbottom et al.
U.S. Appl. No. 17/807,694, filed Jun. 17, 2022, Winterbottom et al.
U.S. Appl. No. 17/807,698, filed Jun. 17, 2022, Winterbottom et al.
U.S. Appl. No. 17/807,699, filed Jun. 17, 2022, Winterbottom et al.
U.S. Appl. No. 17/807,695, filed Jun. 17, 2022, Winterbottom et al.
U.S. Appl. No. 63/321,453, filed Mar. 18, 2022, Bos et al.
U.S. Appl. No. 17/903,455, filed Sep. 6, 2022, Lazovsky et al.
U.S. Appl. No. 18/123,161, filed Mar. 17, 2023, Bos et al.
U.S. Appl. No. 17/957,731, filed Sep. 30, 2022, Pleros et al.
U.S. Appl. No. 17/957,812, filed Sep. 30, 2022, Pleros et al.
U.S. Appl. No. 63/420,323, filed Oct. 28, 2022, Sahni.
U.S. Appl. No. 18/123,170, filed Mar. 17, 2023, Sahni.
U.S. Appl. No. 63/420,330, filed Oct. 28, 2022, Sahni et al.
U.S. Appl. No. 63/428,663, filed Nov. 29, 2022, Sahni et al.
U.S. Appl. No. 63/441,689, filed Jan. 27, 2023, Winterbottom.
U.S. Appl. No. 63/579,486, filed Aug. 29, 2023, Aggarwal et al.
U.S. Appl. No. 63/535,509, filed Aug. 30, 2023, Winterbottom et al.
U.S. Appl. No. 63/535,511, filed Aug. 30, 2023, Winterbottom et al.
U.S. Appl. No. 63/535,512, filed Aug. 30, 2023, José Maia da Silva et al.
U.S. Appl. No. 63/592,509, filed Oct. 23, 2023, Aggarwal et al.
U.S. Appl. No. 63/592,517, filed Oct. 23, 2023, Winterbottom et al.
U.S. Appl. No. 18/473,898, filed Sep. 25, 2023, Pleros et al.
U.S. Appl. No. 18/523,667, filed Nov. 29, 2023, Sahni et al.
U.S. Appl. No. 18/293,673, filed Jan. 30, 2024, Bos et al.
U.S. Appl. No. 18/407,408, filed Jan. 8, 2024, Aggarwal.
U.S. Appl. No. 18/407,410, filed Jan. 8, 2024, Aggarwal.
U.S. Appl. No. 18/423,210, filed Jan. 25, 2024, Winterbottom.
U.S. Appl. No. 18/540,579, filed Dec. 14, 2023, Winterbottom et al.
U.S. Appl. No. 18/590,689, filed Feb. 28, 2024, Winterbottom et al.
U.S. Appl. No. 18/590,703, filed Feb. 28, 2024, Winterbottom et al.
U.S. Appl. No. 18/590,708, filed Feb. 28, 2024, Winterbottom et al.
Ardestani, et al., "Supporting Massive DLRM Inference Through Software Defined Memory", Nov. 8, 2021; 14 pages.
Agrawal, Govind; "Chapter 4—Optical Receivers", Fiber-Optic Communications Systems, John Wiley & Sons, Inc., (2002), pp. 133-182.
Burgwal, Roel et al; "Using an imperfect photonic network to implement random unitaries," Opt. Express 25(23), (2017), 28236-28245.
Capmany, Francoy et al.; "Thepgrammable processor" Nature Photonics, 109/22/20226, (2016), 5 pgs.
Carolan, Jacques et al.; "Universal Linear Optics"; arXiv: 1505.01182v1; (2015); 13 pgs.
Clements, William et al; "Optimal design for universal multiport interferometers"; Optica; vol. 3, No. 12; (2016), pp. 1460-1465.
Eltes, Felix et al.; "A BaTiO3-Based Electro-Optic Pockets Modulator Monolithically Integrated on an Advanced Silicon Photonics Platform"; J. Lightwave Technol. vol. 37, No. 5; (2019), pp. 1456-1462.
Eltes, Felix et al.; Low-Loss BaTiO3—Si Waveguides for Nonlinear Integrated Photonics; ACS Photon., vol. 3, No. 9; (2016), pp. 1698-1703.
Harris, NC et al.; "Efficient, compact and low loss thermo-optic phase shifter in colicon"; Opt. Express, vol. 22, No. 9; (2014), pp. 10487-10493.
Jiang, W.; "Nonvolatile and ultra-low-loss reconfigurable mode (De) multiplexer/switch using triple-waveguide coupler with Ge2Sb2Se4T31 phase change material"; Sci. Rep. vol. 8, No. 1; (2018), 12 pages.
Lambrecht, Joris et al.; "90-GB/s NRZ Optical Receiveer in Silicon Using a Fully Differential Transimpedance Aplifier," Journal of Lightwave Technology, vol. 37, No. 9; (2019); pp. 1964-1973.
Manolis, A. et al; "Non-volatile integrated photonic memory using GST phase change material on a fully eched Si3N4/SiO2 waveguide"; Conference on Lasers and Electro-optics; OSA Technical Digest, paper STh3R.4; (2020); 2 pages.
Miller, David A. et al; "Perfect optics with imperfect components"; Optica, vol. 2, No. 8; (2015); pp. 747-750.
Miller, David A. et al; "Self-Configuring Universal Linear Optical Component"; Photon. Res. 1; [Online]; Retrieved from the interent: URL: https://arxiv.org/ftp/arxiv/papers/1303/1303.4602.pdf; (2013), pp. 1-15.
Miscuglio, Mario et al.; "Photonic Tensor cores for machine learning"; Applied Physics Reviews, vol. 7, Issue 3; (2020), 16 pages.
Mourgias-Alexandris, George et al; "An all-optical neuron with sigmoid activation function;" Optics Express, vol. 27, No. 7; (2019); pp. 9620-9630.
Mourgias-Alexandris, George et al; Neuromorphic Photonics with Coherent Linear Neurons Using Dual-IQ Modulation Cells, Journal of Lightwave Technology, vol. 38, No. 4; Feb. 15, 2020, pp. 811-819.

(56) References Cited

OTHER PUBLICATIONS

Pai, Sunil et al.; "Parallel Programming of an Arbitrary Feedforward Photonic Network"; IEEE Journal of Selected Topics in Quantum Electronics, vol. 26, No. 5; (2020), 13 pages.
Perez, Daniel et al. "Reconfigurable lattice mesh designs for prgrammable photonic processors"; Optics Express vol. 24, Issue 11; (2016); pp. 12093-12106.
Raj, Mayank et al.; "Design of a 50-GB/s Hybid Integrated Si-Photonic Optical Link in 16-nm FinFET"; IEEE Journal of Solid-State Circuits, vol. 55, No. 4, Apr. 2020, pp. 1086-1095.
Reck, M. et al; "Experimental Realization of any Discrete Unitary Operator"; Phys. Rev. Lett. 73; (1994); pp. 58-61.
Shen, Yichen et al; "Deep learning with coherent nanophotonic circuits"; https://arxiv.org/pdf/1610.02365.pdf; (2016); 8 pages.
Shi, Bin et al.; Numerical Simulation of an InP Photonic Integrated Cross-Connect for Deep Neural Networks on Chip; Applied Sciences, Jan. 9, 2020, pp. 1-15.
Shokraneh, Farhad et al; "The diamond mesh, a phase-error- and loss-tolerant fieldprogrammable MZI-based optical processor for optical neural networks" Opt. Express, vol. 28, No. 16; (2020); pp. 23495-23508.
Sun, Chen et al; "A 45 nm cmos-soi monolithic photonics platform with bit-statistics-based resonant microring thermal tuning"; IEEE Journal of Solid-State Circuits, vol. 51, No. 4; (2016); 20 pages.
Tait, Alexander et al; "Broadcast and Weight: An Intergated Network for Scalable Photonic Spike Processing"; Journal of Lightwave Technology, vol. 32, No. 21; (2014); pp. 4029-4041.
Yang, Lin et al; "On-chip CMOS-compatible optical signal processor"; Opt. Express, vol. 20, No. 12; (2012) pp. 13560-13565.
Zhuang, L. et al; Programmable photonic signal processor chip for radiofrequency applications; Optica 2; 854-859; (2015); 10 pages.
U.S. Appl. No. 17/395,849, Jan. 5, 2023, Office Action.
U.S. Appl. No. 17/395,849, Jul. 24, 2023, Notice of Allowance.
U.S. Appl. No. 17/645,001, Jul. 20, 2022, Notice of Allowance.
U.S. Appl. No. 18/540,579, Feb. 14, 2024, Office Action.
U.S. Appl. No. 17/807,692, Feb. 15, 2024, Restriction Requirement.
U.S. Appl. No. 18/407,408, Mar. 28, 2024, Office Action.
U.S. Appl. No. 18/407,410, Mar. 15, 2024, Restriction Requirement.
PCT/US2021/044956, Nov. 19, 2021, International Search Report and Written Opinion.
PCT/US2021/073003, Mar. 22, 2022, International Search Report and Written Opinion.
PCT/US2022/073039, Sep. 1, 2022, Invitation to Pay Additional Fees.
PCT/US2022/073039, Dec. 2, 2022, International Search Report and Written Opinion.
PCT/US2022/042621, Feb. 15, 2023, International Search Report and Written Opinion.
PCT/US2023/015680, May 23, 2023, Invitation to Pay Additional Fees.
PCT/US2022/015680, Aug. 23, 2023, International Search Report and Written Opinion.
20220404544, Jan. 19, 2024, Foreign Office Action.
202180068303.5, Jan. 20, 2024, Foreign Office Action.
PCT/US2022/042621, Feb. 26, 2024, International Search Report and Written Opinion.
U.S. Appl. No. 63/392,475, filed Jul. 26, 2022, Aggarwal et al..
U.S. Appl. No. 18/076,196, filed Dec. 6, 2022, Aggarwal et al..
U.S. Appl. No. 18/076,210, filed Dec. 6, 2022, Aggarwal et al..
U.S. Appl. No. 18/217,898, filed Jul. 3, 2023, Aggarwal et al..
U.S. Appl. No. 63/437,639, filed Jan. 6, 2023, Plunkett et al..
U.S. Appl. No. 63/437,641, filed Jan. 6, 2023, Plunkett et al..
Hendry, G. et al.; "Circuit-Switched Memory Access in Photonic Interconnection Networks for High-Performance Embedded Computing," SC '10: Proceedings of the 2010 ACM/IEEE International Conference for High Performance Computing, Networking, Storage and Analysis, New Orleans, LA, USA, 2010, pp. 1-12.
Liu, Jifeng, et al.; "Waveguide-integrated, ultralow-energy GeSi electro-absorption modulators", Nature Photonics, [Online] vol. 2, No. 7, May 30, 2008 (May 30, 2008), pp. 433-437.
Wu, Longsheng et al.; "Design of a broadband Ge 1-20 1-x Six electro-absorption modulator based on the Franz-Keldysh effect with thermal tuning", Optics Express, [Online] vol. 28, No. 5, Feb. 27, 2020 (Feb. 27, 2020), p. 7585.
U.S. Appl. No. 18/540,579, May 1, 2024, Office Action.
U.S. Appl. No. 17/807,692, Jul. 12, 2024, Office Action.
U.S. Appl. No. 18/407,408, Jul. 30, 2024, Notice of Allowance.
U.S. Appl. No. 18/407,410, May 24, 2024, Office Action.
U.S. Appl. No. 18/407,410, Aug. 12, 2024, Notice of Allowance.
U.S. Appl. No. 17/903,455, Jun. 27, 2024, Office Action.
U.S. Appl. No. 18/590,708, Aug. 7, 2024, Notice of Allowance.
PCT/US2023/015680, Aug. 9, 2024, International Preliminary Report on Patentability.
10-2023-7007856, Aug. 21, 2024, Foreign Notice of Allowance.
202180068303.5, Jul. 31, 2024, Foreign Notice of Allowance.
11202307570T, Apr. 10, 2024, Foreign Notice of Allowance.
202280020819.7, Apr. 4, 2024, Foreign Office Action.
202180093875.9, Apr. 12, 2019, Foreign Office Action.
PCT/US2024/010774, May 3, 2024, International Search Report and Written Opinion.
EP23220883, May 7, 2024, Extended European Search Report.
PCT/US2024/013168, May 8, 2024, International Search Report and Written Opinion.
22826043.6, Jun. 14, 2024, Extended European Search Report.
21853044.2, Jul. 23, 2024, Extended European Search Report.
1020237024129, Aug. 2, 2024, Foreign Office Action.
1020237044346, Aug, 27, 2024, Foreign Office Action.
Zhang, Yulong; "Building blocks of a silicon photonic integrated wavelength division multiplexing transmitter for detector instrumentation" , Doktors Der Ingenieurwissenschaften (Dr. -Ing.), Dec. 15, 2020 (Dec. 15, 2020), 128 pages.
U.S. Appl. No 17/807,699, Oct. 1, 2024, Office Action.
U.S. Appl. No 18/423,210, Sep. 30, 2024, Notice of Allowance.
U.S. Appl. No 18/540,579, Oct. 8, 2024, Office Action.
202280020819.7, Sep. 16, 2024, Foreign Notice of Allowance.
U.S. Appl. No 18/407,408, Oct. 2, 2024, Notice of Allowance.
2023-537068, Oct. 1, 2024, Foreign Office Action.
11202304676X, Oct. 4, 2024, Foreign Notice of Allowance.
Dakkak, A.D. et al. "Accelerating Reduction and Scan Using Tensor Core Units, 2019,ACM,pp. 46-57.".

\* cited by examiner

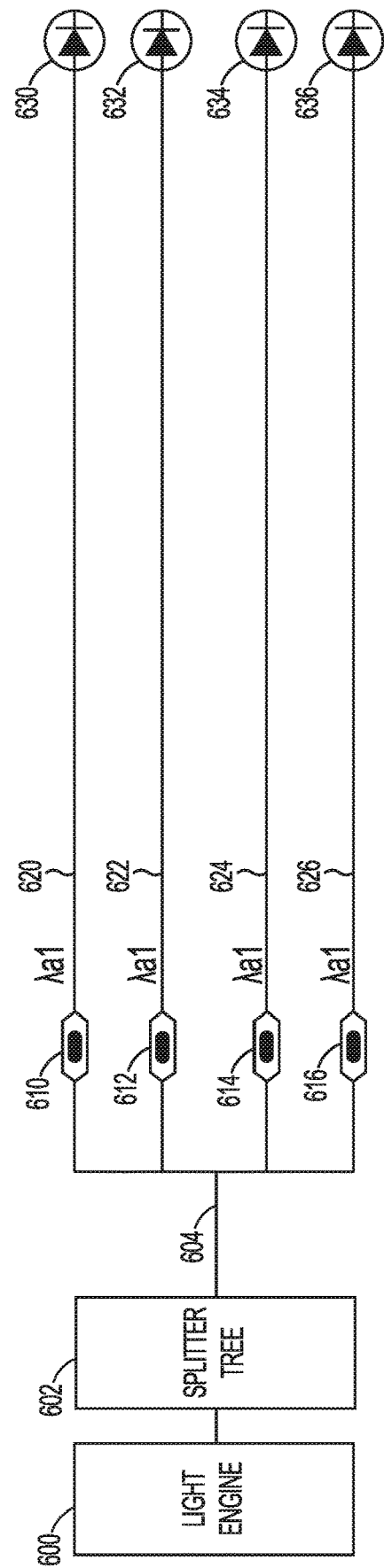

(CHIP-TO-CHIP, WDM)

CLOCK SIGNAL DISTRIBUTION USING PHOTONIC FABRIC

RELATED APPLICATIONS

This application is a continuation of U.S. patent application Ser. No. 17/807,699, filed on Jun. 17, 2022, which claims the benefit of priority to U.S. Provisional Patent Application Ser. No. 63/212,353, filed on Jun. 18, 2021, both of which are incorporated by reference herein in their entireties.

BACKGROUND

Demands for artificial intelligence (AI) computing, such as machine learning (ML) and deep learning (DL), are increasing faster than they can be met by increases in available processing capacity. This rising demand and the growing complexity of AI models drive the need to connect many chips into a system where the chips can send data between each other with low latency and at high speed. In a presently known approach, connections between chips are made using serializer/deserializer (SerDes) blocks that convert parallel messages into serial bit streams that can be sent over electrical interconnects or optical fibers between chips. In such systems, a distinction is made between on-chip and off-chip communication. Compute elements on the chip communicate packets via metal interconnects, while messages (e.g., packets) destined for another chip move over the chip-level interconnects to the site of the interface to the SerDes, where the data is converted to a bit stream and is transmitted. In the receive direction, bits arrive on an optical fiber or electrical interconnect, are assembled into words, and are then transmitted over metal interconnects inside the chip to the destination processor or memory. Significant energy is expended both in moving the data within the chip to the SerDes and then from the SerDes into other chips in the system. Moreover, the presently known hardware implementations of ML models are relatively power-inefficient in performing the multiply-accumulate (MAC) operations that are extensively used during execution of ML models.

BRIEF DESCRIPTION OF THE DRAWINGS

Various ones of the appended drawings merely illustrate various embodiments of the presently disclosed subject matter and should not be considered as limiting its scope.

FIG. 6A is a diagram illustrating an example group of photonic links connecting two processing elements within an SIP, according to some embodiments.

DETAILED DESCRIPTION

Figure 1A:
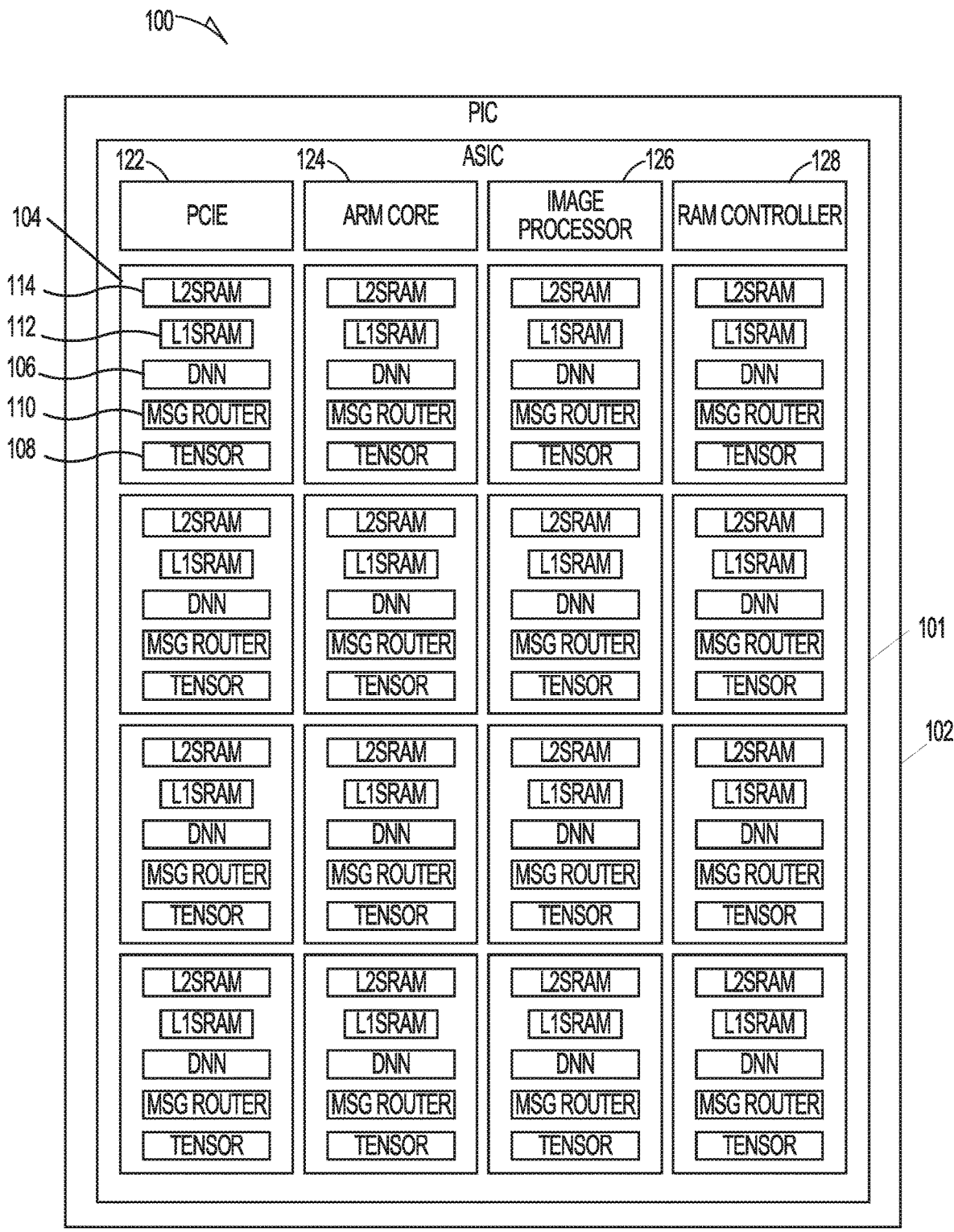
FIG. 1A is a diagram schematically illustrating components of an example system-in-package (SIP), according to some embodiments.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

The present disclosure provides computing systems, implemented by one or more circuit packages (e.g., SIPs), that achieve reduced power consumption and/or increased processing speed. In accordance with various embodiments, power consumed for, in particular, data movement is reduced by maximizing data locality in each circuit package and reducing energy losses when data movement is needed. Power-efficient data movement, in turn, can be accomplished by moving data over small distances in the electronic domain, while leveraging photonic channels for data movement in scenarios where the resistance in the electronic domain and/or the speed at which the data can move in the electronic domain leads to bandwidth limitations that cannot be overcome using existing electronic technology. Thus, in some embodiments, each circuit package includes an electronic integrated circuit (EIC) comprising multiple circuit blocks (hereinafter "processing elements") that are connected by bidirectional photonic channels (e.g., implemented in a PIC in a separate layer or chip of the package) into a hybrid, electronic-photonic (or electro-photonic) network-on-chip (NoC). Multiple such NoCs may be connected, by inter-chip bidirectional photonic channels between respective circuit packages (e.g., implemented by optical fiber), into a larger electro-photonic network, to scale the computing system to arbitrary size without incurring significant power losses. Further disclosed embodiments provide a novel circuit design for the power-efficient performance of MAC operations (herein also referred to as a "dot product engine"), and a novel clocking scheme that results in additional power savings.

While the described computing systems and its various novel aspects are generally applicable to a wide range of processing tasks, they are particularly suited to implementing ML models, in particular ANNs. As applied to ANNs, a circuit package and system of interconnected circuit packages as described herein are also referred to as an "ML processor" and "ML accelerator," respectively. Neural networks generally include one or more layers of artificial neurons that compute neuron output activations from weighted sums (corresponding to MAC operations) of a set of input activations. For a given neural network, the flow of activations between nodes and layers is fixed. Further, once training of the neural network is complete, the neuron weights in the weighted summation, and any other parameters associated with computing the activations, are likewise fixed. Thus, a NoC as described herein lends itself to implementing a neural network by assigning neural nodes to processing elements, pre-loading the fixed weights associated with the nodes into memory of the respective processing elements, and configuring data routing between the processing elements based on the predetermined flow of activations. The weighted summation can be efficiently performed using the disclosed dot product engine, herein also called a "digital neural network (DNN)" due to its applicability to ANNs.

The foregoing high-level summary of various beneficial aspect and features of the disclosed computing systems and underlying concepts will become clearer from the following description of example embodiments.

FIG. 1A is a diagram schematically illustrating components of an example circuit package SIP 100, according to some embodiments. The SIP 100 may serve, e.g., as an ML processor. The SIP 100 includes an EIC 101, such as, e.g., a digital and mixed-signal application-specific integrated circuit (ASIC), and a PIC 102. The EIC 101 and PIC 102 are formed in different layers of the SIP (herein the "electronic circuit layer" and "photonic circuit layer," respectively), one stacked above the other, as illustrated further below with reference to FIG. 1C. The PIC or PICs 102 receive light from one or more laser light sources that may be integrated into the PIC 102 itself, or implemented separately from the PIC either within or externally to the SIP 100 and coupled in to the PIC 102 via suitable optical couplers. The optical couplers and laser sources are omitted from FIG. 1A, but shown, e.g., in FIGS. 1B, 1C, and 5A through 6B.

The EIC 101 includes multiple processing elements 104, which communicate with each other via bidirectional photonic channels implemented with optical waveguides in the PIC 102. The processing elements 104 may (although they need not in all embodiments) be electronic circuits identical (or at least substantially similar) in design, and as shown, may form "tiles" of the same size arranged in a rectangular grid. (Hereinafter, the words "processing element" and "tile" are used synonymously.) In the depicted example, the EIC 101 has sixteen such processing elements, or tiles, 106 arranged in a four-by-four array, but the number and arrangement of tiles can generally vary. Neither the shape of the tiles nor the grid in which they are arranged need necessarily be rectangular; for example, oblique quadrilateral, triangular, or hexagonal shapes and grids are, in principle, also possible. Further, although tiling may provide for efficient use of the available on-chip real-estate, the processing elements 104 need not be equally sized and regularly arranged in all embodiments.

Each processing element 104 in the EIC 101 includes one or more circuit blocks serving as processing engines. For example, in the implementation shown in FIGS. 1A and 2, each processing element 104 includes a dot product engine, or DNN, 106 and a tensor engine 108. The DNN 106 can perform rapid MAC operations at reduced energy per MAC to execute either a convolution function or a dot product function, e.g., as routinely used in neural networks. Details of an example DNN 106 are provided below with reference to FIG. 4. The tensor engine 108 may be used to perform other, non-MAC operations, e.g., implementing non-linear activation functions as applied to the weighted sums in a neural network. An example tensor engine 108 is described below with reference to FIG. 3.

As further shown in FIGS. 1A and 2, each processing element 104 includes a message router 110. The message routers 110 interface with the photonic channels in the PIC 102 to facilitate data flow between the processing elements 104. Further, the processing element 104 may each have a memory system, e.g., including level-one static random-access memory (L1SRAM) 112 and level-two static random access memory (L2SRAM) 114. L1SRAM 112 is optional and, if included, can serve as scratchpad memory for each processing element 104. L2SRAM 114 may function as the primary memory for each processing element 104, and may store certain fixed operands used by the DNN 106 and tensor engine 108, such as the weights of a machine learning model, in close physical proximity to DNN 106 and tensor engine 108. L2SRAM 114 may also store any intermediate results used in executing the machine learning model or other computation.

The EIC 101 may further include optional elements, such as a peripheral component interconnect express (PCIE) interface 122, an advanced RISC machine (ARM) core 124, an image processor 126, and/or an external memory controller 128 that may support dynamic random-access memory (DRAM), non-volatile random-access memory (NVRAM), static random-access memory (SRAM), or another type of memory. The PCIE interface 122 generally enables electrical interconnections between the EIC 101 and an external component. For example, weights stored in the L2SRAMs can be received over the PCIE interface 122 from an external component, such as a DRAM. The ARM core 124 can, likewise, interface with a memory device external to the SIP 100 and may process image data or perform other computing tasks. The image processor 126 can process images received from a memory device or another processor, where the images may have originated from a camera.

The memory controller 128 may communicate with a high-bandwidth memory (HBM) that may be included in the SIP 100 and, in turn, interface a DRAM external to the SIP 100. In some examples, the EIC 101 includes multiple memory controllers for different types of memory.

Figure 1B:
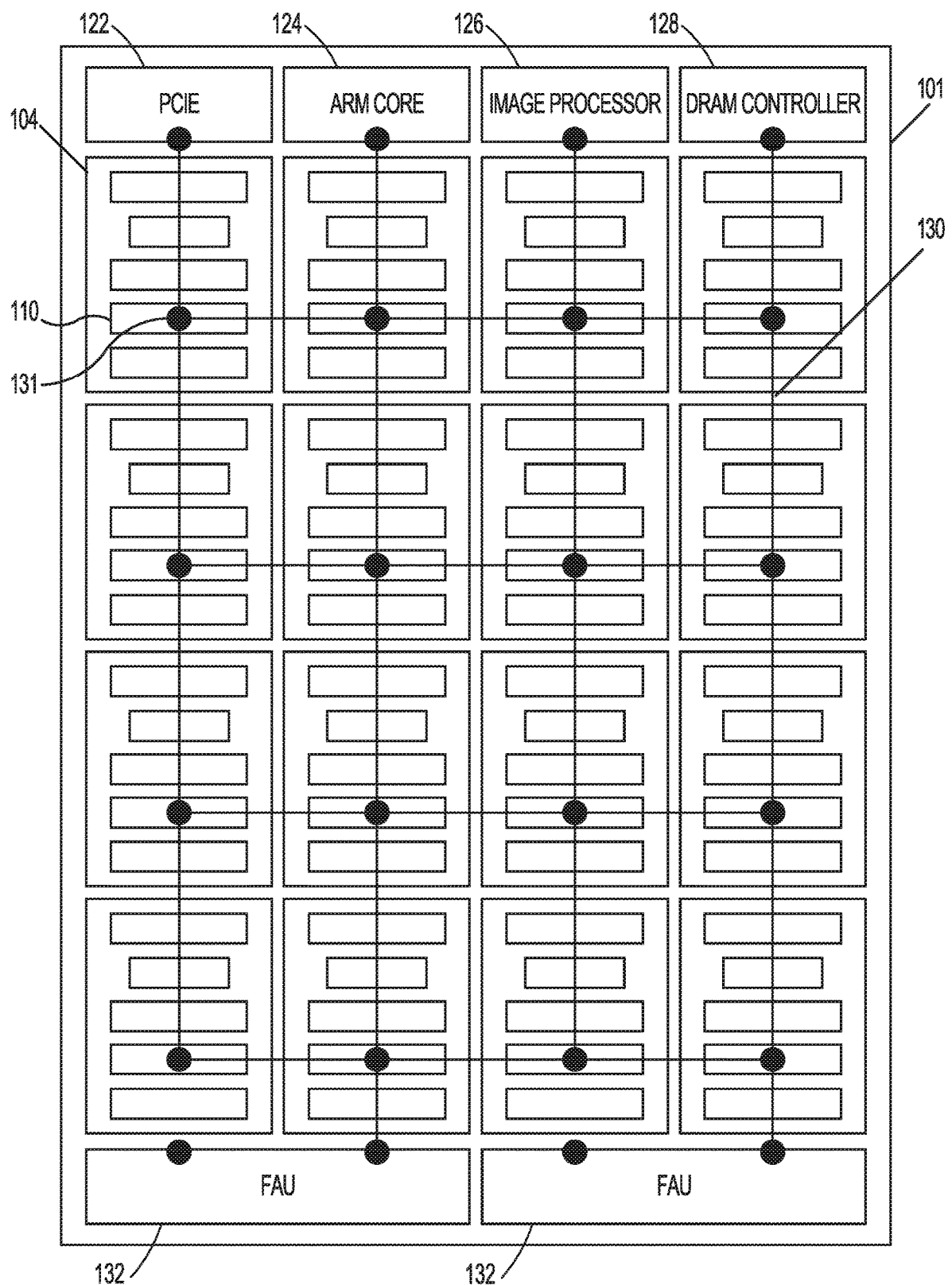
FIG. 1B is a diagram schematically illustrating an example electro-photonic network within the SIP of FIG. 1A, according to some embodiments.

FIG. 1B is a diagram schematically illustrating an example electro-photonic network (or NoC) 130 within the SIP 100 of FIG. 1A, according to some embodiments. Each processing element 104, and more specifically the message router 110 in each processing element 104, serves as a node 131 in the network 130. Connections between these nodes 131 are established via bidirectional photonic channels, each channel interfacing at one end with the message router of one processing element and at the other end with the message router of another processing element. (The physical implementation of the photonic channels and the interfaces between the channels and the message routers are described further below with reference to FIGS. 5A and 5B.) Message transfer between any two processing elements 104 that do not share a bidirectional photonic channel directly connecting them can be accomplished by multiple "hops" along a path through one or more intervening nodes 131 within the electro-photonic network 130; each such hop from one node to the next involves the conversion of the message from the electronic domain into the photonic domain and back into the electronic domain. As such, the network 130 is a hybrid electro-photonic network.

In FIG. 1B, each pair of immediately adjacent processing elements (or tiles) 104 in the regular grid is connected by a photonic channel, resulting in a rectangular mesh topology of the electro-photonic network 130. However, other network topologies, e.g., as result from omitting connections between pairs of adjacent processing elements and/or adding direct connections between non-adjacent processing elements are also possible. Further, even though the processing elements 104 are physically arranged in two dimensions in a single EIC 101, the photonic channels can be collectively configured to establish topologically three-dimensional electro-photonic networks.

As further shown in FIG. 1B, in addition to interconnecting the processing elements 104, photonic channels in the PIC 102 may also connect the processing elements 104 (e.g., along the periphery of the tiled arrangement) to other elements of the EIC 101, such as to the PCIE interface 122, ARM core 124, image processor 126, and/or memory controller 128. Alternatively, some electronic elements of the EIC may be interconnected electrically. For example, the PCIE interface 122 may be electrically connected to one of the processing elements 104 within the electro-photonic NoC, which may serve as the entry point for communication with all other processing elements 104. According to various embodiments described herein, both electrical and photonic signal routings are employed. Signal routing tasks may be apportioned between electrical (or electronic) paths and photonic paths in a manner and for reasons that will be apparent by the discussion below.

The PIC 102 may also include one or mor optical coupling structures for making off-chip optical connections, e.g., via optical fiber. Fiber connections can be made by several means; example optical coupling structures for fiber connections include fiber attach units (FAUs) located over grating couplers, or edge couplers. FIG. 1B shows two FAUs 132; one FAU may be used to supply optical power from an external laser light source to the PIC 102 to drive the photonics in the PIC 102, while the other FAU may facilitate chip-to-chip interconnection to another electro-photonic networks in another SIP for both transmit and receive communications. While two FAUs 132 are shown in FIG. 1B, other numbers of FAUs may be used in different examples.

Figure 1C:
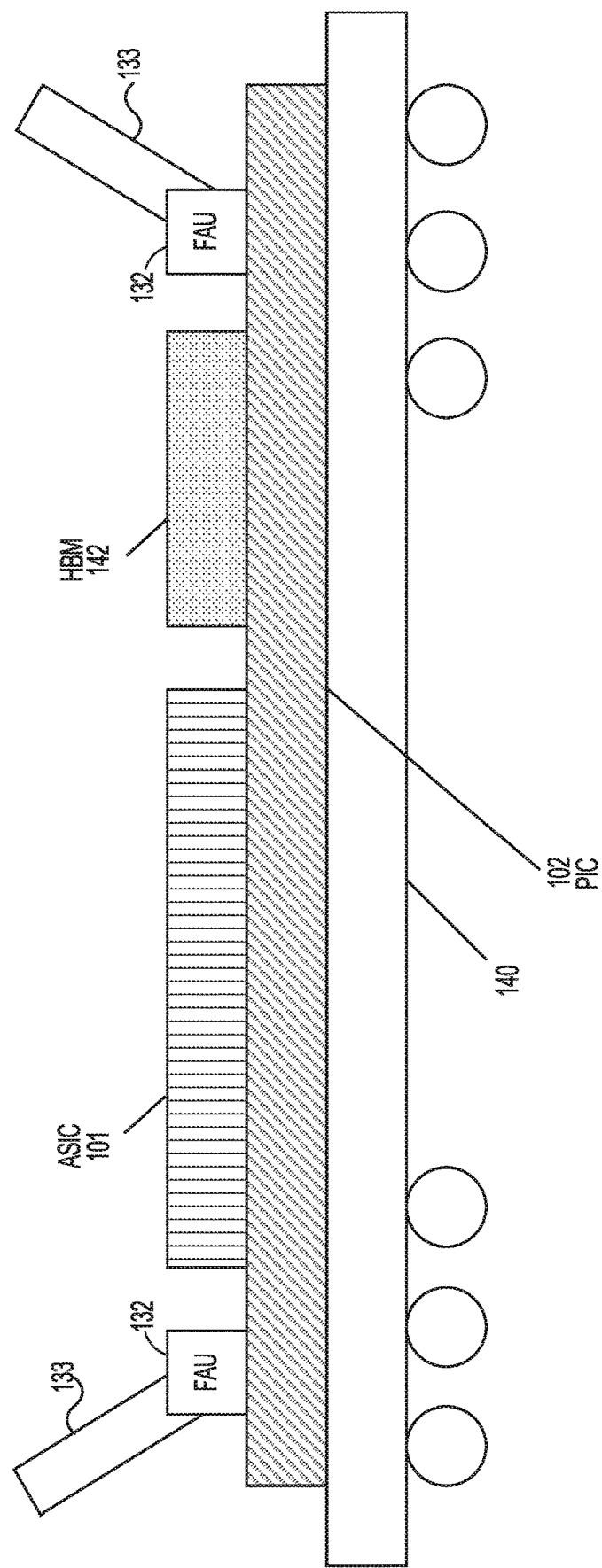
FIG. 1C is a diagram illustrating, in a side view, an example structural implementation of the SIP of FIGS. 1A and 1B, according to some embodiments.

FIG. 1C is a diagram illustrating, in a side view, an example structural implementation of the SIP 100 of FIGS. 1A and 1B, according to some embodiments. In this example, the EIC (e.g., ASIC) 101 and PIC 102 are formed in separate semiconductor chips (typically silicon chips, although the use of other semiconductor materials is conceivable). PIC 102 is disposed directly on the substrate 140, shown with solder bumps for subsequent mounting to a printed circuit board (PCB). The EIC 101 and FAUs 132 that connect the PIC 102 to optical fibers 133 are disposed on top of and optically connected to the PIC 102. Optionally, the SIP 100 may further include, as shown, a memory chip 142 placed on top of the PIC 102 adjacent to the EIC 101.

As will be appreciated by those of ordinary skill in the art, the depicted structure of the SIP 100 is merely one of several possible ways to assemble and package the various components. In alternative embodiments, the EIC 101 may, for example, be disposed on the substrate, with the PIC 102 being placed on top of the EIC 101. In principle, as an alternative to implementing the electronic and photonic circuit layers as separate chips, it also possible to create the EIC 101 and PIC 102 in different layers of a single semiconductor chip. Further, the photonic circuit layer may multiple PICs in multiple sub-layers, e.g., to reduce waveguide crossings. Moreover, the structure depicted in FIG. 1C may be modified to included multiple EICs 101 connected to a single PIC 102, and via photonic channels in the PIC 102 to each other.

The EIC 101 and PIC 102 can be manufactured using standard wafer fabrication processes, including, e.g., photolithographic patterning, etching, ion implantation, etc. Further, in some embodiments, heterogeneous material platforms and integration processes are used. For example, various active photonic components, such as the laser light sources and/or optical modulators and photodetectors used in the photonic channels, may be implemented using group III-V semiconductor components.

The laser light source(s) can be implemented either in the SIP 100 or externally. When implemented externally, a connection to the SIP 100 can be made optically, e.g., using a grating coupler in the PIC underneath an FAU 132 as shown in FIG. 1C, or alternatively using an edge coupler. To implement lasers in the SIP 100, one option is to use an interposer containing several lasers that can be co-packaged and edge-coupled with the PIC 102. Alternatively, the lasers can be integrated directly into the PIC 102 using heterogenous or homogenous integration. Homogenous integration allows lasers to be directly implemented in the silicon substrate in which the waveguides of the PIC 102 are formed, and allows for lasers of different materials, such as, e.g., indium phosphide (InP), and architectures such as, e.g., quantum dot lasers. Heterogenous assembly of lasers on the PIC 102 allows for group III-V semiconductors or other materials to be precision-attached onto the PIC 102 and optically coupled to a waveguide implemented on the PIC 102.

Several SIPs 100, each including its own electro-photonic network 130, may be interconnected to result in a single system providing a larger electro-photonic network. For example, multiple SIPs configured as ML processors may be interconnected to form a larger ML accelerator. The photonic channels within the several SIPs or ML processors, along with optical connections, laser light sources, passive optical components, and external optical fibers on the PCB, which may be utilized in various combinations and configurations along with other photonic elements, form the photonic fabric of the multi-SIP system or multi-ML-processor accelerator.

Figure 2A:
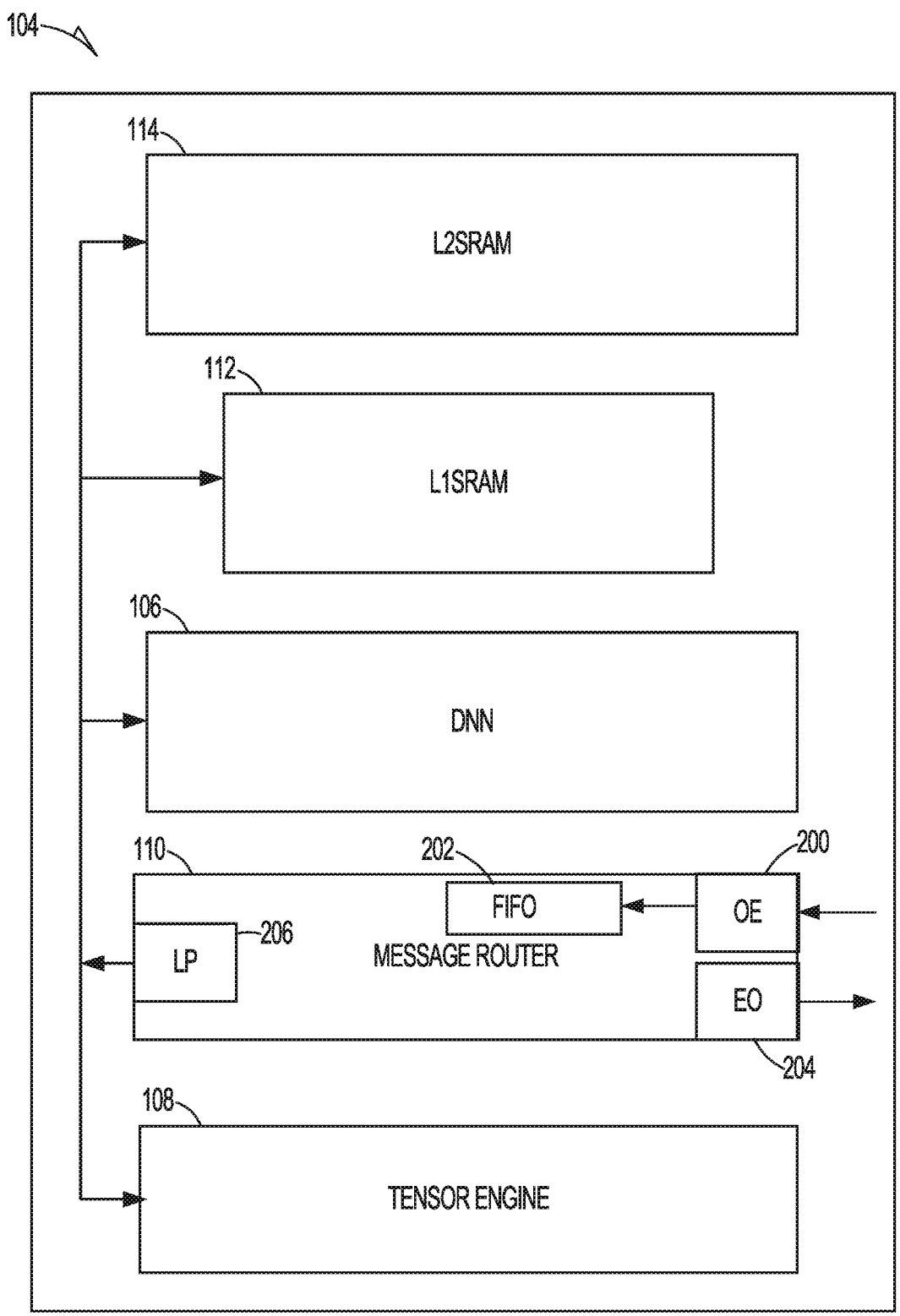
FIG. 2A is a diagram illustrating an example electronic processing element, including a message router, of the SIP of FIGS. 1A and 1B, according to some embodiments.

FIG. 2A is a diagram illustrating an example electronic processing element 104, including a message router 110 of the SIP 100 of FIGS. 1A and 1B, according to some embodiments. FIG. 2A provides more detail on, in particular, the message router 110 and its interface with a bidirectional photonic channel of the PIC 102. Each bidirectional photonic channel includes unidirectional photonic links in each direction, each unidirectional link being implemented using an optical waveguide in the PIC 102.

In one implementation, a message containing the packet data arrives through a photonic channel of the PIC 102 and is received at the optical-to-electrical (OE) interface between the PIC 102 and router 110. The OE interface may be implemented, for example, by a photodetector (e.g., photodiode) in the PIC 102 to convert the optical signal into an electronic signal, in conjunction with related electronic circuitry 200 in the router 110, which may include, e.g., a transimpedance amplifier (TIA), optional gain control to normalize the signal level, and slicer to extract the bit stream. The message can then be buffered in electronic form in a register such as "first in first out" (FIFO) register 202.

The electronic message router 110 includes circuitry to examine an address contained in the message header (or, in alternative embodiments, in the message payload), and to determine which port and which destination the message should be routed to. For example, if the destination is another processing element, or tile, within the electro-photonic network, the message can be routed to that destination tile through an electrical-to-optical (EO) interface between the router 110 and the PIC 102, where the message is converted back into the optical domain for transmission via another photonic channel. The EO interface may be implemented, for example, using an optical modulator within the PIC 102 in conjunction with associated driver circuitry (herein also "modulator driver") 204 in the router; non-limiting examples of applicable modulator technology include electro-absorption modulators (EAMs), Mach-Zehnder modulators, ring modulators, and quantum-confined Stark effect electro-absorption modulators (QCCE EAMs). If the electronic message router 110 determines, on the other hand, that the destination of the message is the tile memory (e.g., L1SRAM 112 or L2SRAM 114), DNN 106, or tensor engine 108 in which the router 110 itself resides, the message is routed to local port 206.

The EIC-side portions 200, 204 of the OE and EO interfaces between the message router 110 and the links (in both directions) of a given bidirectional photonic channel, such as the TIA and other circuitry (collectively 200) associated with the PIC-side photodiode and the driver circuitry associated with the PIC-side optical modulator, are herein collectively referred to as a "photonic-channel interface" of the router 110. While FIG. 2A illustrates only one photonic-channel interface, each router 110 generally includes multiple such interfaces to couple to multiple respective photonic channels.

Figure 2B:
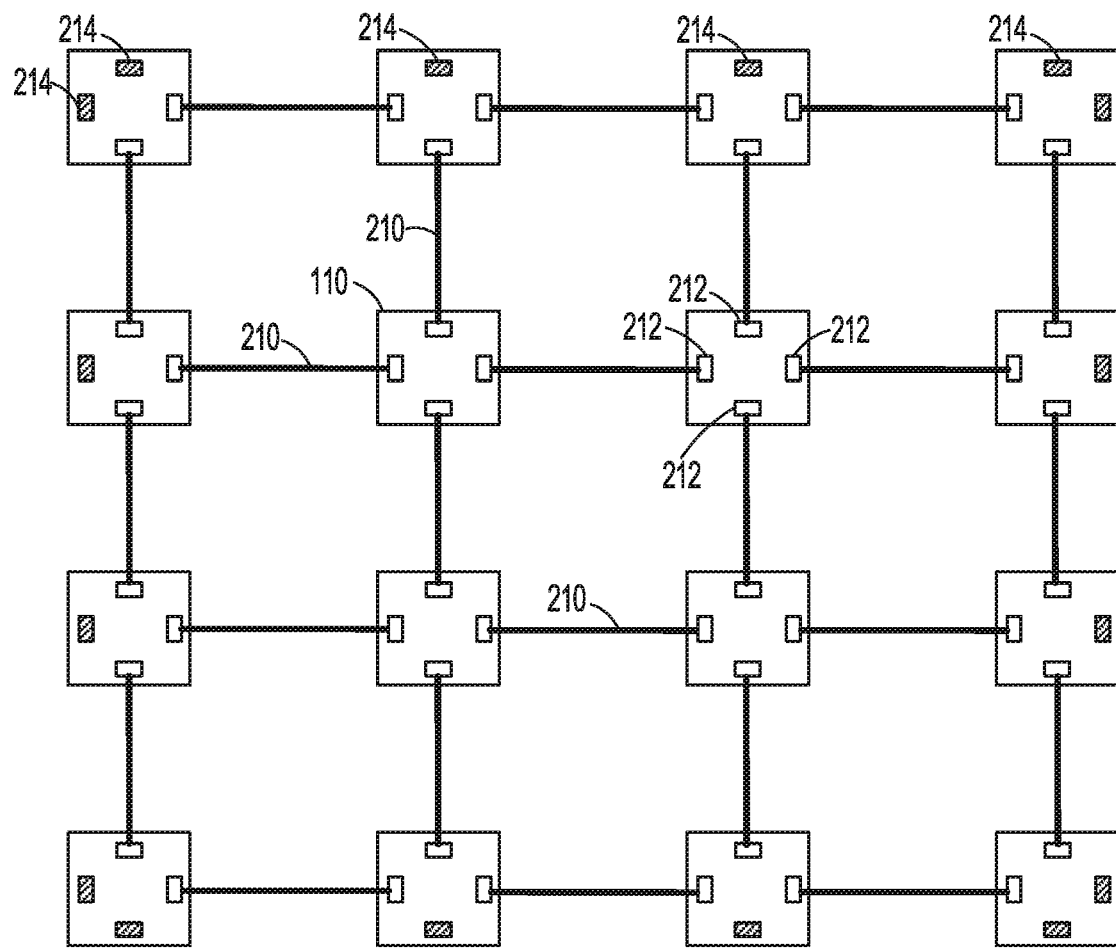
FIG. 2B is a diagram illustrating an example configuration of message routers and photonic channels in an electro-photonic network, according to some embodiments.

FIG. 2B is a diagram illustrating an example configuration of message routers 110 and photonic channels 210 in an electro-photonic network (such as, e.g., network 130 shown in FIG. 1B), according to some embodiments. In this example, the routers 110 (like the processing elements, or tiles, 104 of which they are part according to FIG. 1B) are arranged in a two-dimensional, quadrilateral (more specifically, rectangular) array or grid, and the routers 110 of any two tiles that are immediately next to each other in either dimension (e.g., horizontally or vertically in FIG. 2B) are connected by a bidirectional channel 210. Accordingly, each router 110 in the interior of the array includes four photonic-channel interfaces 212 to four respective bidirectional photonic channels 210, one for each of four directions that may be referred to as "north," "east," "south," and "west." Along the periphery of the array, the routers 110 need only have two (at the corners) or three (at the edges between corners) photonic-channel interfaces 212. However, as shown, the routers 110 along the periphery may, optionally, be equipped with four photonic-channel interfaces as well, e.g., as a result of using the same circuit design for all tiles 104, which simplifies manufacturing. Moreover, in some embodiments, the photonic-channel interfaces 214 along the periphery of the array may be used to establish inter-chip connections to other SIPs.

The electronic message routers 110 can be used to route messages to destination addresses using various addressing schemes. Regardless of the addressing scheme, the messages from tile to tile may be transferred primarily or exclusively through the electro-photonic network via photonic channels in the PIC 102 (with optical-to-electrical and electrical-to-optical conversions at each router along the path), as opposed to via electrical interconnections on the EIC 101. In one implementation, a signed 5-bit packet data (e.g., extracted from the header or, alternatively, the payload of the message) provides the relative location (or distance) in the horizontal direction (east/west) to a destination tile, while another signed 5-bit packet data provides the relative location (or distance) in the vertical direction (south/west) to the destination tile. Of course, packet data of different size (number of bits) may also be used, depending, e.g., on the number of tiles and resulting size of the address space. As the message traversers routers 110 in different tiles, either the horizontal or vertical coordinate is decremented for each hop, depending on along which dimension the message is being transferred. When both 5-bit packet data providing the directions to the destination tile become zero, the message has arrived at the destination tile and is forwarded to the local port 206 of the router in that tile for processing. In some cases, the messages are used to carry read and write memory transactions between tiles.

While the paths carrying data between the tiles are photonic paths implemented, for example, by optical waveguides on the PIC 102, path-setup packet data may be provided in electronic form for use by the message routers 110. Moreover, even for same-tile message routing, path-setup packet data may be used to determine paths that can be either photonic paths or electrical paths. Thus, various embodiments employ a hybrid approach, where both electronics and photonics elements are used in a hybrid electro-optical network-on-chip (EP-NoC) architecture to determine destinations, set up delivery paths, and deliver messages to the destination.

SIPs with electro-photonic networks as described above lend themselves to the efficient execution of ML models, such as neural networks. A neural network includes a plurality of nodes (herein also referred to as a "neural node" to distinguish them from the nodes of the electro-photonic network) generally organized into layers, including an input layer, one or more hidden layers, and an output layer. In the hidden layers and the output layer, each neural node is a computational unit that has as inputs a set of weights and an input activation from another node (e.g., of a previous layer), and that implements a transfer function that combines the weights and the activations in a predetermined manner according to the ML model, resulting in an output activation.

Data flows between the nodes of an ML model in a deterministic fashion. Furthermore, the weights associated with the nodes, which are adjustable parameters of the model, are generally determined during model training, and remain fixed during inference calculations, when the trained model operates on inputs to generate outputs. When executing an ML model on an ML processor or ML accelerator as described herein, these characteristics allow minimizing data movement by mapping the ML model onto the electro-photonic network via fixed assignments of neural nodes to processing elements 104, and pre-loading the associated predetermined weights into memory of the processing elements, or tiles, 104. In general, when the ML model is distributed over multiple tiles 104 of the ML processor 100 or ML accelerator, each tile 104 may execute multiple neural nodes, one neural node, or a portion of a neural node that has been parallelized and distributed over several tiles 104. In some examples, each layer of the ML model is implemented by several tiles 104, where each tile 104 implements one or more neural nodes.

In some embodiments, the weights are loaded into memory of the assigned tiles 104 (e.g., L2SRAM 114) only once during initialization of an inference operation by the ML processor 100 or ML accelerator, and thereafter the weights are not moved from tile to tile. The weights may be loaded from a device (e.g., memory) external to the ML processor 100 via the PCIE 122. In one implementation, the PCIE 122 accesses the electro-photonic network 130 of the ML processor through a tile 104 closest to the PCIE 122, and then transfers each weight to its respective destination tile 104 photonically from tile to tile along a (e.g., predetermined) path through the electro-photonic network. In other implementations, during initialization of the ML processor 100, electronic connections existing on the EIC 101 between the tiles 104, instead of photonic channels situated on the PIC 102, are utilized to transfer the weights to each destination tile 104. Regardless of whether the transfer of weights provided through PCIE interface 122 is done primarily photonically or electronically, the transfer and loading into each L2SRAM 114 is performed only once. As such, significant power is saved in that the weights remain stationary in L2SRAM 114 of each tile 104.

Once the ML model has been pre-loaded into the ML processor by storing the weights associated with the neural nodes into L2SRAM 114 of respective tiles 104 assigned to the neural nodes, the ML model can be executed by streaming activations between the neural nodes and performing computations on the streamed activations using the weights stored in L2SRAM 114. Input activations stream to all tiles 104 allocated to neural nodes in the ML model. The processing engines (e.g., DNN 106 and tensor engine 108) within these tiles 104 operate on the input activations and the pre-loaded weights to compute output activations of the neural nodes. For example, the DNNs 106 may perform MAC operations, and the tensor engines 108 may implement non-linear activation functions operating on the results of the MAC operation, but other distributions of the computations between one or more processing engines in each tile 104 are also possible. The output activations generated in a tile 104 for a given neural node are then sent to the tile(s) 104 implementing the next node(s) in the ML model (e.g., within the next layer of the neural network) as their input activations. Activations flowing between neural nodes implemented in the same tile 104 are exchanged via the memory of that tile, whereas activations that move between tiles 104 are sent over the photonic fabric. In embodiments where each neural node is implemented by one respective tile 104 of the electro-photonic network, the tile network topology will closely mirror the ML model (or the ML graph topology).

As activations are streamed from originating tiles into destination tiles through the electro-photonic network, the address of the destination tile for each output activation is generally determined by the electronic message router 110 of the originating tile of that activation, e.g., according to a path set up during initialization of the ML model. The address may be provided as packet data as part of the message that carries the output activation as payload. In one implementation, the address is in the header of the message, and in another implementation the address is encoded into the message itself (as a portion of the payload). The address contained in the message is used by message routers along the path through the electro-photonic network to route the output activation to the destination tile. In some embodiments, as described above, a relative addressing scheme is employed.

In typical ML models, the number of weights is far greater than the number of activations. For current ML workloads, the ratio of the number of weights to the number of activations is often in the range from approximately 20 to 1 to approximately 60 to 1. Thus, keeping the weights stationary saves a substantial amount of energy, even though the activations are streamed from tile to tile. Furthermore, in some beneficial embodiments, the L2SRAM 114 is physically laid out in close proximity to the DNN 106 and tensor engine 108, which reduces the interconnect distance through which the weights travel locally within each tile, thus reducing the capacitance associated with the related interconnect length and reducing the energy loss associated with such interconnect capacitance. Additionally, from the above description, it is apparent that activations that stream from originating nodes in one title to destination nodes in another tile, e.g., over relatively long distances, traverse primarily through optical paths provided by the PIC 102, while activations that stream within the same tile, e.g., over relatively short distances, use electrical paths provided by the EIC 101. In this manner, reliance on electrical interconnections for long haul-data movement is virtually eliminated, which significantly lowers the energy expended in association with the electrical interconnect capacitance. In other words, by streaming activations from tile to tile photonically, significant power savings can be achieved. In sum, using an ML processor or ML accelerator as described herein, data movements are in part minimized (in the case of weights), and rely in part on power-efficient tile-to-tile data transfer via photonic connections (in the case of activations). In addition to providing the benefit of power saving, using the photonic fabric for data transfer can reduce latency and provide higher bandwidth.

Figure 3:
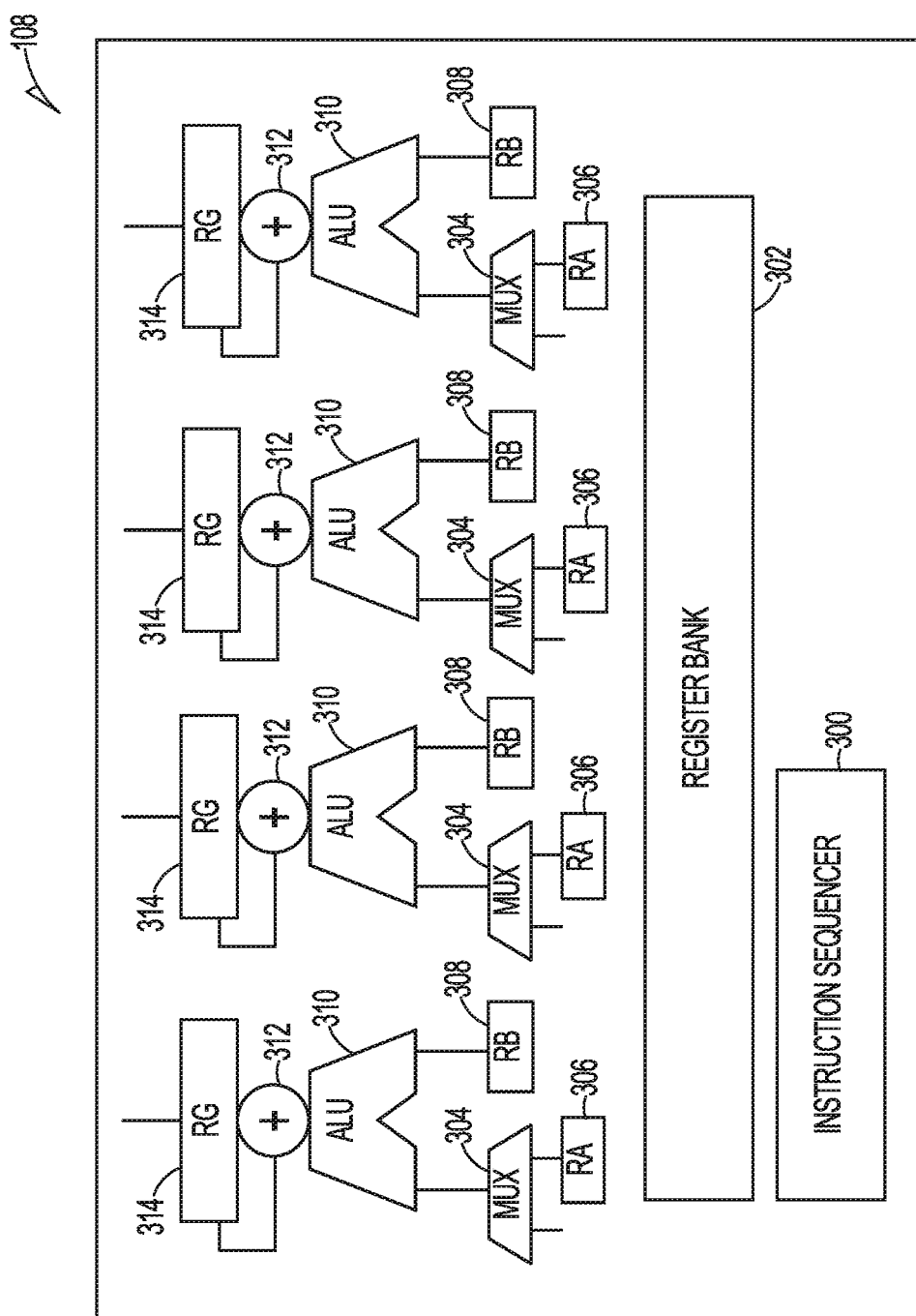
FIG. 3 is a diagram illustrating an example tensor engine as may be used within an electronic processing element as shown in FIG. 2A, according to some embodiments.

FIG. 3 is a diagram illustrating an example tensor engine 108 as may be used within an electronic processing element 104 as shown in FIG. 2A, according to some embodiments. Each tensor engine 108 may be assigned to perform a portion of, for example, inference calculations for a specific machine learning model implemented by the SIP 100, serving as ML processor. Tensor engines 108 in the different processing elements 104 of the ML processor 100 can perform the machine learning tasks in parallel or in sequence. ML computations of ML processor may be performed in one or more tensor engines 108, forming a data flow between the tensor engines.

Various implementations for tensor engine 108 can be used without departing from the scope of the present application. In one example, as shown in FIG. 3, the tensor engine 108 includes an instruction sequencer 300, a register bank 302, multiplexers 304, Ra registers 306, Rb registers 308, arithmetic logic units (ALUs) 310, adders 312, and Rg registers 314. The tensor engine 108 uses instruction sequencer 300 to perform register write, accumulate, and register read operations in a manner known in the art. For example, the tensor engine 108 may write two values to the Ra register 306 and Rb registers 308, accumulate them with the aid of the ALU 310, and save the result in the Rg register 314. Thereafter, two more values are written into the Ra register 306 and Rb register 308, are accumulated with the aid of the ALU 310, read from the ALU 310, and added to the previous content in the Rg register 314 and written into the Rg register 314. This routine may repeat again, for example, up to 32 times to generate a 32-bit output from each output register of the tensor engine 108.

The tensor engine 108 is a single instruction multiple data (SIMD) processor using an instruction set that may be purpose-designed, in some embodiments, for execution of machine learning algorithms. While data movement between the different tensor engines 108 can be done electronically or photonically, in a preferred implementation, data movement between tensor engines 108 in different processing elements 104 is performed photonically, while data movement within the same tensor engine 108 is performed electronically. The tensor engine includes an interface to the local port 206 of the message router 110, which allows it to communicate with the PIC 102.

Figure 4:
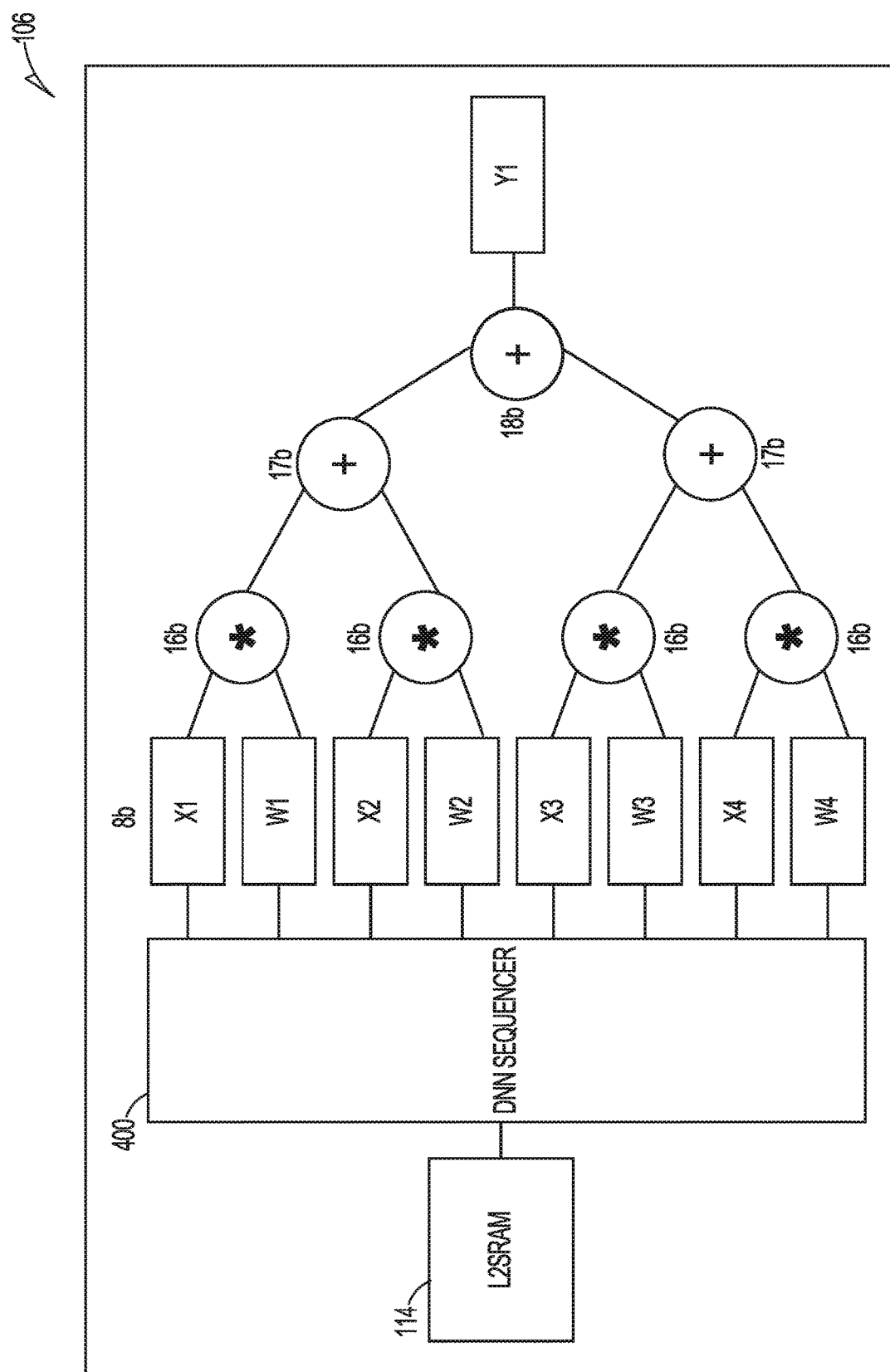
FIG. 4 is a diagram illustrating an example digital neural network (DNN) as may be used within an electronic processing element as shown in FIG. 2A, according to some embodiments.

FIG. 4 is a diagram illustrating an example DNN 106 as may be used within an electronic processing element 104 as shown in FIG. 2A, according to some embodiments. Though the example DNN of FIG. 4 is described with respect to DNN 106 of the SIP 100, for some embodiments, the illustrated DNN can form part of hardware implemented in other environments (e.g., as a component of other types of processors). As used herein, a DNN can also be referred to as a neural compute engine (NCE) or a dot product engine. Depending on the embodiment, a DNN can be implemented by one or more portions of a hardware circuit configured to generate (e.g., compute) one or more dot products (e.g., dot product values) based on at least two vectors. For example, the at least two vectors can be constructed from a set of weight values and operand values (e.g., activation values).

Referring now to FIG. 4, an embodiment of a portion of the DNN 106 situated in the EIC 101 of SIP (e.g., ML processor) 100 is shown. The DNN 106 is essentially a combinatorial tree of multipliers and adders that computes in hardware the dot product of a set of weights and operands (for example, activations from a previous node) without latching data during any operation. As such, the DNN 106 has very few registers and expends significantly less power by specializing in doing only certain predetermined routines without performing register transfer operations and without latching data. In the DNN 106, the pre-loaded weights are fetched from L2SRAM 114, and a DNN sequencer 400 provides the weights (e.g., weight values) and operands (e.g., operand values) to the top of the combinatorial tree. For example, weights W1, W2, W3, and W4 are provided to the top of the tree as shown in FIG. 4. Operands (for example, activations from a previous node) X1, X2, X3, and X4 are also provided to the top of the tree.

In some embodiments, each weight W1, W2, W3, and W4 and each operand X1, X2, X3, and X4 consists of 8 bits. Weights W1, W2, W3, and W4 are multiplied with respective operands X1, X2, X3, and X4. The result of each operation is a 16-bit product. As shown in FIG. 4, two 16-bit products are added to form a 17-bit sum. At the next level, two 17-bit products are added to form an 18-bit sum and so on for further levels of addition. The calculated dot product is then added into a 32-bit accumulator so that a sequence of dot products can be accumulated without losing precision. A pipelined implementation of the combinatorial tree can be constructed to re-time the data as it flows through the combinatorial tree. In some embodiments, seven pipeline stages are used. As stated above, the DNN 106 saves significant power during dot product calculations. For comparison, using 7 nm CMOS Fin-FET, a single dot product calculation performed by the tensor engine 108 in FIG. 3 may cost approximately two hundred and fifty femto-Joules (250 fJ) of energy. In contrast, a single dot product calculation performed by the DNN 106 in FIG. 4 may cost approximately only one hundred and thirty femto-Joules (130 fJ) of energy.

Figure 12:
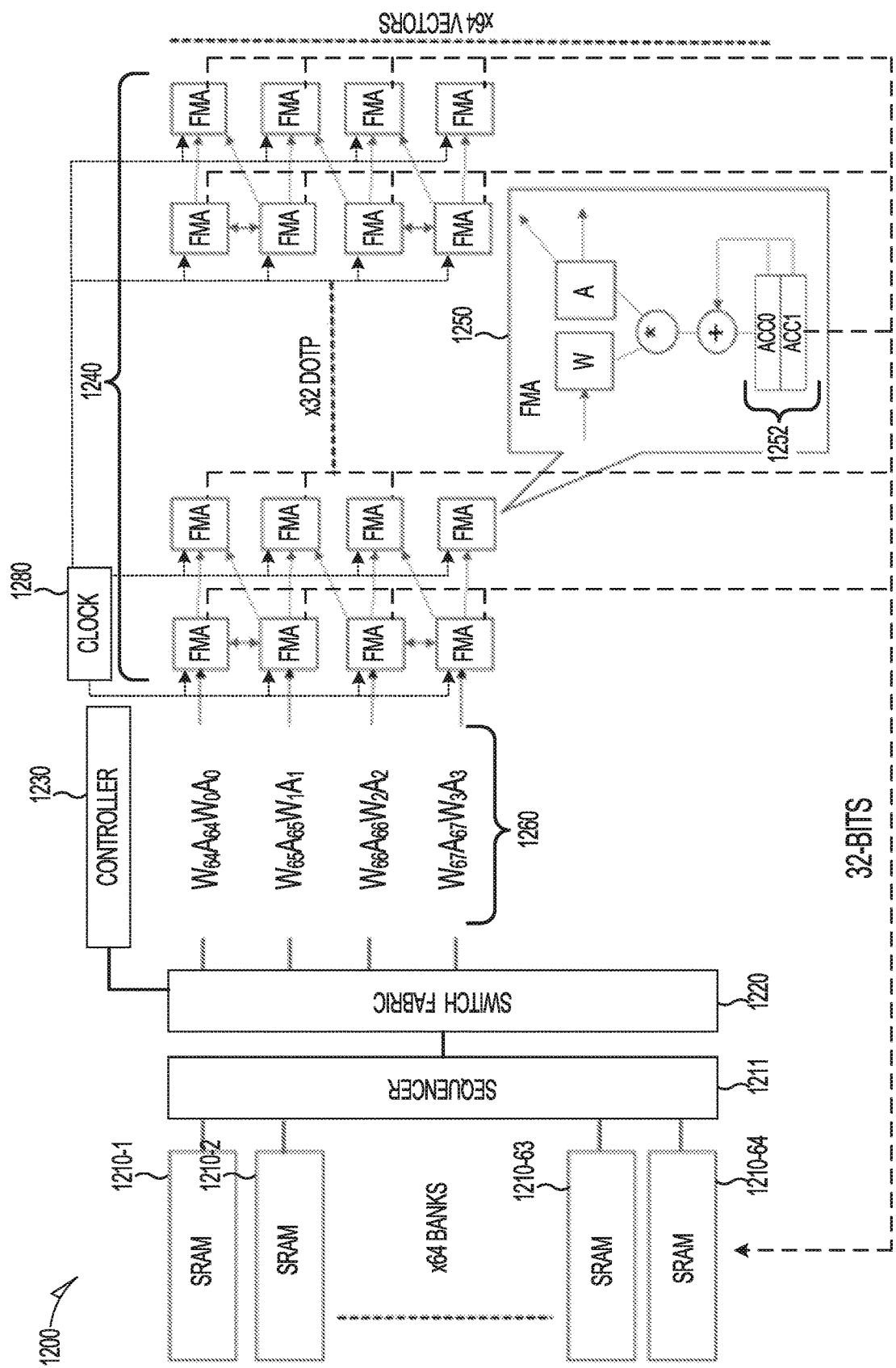
FIG. 12 is a diagram illustrating an example architecture of a DNN, according to some embodiments.

More regarding various embodiments of the DNN is illustrated and described with respect to FIG. 12.

Figure 5A:
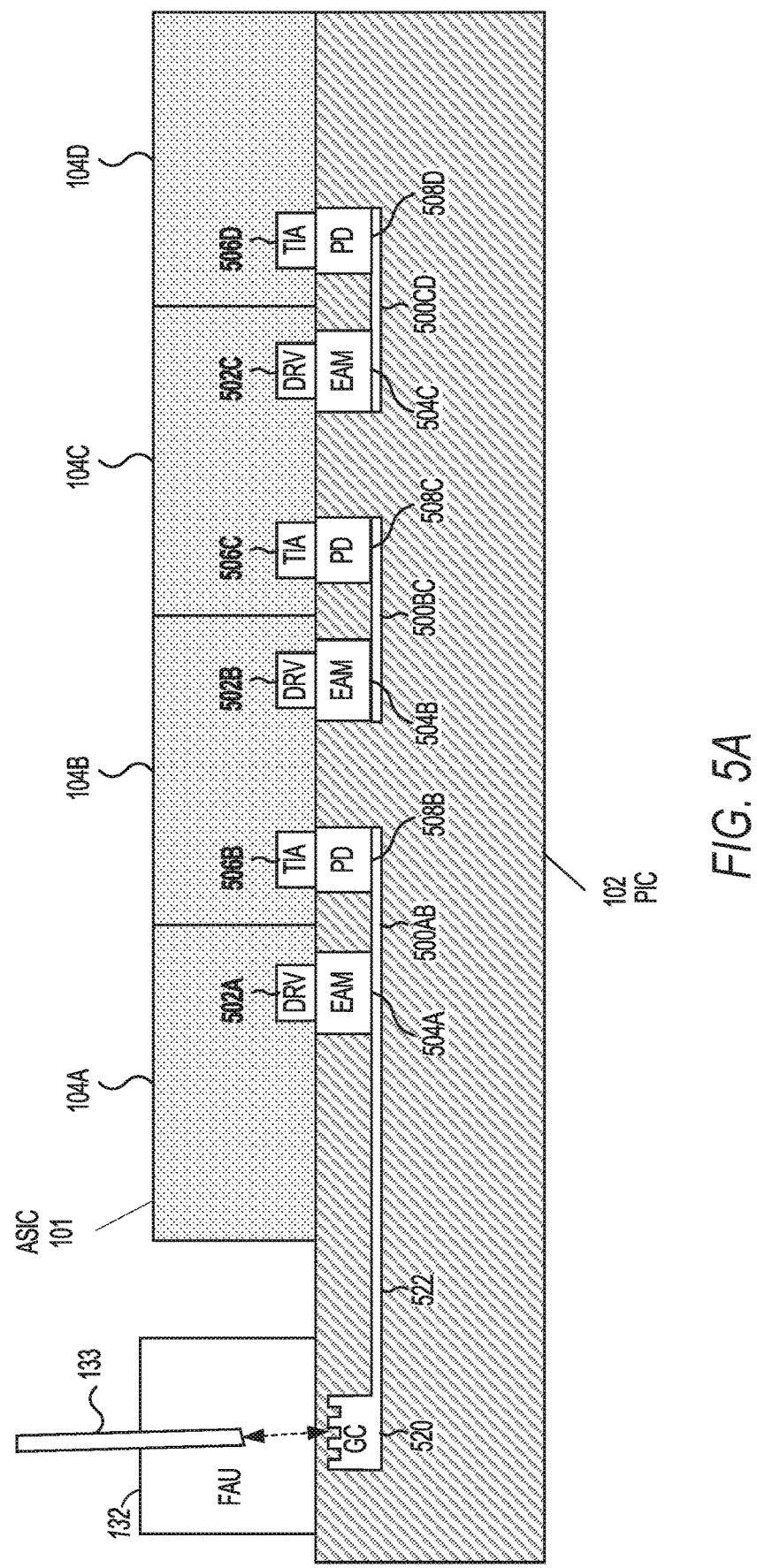
FIG. 5A is a diagram illustrating, in a side view, an example implementation of photonic and electronic components of an electro-photonic network, according to some embodiments.

FIG. 5A is a diagram illustrating, in a side view, an example implementation of photonic and electronic components of an electro-photonic network, according to some embodiments. The EIC (e.g., ASIC) 101 is shown as being situated over the PIC 102. Multiple tiles (processing elements) 104A, 104B, 104C, and 104D within the EIC 101 are indicated, along with optical links between adjacent pairs of tiles, implemented using waveguides 500AB, 500BC, 500CD in the PIC 102 beneath. Also shown are the EO and OE interface components associated with the tiles and optical links therebetween. As shown, the EO interface components include modulator drivers 502A, 502B, 502C situated, respectively, in EIC tiles 104A, 104B, 104C, along with modulators (e.g., EAMs) 504A, 504B, 504C situated in the PIC 102 directly below the respective modulator drivers 502A, 502B, 502C. The OE interface components include TIAs 506B, 506C, 506D situated, respectively, in EIC tiles 104B, 104C, 104D, and photodetectors (PDs) 508B, 508C, 508D situated in the PIC 102 directly below the respective TIAs 506B, 506C, 506D. The optical waveguides 500AB, 500BC, 500CD each connect an optical modulator 504A, 504B, 504C associated with one tile with a photodetector 508B, 508C, 508D associated with an adjacent tile, thereby providing optical links in PIC 102 for intra-chip communication between the respective pairs of tiles within the ML processor 100.

Avoiding lateral displacement between the PIC-side and EIC-side components of the EO and OE interfaces (e.g., by placing the modulator drivers directly above the modulators and the TIAs directly above the photodetectors) minimizes the distance between the components in each interface; in some embodiments, the distances between the modulators and their associated drivers and between the photodetectors and their associated TIAs are minimized such that the speed of signal conversion between the electrical and the optical domains, and vice-versa, is maximized. Typically, the spacings are less than 200 µm, although the spacing can vary depending on the nature of the embodiment, the configuration of the OE and EO interface components, the demands and architecture of the system, the temperature of the system, and the like. In one embodiment, placement of the PIC-side and EIC-side components in close association has beneficial thermal properties toward the PIC-side components. Since the EIC-side is a heat sink which can radiate heat toward the PIC-side components, this in turn can cause increased thermal stability of components on the PIC side due to the added heat. Minimizing the distances between the PIC-side and EIC-side components, in turn, minimizes power consumption for the signal conversion between the optical and electrical domains, which is important for the overall power-efficiency of data movement over a hybrid electro-photonic network as described herein. Moreover, in some examples, it is beneficial when there is heat generated from components (such as a modulator driver or other functional block) in the EIC which are placed directly above or in close association to the EAM on the PIC. In this scenario, heat radiating from the EIC side can raise the operating temperature of the EAM or otherwise promote thermal stability in an enhanced manner, and/or bring the EAM closer to a peak efficiency or closer to an optimal operating range.

Also shown in FIG. 5A are optical coupling structures as may be used to establish fiber-optic connections between the SIP (or ML processors) 100 and other devices. An optical fiber may be coupled to the PIC 102 using edge coupling. Alternatively, as depicted in FIG. 5A, the optical fiber 133 may be attached to the PIC 102 via an FAU 132, and light may be coupled between the FAU 132 and the PIC 102 using a grating coupler 520 formed in the PIC 102 directly beneath the FAU 132. The optical fiber 133 may be connected to an off-chip laser light source, or to the FAU of another SIP (ML processor), that provides optical input to the PIC 102. The light received via the grating coupler 520 can then be supplied to the modulators 506A, 506B, 506C in the PIC 102 via optical waveguides. In the cross-sectional view of FIG. 5A, only a waveguide 522 to EAM 506A is visible, but in the top view of FIG. 5B, the optical connections between the grating coupler 520 and all EAMs, including EAMs 506B and 506C, can be seen.

Figure 5B:
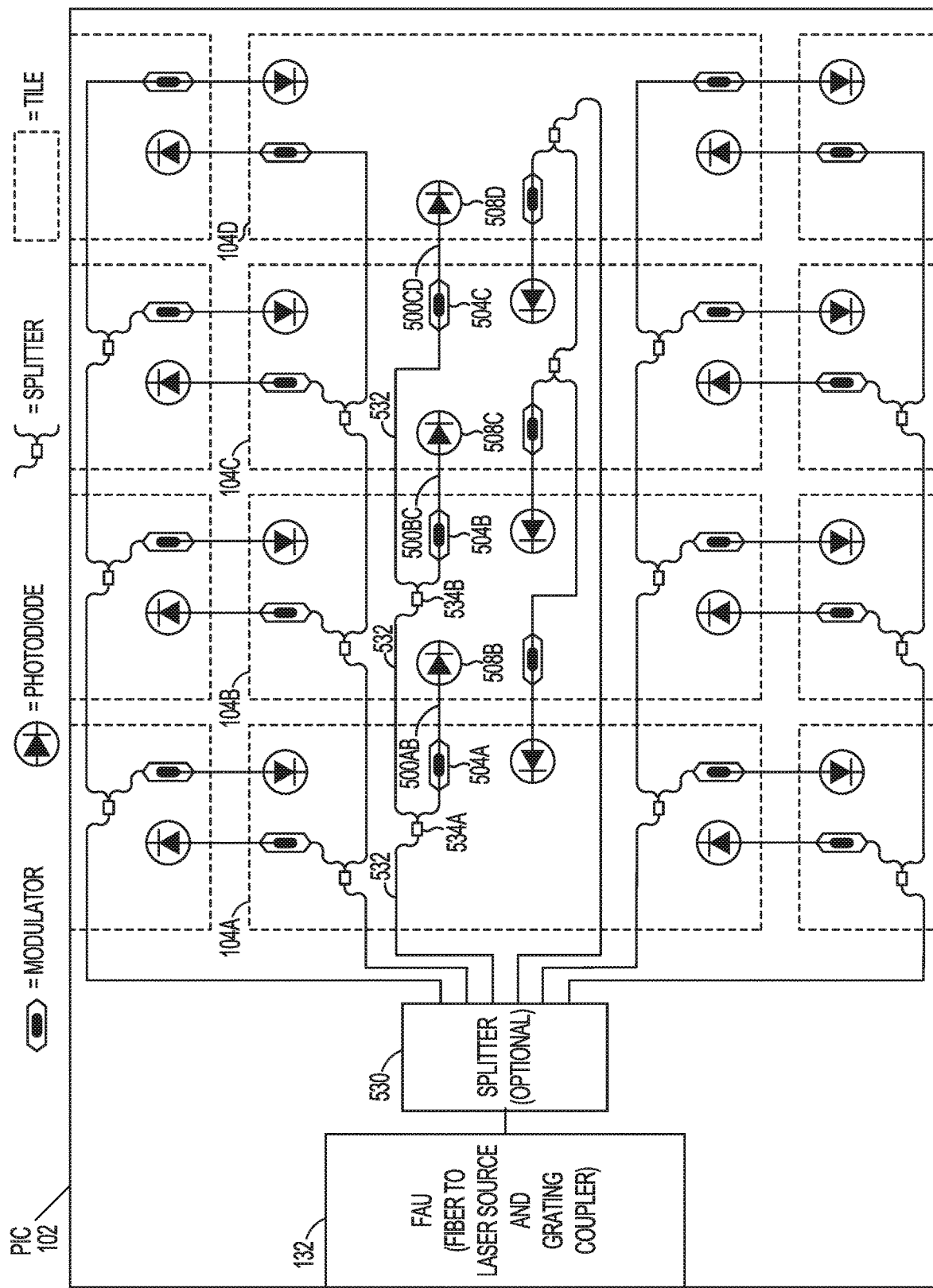
FIG. 5B is a diagram illustrating, in top view, a photonic integrated circuit (PIC) of the example electro-photonic network of FIG. 5A, according to some embodiments.

FIG. 5B is a diagram illustrating, in top view, a PIC 102 of the example electro-photonic network of FIG. 5A, according to some embodiments. The locations of the tiles of the EIC 101 relative to the PIC 102 are indicated by dashed lines. For each pair of adjacent tiles (whether they are adjacent horizontally or vertically), the PIC 102 provides two unidirectional photonic links, each including an optical modulator (defining the input end of the photonic link), a photodetector (defining the output end of the photonic link), and a waveguide directly connecting the modulator to the photodetector. For example, waveguide 500AB connects modulator 504A associated with tile 104A to photodetector 508B associated with tile 104B. The two photonic links between any given pair of tiles are oriented in opposite directions, and collectively form a bidirectional photonic channel in accordance herewith. Note that, while only one unidirectional photonic link in each direction is shown in FIG. 1B, a photonic channel may generally include multiple links in each direction (e.g., together forming bonding group) to increase the bandwidth for data transfer across the channel. Within a tile (or, more specifically, a router within the tile), a photonic-channel interface to a certain bidirectional photonic channel in the PIC includes an optical driver for each outgoing photonic link of that bidirectional channel (with which the router interfaces at the input end of the link) and a TIA (and associated circuitry) for each incoming photonic link of the bidirectional photonic channel (with which the router interfaces at the output end of the link).

The PIC 102 receives an optical carrier signal from a laser light source. In some embodiments (not shown) the light source is integrated in the PIC. In other embodiments, the light source is implemented externally to the PIC, and provides light to the PIC, e.g., via edge coupling, or via optical fiber connected to an FAU 132 and a grating coupler in the PIC. From the FAU 132 and grating coupler, or any other point of input to the PIC, one or more optical input waveguides guide the carrier signal to the optical modulators of the bidirectional photonic channels, where the carrier signal is modulated to impart respective messages onto the optical signal for transmission via the photonic channels. In some embodiments, as shown, the carrier signal is divided, by an optical splitter 530, between multiple optical input waveguides, e.g., one waveguide each for the photonic links directed north, east, west, and south for each row of tiles in the EIC. Along each input waveguide, additional splitters may successively branch of light to be input to different modulators. For instance, as depicted, waveguide 532 provides the carrier signal to splitter 534A in tile 104A, where the light is split between an optical path to the modulator 504A of that tile and another optical path guides the light through a continuation of waveguide 532 to splitter 534B in tile 104B. From splitter 534B in tile 104B, the carrier light is provided along one optical path to modulator 504B of tile 104B and along another optical path through a further continuation of waveguide 532 to modulator 504C in tile 104C.

As shown in FIGS. 5A and 5B, in one implementation, all or most of tile-to-tile communication, for example the streaming of activations from a first node in a first tile to a second node in a second tile, is performed using the photonic channels in the PIC 102 by employing modulators (e.g., EAMs) and photodetectors in the PIC 102 that are placed directly below their respective modulator drivers and TIAs on the EIC 101. The modulators and PDs are connected optically, e.g., by waveguides in the PIC 102. Thus, in one implementation, all or most of tile-to-tile communications are not performed electrically within the EIC 101 but are performed optically using the photonic fabric provided by PIC 102.

As noted above, the electro-photonic networks of multiple SIPs as described herein can be connected, via optical couplers on the PICs and an optical transmission medium between the optical couplers of different SIPs, into a larger electro-photonic network. The transmission medium may be an optical fiber, such as an multi-fiber termination push-on (MTP) ribbon fiber connection (up to twenty meters). Other transmission media are also possible, such as integrated optical waveguides (e.g., in a separate PIC configured to provide an optical interconnect structure between the SIPs) or free-space transmission (e.g., employing imaging optics to couple light from an output of one PIC to an input of another PIC). In the case where a grating coupler is used to capture light, the grating coupler can be configured to cause the light to exit the PIC at a pre-defined angle associated with the angle of the fiber so as to minimize the loss of light. In other embodiments, various types of waveguides are possible, including diffraction gratings such as an Echelle grating, and others. Messages between the tiles of all EICs within such a multi-package system may be exchanged via the photonic fabric implemented by the PICs and optical interconnects therebetween, regardless of whether a message is sent on-chip/intra-chip (meaning within a single SIP) or off-chip/inter-chip (meaning a tile in one SIP to a tile in another SIP). According to various embodiments described herein, on-chip and inter-chip optical communications may differ, however, in that on-chip communications are generally performed using single wavelength light, whereas inter-chip communications between different SIPs in the larger system (e.g., different ML processors in the ML accelerator) are often performed using wavelength division multiplexing (WDM), which serves to reduce the number of fiber connections required between the different chips (e.g., the different ML processors). Note that, in some embodiments, multiple wavelengths are also sed for on-chip optical communications, and conversely, single-wavelength communications may, in principle, also be used for off-chip communications.

FIG. 6A is a diagram illustrating an example group of photonic links connecting two processing elements within an SIP, according to some embodiments. For intra-chip optical communication, a light engine 600, which can be an on-chip or off-chip laser light source, outputs carrier light at a single wavelength $2al$. A splitter tree 602 may divide the light, having wavelength $2al$, between multiple optical paths 604 (only one being shown) leading to the modulators associated with different tiles and photonic channels. Along each of these paths 604, the light may be further split between a group of modulators 610, 612, 614, 616 associated with a group of unidirectional photonic links in the same direction that are bonded together to form a bonding group, corresponding to a unidirectional photonic channel from one tile in the SIP to another; two such unidirectional photonic channel between the same pair of tiles of the SIP form an intra-chip bidirectional photonic channel. The modulators 610, 612, 614, 616 (e.g., EAMs) modulate the light having the single wavelength $2al$, and transmit the modulated light via respective waveguides 620, 622, 624, 626 to photodetectors 630, 632, 634, 636, which are situated in a different tile of the same chip.

Figure 6B:
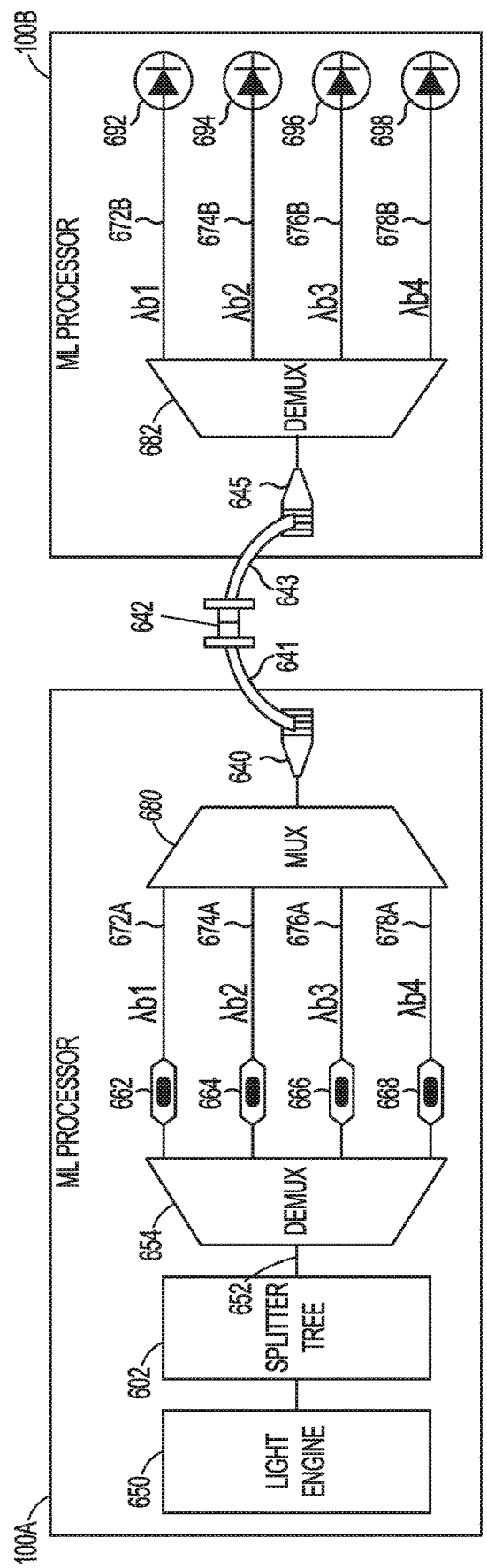
FIG. 6B is a diagram illustrating an example system of two SIPs that use wavelength-division multiplexing (WDM) for inter-chip optical communications, according to some embodiments.

FIG. 6B is a diagram illustrating an example system of two SIPs 100A, 100B that use WDM for inter-chip optical communications, according to some embodiments. In the depicted example, the PICS of the SIPs 100A, 100B are connected through a grating coupler 640 in the first PIC, a first optical fiber 641, a fiber connector 642, a second optical fiber 643, and a grating coupler 645 in the second PIC. In the first SIP 100A, a light engine 650, which can be an on-chip or off-chip laser light source, provides light of multiple wavelengths (e.g., between 2 and 16 wavelengths), such as four wavelengths $\lambda b1$, $\lambda b2$, $\lambda b3$, $\lambda b4$ as shown, to the PIC. A splitter tree 602 (e.g., similar to that of FIG. 6A) may divide the light at the multiple wavelengths between multiple optical paths 652 (only one being shown) leading to different tiles of the SIP 100A and/or to the optical modulators associated with different photonic-channel interfaces within the tiles. For example, the carrier light at the wavelengths $\lambda b1$, $\lambda b2$, $\lambda b3$, $\lambda b4$ may be provided to the optical modulators associated with multiple peripheral photonic-channel interfaces, such as the interfaces 214 shown in FIG. 2B.

Along each of these paths 652, a demultiplexer 654 separates the wavelengths $\lambda b1$, $\lambda b2$, $\lambda b3$, $\lambda b4$ between different respective modulators (e.g., EAMs) 662, 664, 666, 668. The modulators 662, 664, 666, 668 modulate the carrier light at the wavelengths $\lambda b1$, $\lambda b2$, $\lambda b3$, $\lambda b4$, and provide the modulated optical signals having respective wavelengths $\lambda b1$, $\lambda b2$, $\lambda b3$, $\lambda b4$ on optical links 672A, 674A, 674A, 678A to a WDM multiplexer 680. The multiplexed output of the WDM multiplexer 680, which contains four data streams each encoded on a separate wavelength $\lambda b1$, $\lambda b2$, $\lambda b3$, $\lambda b4$, is provided on a single waveguide to the grating coupler 640, where the multiplexed modulated optical signal is coupled off-chip to the fiber 641.

At the fiber connector 642, the multiplexed modulated optical signal is coupled from the fiber 641 into a second fiber 643. The second fiber 643 couples the multiplexed modulated optical signal via the grating coupler 645 into the PIC of the second SIP 100B. In some other implementations edge, coupled fibers may be used in lieu of or in addition to FAUs and grating couplers. In the SIP 100B, a demultiplexer 682 then demultiplexes the multiplexed modulated optical signal, outputting four separate modulated signals having wavelength $\lambda b1$, $\lambda b2$, $\lambda b3$, $\lambda b4$. These four signals are provided, via respective optical waveguides 672B, 674B, 676B, 678B, to photo diodes 692, 694, 696, 698 in SIP 100B. Collectively, the modulators 662, 664, 666, 668, waveguides 672A, 674A, 676A, 678A, multiplexer 680, and grating coupler 640 in the PIC of SIP 100A, the fiber-optic connection (641, 642, 643) between the SIPs 100A, 100B, and the grating coupler 645, demultiplexer 682, waveguides 672B, 674B, 676B, 678B, and photodetectors 692, 694, 696, 698 in the PIC of SIP 100B form a unidirectional photonic channel between tiles of different SIPs; two such unidirectional photonic channel between the same pair of tiles of the SIPs form an inter-chip bidirectional photonic channel.

Although the implementation discussed above is directed to a photonic channel showing four optical links in one direction and a WDM multiplexer receiving four different wavelengths, in other implementations, two or more optical links and a WDM multiplexer receiving two or more different wavelengths may be used. The demultiplexer would, accordingly, output two or more different wavelengths corresponding to these alternative implementations.

Using intra-chip and inter-chip photonic channels, e.g., as described above, generally including one or more links per direction, the processing elements (tiles) in the EIC(s) of one or more SIPs can be connected into electro-photonic networks. The resulting network topology generally depends on the selection of pairs of tiles that are directly connected via an associated photonic channel; various example topologies are described below with reference to FIGS. 7-9. Note that, while this disclosure generally refers to bidirectional photonic channels, which, as compared with unidirectional photonic channels, result in network structures providing greater flexibility for implementing ML and other computational models, electro-photonic networks can in principle also be formed with unidirectional photonic channels, and such networks may retain many of the benefits discussed herein (e.g., power savings due to photonic data transfer over longer distances).

Figure 7:
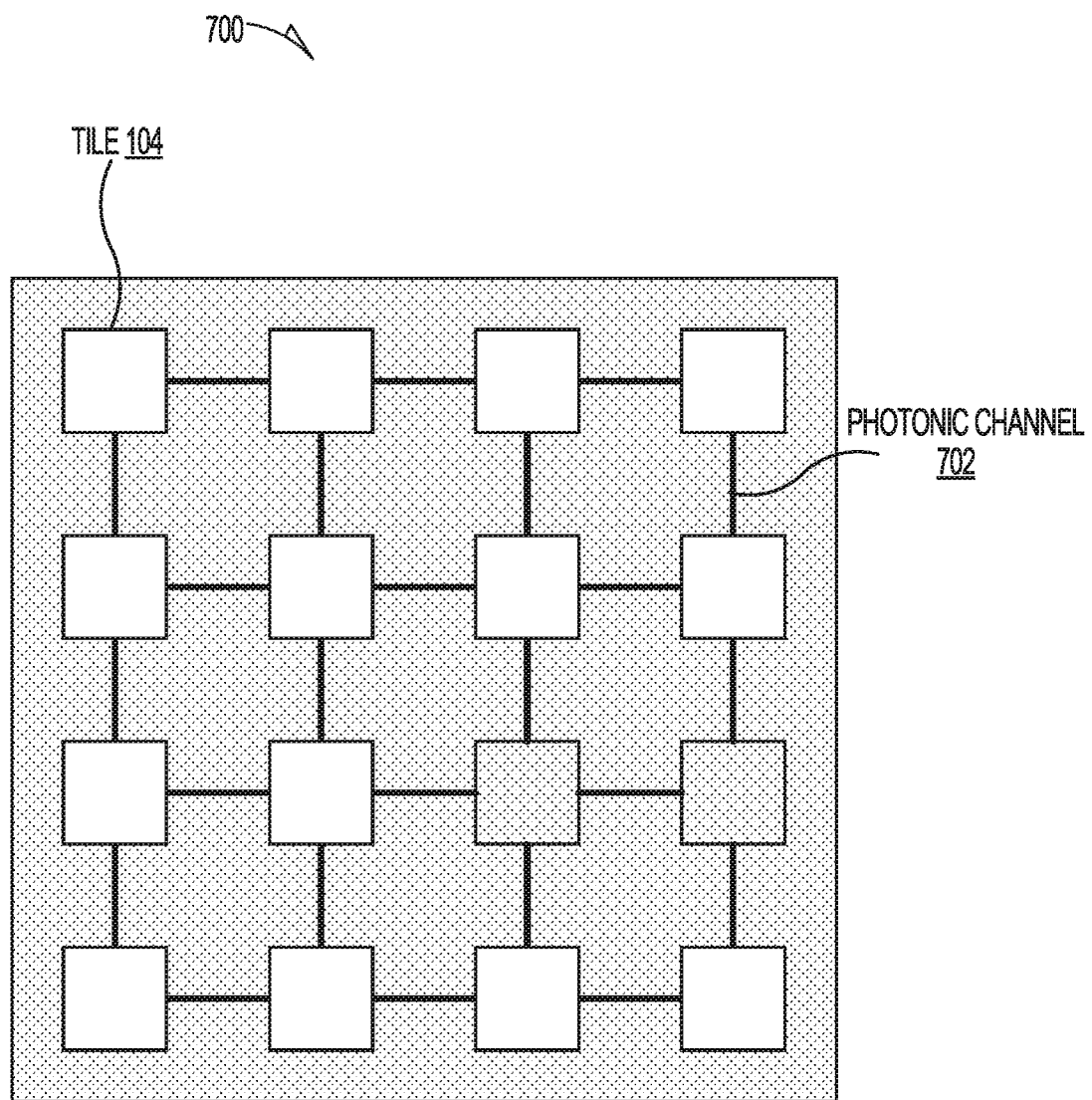
FIG. 7 is a diagram illustrating an example electro-photonic network with a quadrilateral mesh topology, according to some embodiments.

FIG. 7 is a diagram illustrating an example electro-photonic network 700 with a quadrilateral mesh topology, according to some embodiments. This topology is also shown for the SIP 100 depicted in FIG. 1B. In the depicted example, the network includes sixteen tiles 104 (constituting the network nodes), arranged in a quadrilateral (e.g., as shown, rectangular) grid and interconnected by photonic channels 702 such that the output of each tile can be provided as input to any of its immediately adjacent tiles. In alternative implementations, other network topologies can be supported to provide richer or sparser connectivity, e.g., based on the demands of the particular application. For example, additional photonic channels may be added to skip over network nodes and provide direct paths to non-adjacent nodes, that is, nodes two or more hops away in the rectangular mesh.

Figure 8:
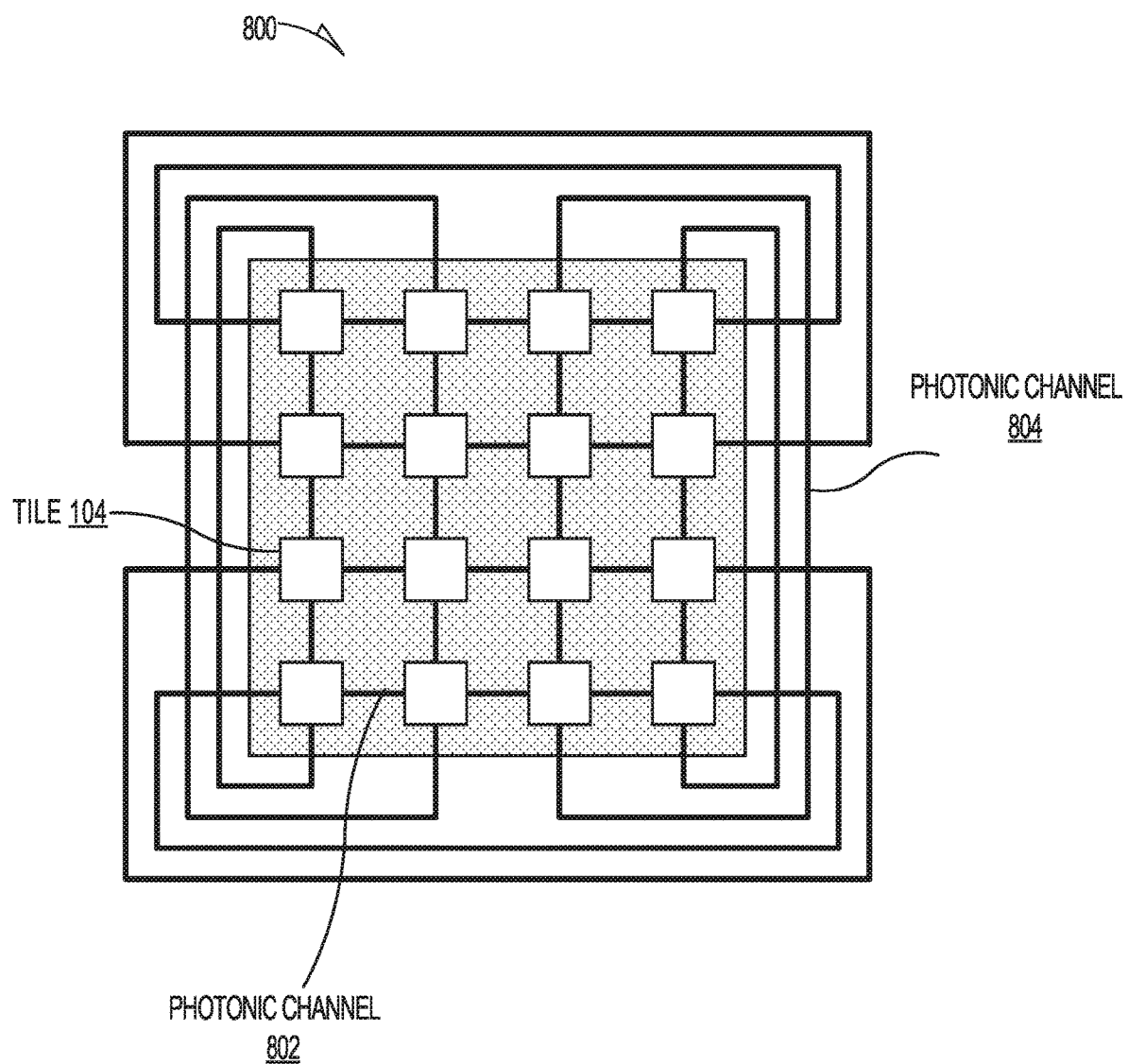
FIG. 8 is a diagram illustrating an example electro-photonic network with a wrapped toroidal mesh topology, according to some embodiments.

FIG. 8 is a diagram illustrating an example electro-photonic network 800 with a wrapped toroidal mesh topology, according to some embodiments. The network 800, like the network 700 in FIG. 7, includes sixteen tiles 104 arranged in a rectangular grid. In this topology, photonic channels 802, 804 between tiles 104 are configured such that the output of each tile 104 can be provided as input to any of its immediately adjacent tiles (as is also the case in the mesh topology of FIG. 7) via photonic channels 802, and that each tile along the periphery of the array can, furthermore, provide its output directly via a photonic channel 804 to a tile on the opposite edge of the grid, that is, the far tile in the same row for tiles arrange along the vertical edges and the far tile in the same column for tiles arranged along the horizontal edges. The resulting wrapped toroid has the beneficial effect of significantly reducing the number of tile-to-tile hops needed to communicate between tiles on opposite sides of the network. For example, without the photonic channels 804, a message sent from a tile on the left edge to a tile on the right edge of the network would traverse an entire row of tiles in the network.

In some embodiments, the wrapped toroidal topology is physically implemented by combining optical links at the edges of the chip into a grating coupler that mates with a fiber attach unit, or alternatively into an edge coupler, to provide connection for an array of fibers assembled into a ribbon fiber. The ribbon fiber can be designed to allow arbitrary topologies of optical links to be constructed using patch fibers. The patch fibers allow the connections from one side of the PIC to wrap around and form the wrapped toroid. Alternatively, to using optical fiber, it is also possible to implement the photonic channels 804 that connect tiles on opposite edges as optical waveguides within the PIC. Optionally, to avoid waveguide crossing between the photonic channels 804, waveguides connecting tiles on opposite ends of the same row may be implemented in a layer separate from waveguides connecting tiles on opposite ends of the same column.

Figure 9:
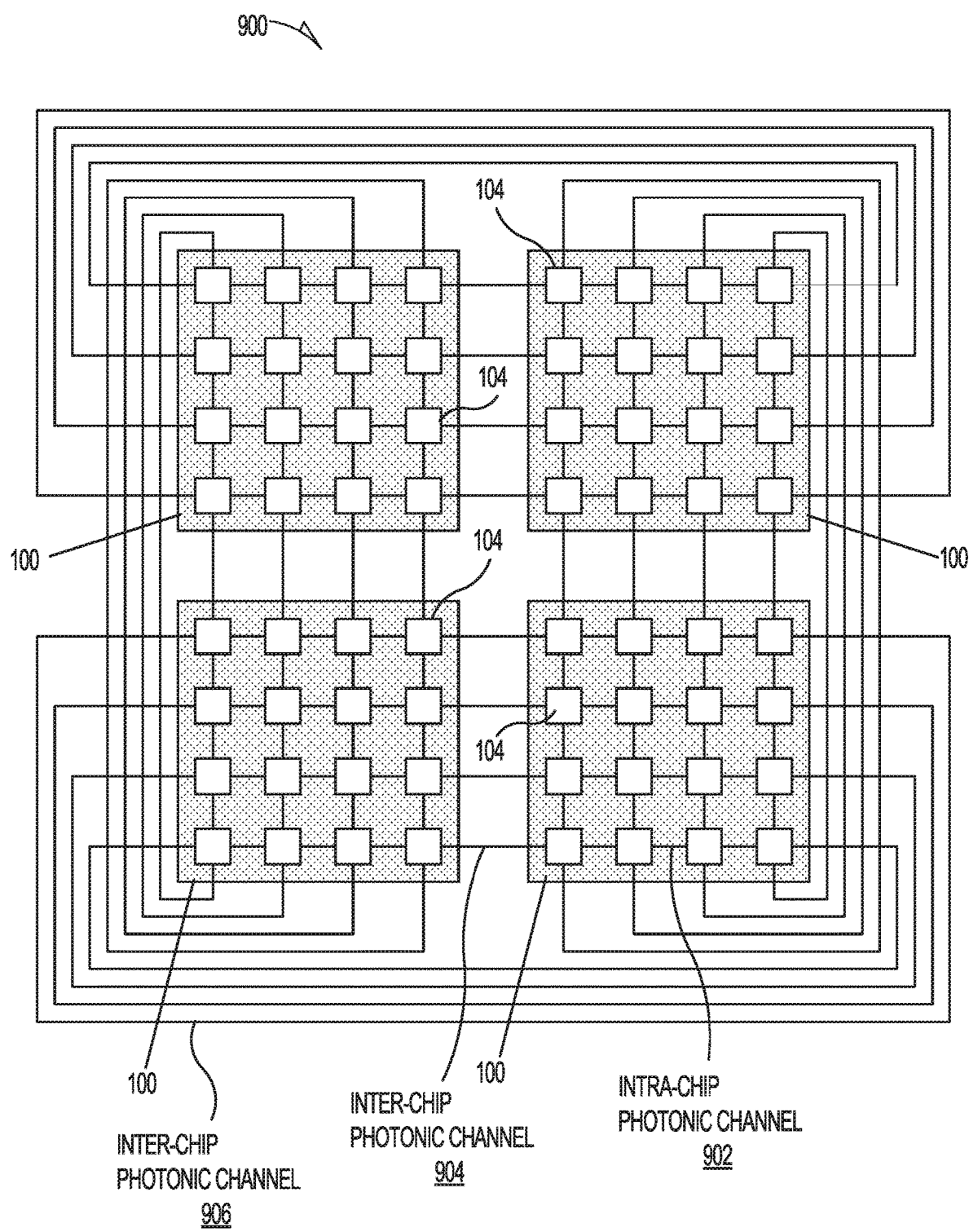
FIG. 9 is a diagram illustrating an example electro-photonic network with an extensible wrapped toroidal mesh topology, according to some embodiments.

FIG. 9 is a diagram illustrating an example electro-photonic network 900 with an extensible wrapped toroidal mesh topology, according to some embodiments. In this case, four SIPs 100 (e.g., implementing an ML accelerator with four ML processors), each including in its EIC sixteen tiles 104 in a rectangular grid, are themselves arranged in a two-by-two grid, resulting in an overall arrangement of sixty-four tiles 104 in an eight-by-eight grid. As shown, in this configuration, tiles 104 immediately adjacent to each other either within the same SIP 100 or in two adjacent SIPs 100 are connected by photonic channels (e.g., implemented by waveguides in the PIC for intra-chip photonic channels 902 and by optical fiber for inter-chip photonic channels 904). Moreover, the tiles 104 along the periphery of the eight-by-eight grid are interconnected (by inter-chip photonic channels 906) as a wrapped toroid, similar to the topology in FIG. 8, so that the output of each tile 104 in one SIP 100 that is located at an edge of the eight-by-eight grid can be provided as input to the tile of another SIP 100 on the opposite edge of the grid. Beneficially, the inter-chip photonic channels 904, 906 seamlessly integrate the tiles 104 of all the SIPs 100 into the larger electro-photonic network 900. As will be appreciated, the number of SIPs 100 connected into a single larger network may differ from the depicted four and can be straightforwardly increased without incurring substantial energy losses, taking advantage of the energy-efficiency, for long distances, of photonic communications. Further, the extensible wrapped toroidal topology reduces the number of tile-to-tile hops that would otherwise be needed to communicate between tiles on far ends of the grid.

FIGS. 7-9 illustrate various non-limiting examples of possible network topologies. To provide yet another example, the photonic channels may also be configured to collectively connect tiles within and/or across one or more SIPs into a three-dimensional, cubic grid topology. In such an embodiment, the tiles may still be laid out in a single plane (that is, be geometrically two-dimensional), but feature a three-dimensional network topology by virtue of the connections between network nodes. Note that the wrapped toroidal networks depicted in FIGS. 8 and 9 are also examples of geometrically two-dimensional and topologically three-dimensional configurations.

It is noted that, in an ML accelerator system according to various embodiments described herein, several techniques may be used to support the power-efficient execution of ML models using the photonic fabric. For ML models, both the pattern and schedule of communication are known at compile time, which provides the opportunity for compiler-directed photonic fabric optimization. For example, photonic channels and optical links in the photonic fabric that are not used may be shut down to save power based on the ML model that is loaded into the ML processor or accelerator. For example, a bidirectional photonic channel consisting of eight links, four in each direction, may provide more bandwidth than a given model demands. Dynamic bonding can be used to selectively activate and deactivate optical links in a channel according to the needs of the ML model based on a schedule developed by the compiler, thus further reducing the power consumption. A prerequisite for the implementation of this algorithm is that the EO and OE interfaces be able to go quiescent and restart in a few bit times, which is accomplished by selecting a master link from each channel at boot time using a negotiation protocol. The master link of a channel is never shut down. The transmit clock on the master link is used as the transmit clock on all the slave links. At the receiver, the master link performs clock data recovery on the incoming bit stream and reconstructs the transmitter clock. The receive clock is then distributed to the other slave links in the channel. Since there will be delays in transmission between master and slave links at both the transmitter and receiver, clock skew must be accounted for in each receive link, which is accomplished by performing a channel alignment phase during the bring up of the channel.

The configurability of the photonic fabric and its dynamic bonding ability can further be used to provide fault tolerance to correct manufacturing defects caused by low-yielding components. The modulators (e.g., EAMs) and photodiodes may have manufacturing defects, which cause them to be permanently defective. When the ML accelerator is initialized, each channel in the photonic fabric is set up and calibrated to make it ready to carry data. In normal operation, links in a channel are bonded together to form a group that performs as a single logical channel. During the process of channel establishment, nonfunctioning links can be omitted from the bonding group and disabled. The channel establishment process is coordinated by a state machine in the port logic of each channel.

The channel establishment state machine proceeds in phases. In a first phase, a master link is elected. A transmitter rotates through each link in the channel, transmitting a link establishment framing pattern. When a receive channel successfully receives the link establishment pattern, it converts its establishment link to a "master found" framing pattern. When a channel receives a "master found" framing pattern, the corresponding transmitter will stop rotating through the links, and wait for several "master found" framing patterns to indicate the master selection is stable. If the channel stops receiving "master found," then it will revert to using the link establishment framing pattern. When a master link is established in both directions, bonding can proceed. For each link that is not currently a master, the system transmits a "ready to bond" framing pattern. When the receiver correctly decodes a "ready to bond" framing pattern, it transmits a bonded framing pattern over the master link and adds the receive channel to the bonding group. The process proceeds until all the non-master links have been discarded or added to the bonding group. At the completion of the bonding process, only those links that are fully functional will be included in the bonding group.

Figure 10:
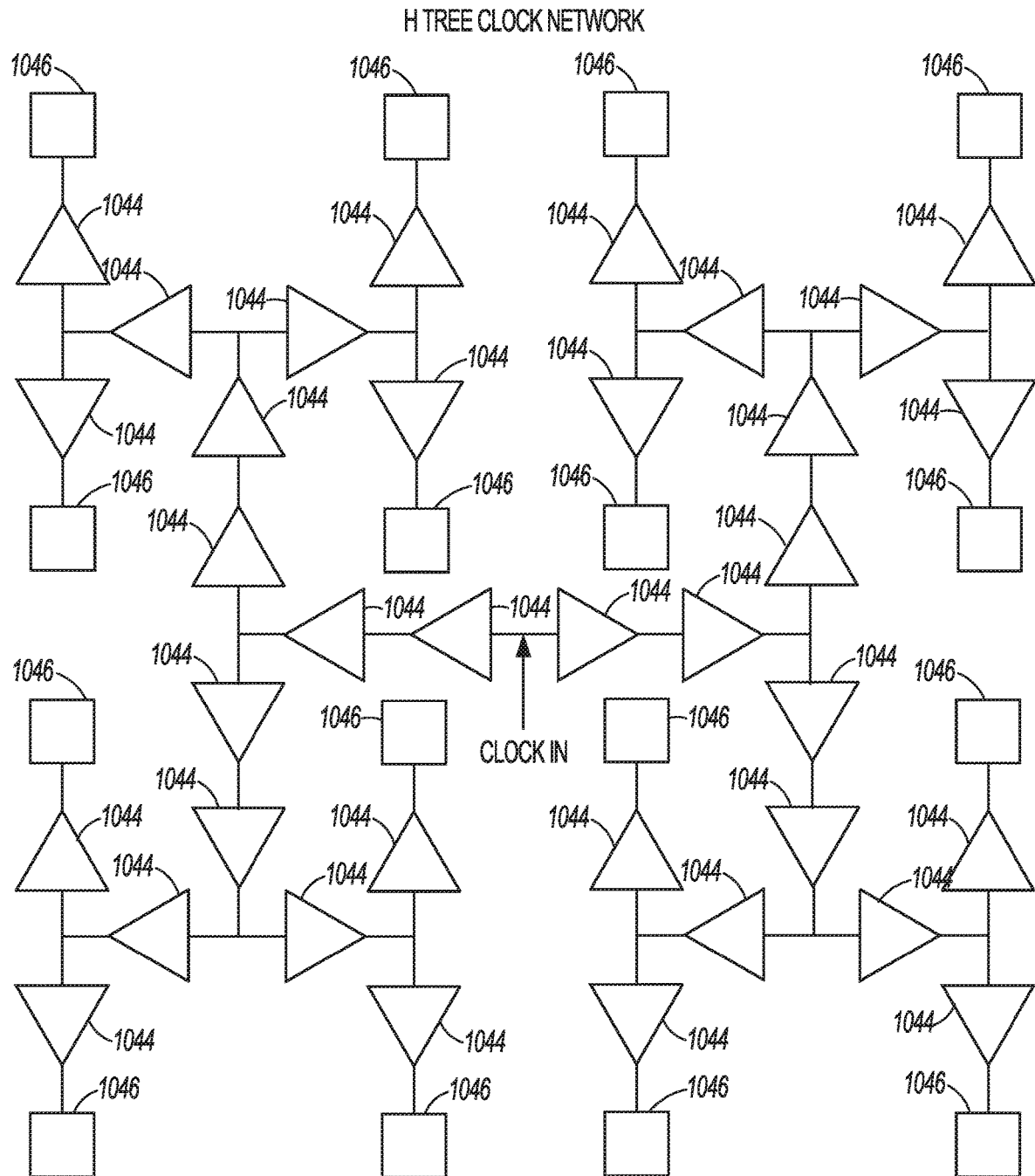
FIG. 10 is a diagram illustrating conventional techniques for clock distribution within a processor.

FIG. 10 is a diagram illustrating conventional techniques for clock signal distribution within a processor. The conventional techniques for clock signal distribution within a processor expend a significant amount of energy. Clock trees are typically built hierarchically, starting from a root clock network that distributes a clock signal to regional clock networks. A typical topology is the "H tree network" shown in FIG. 10, where the clock segments are successively divided on equal-length paths to distribute the clock signal to regions of the processor. Buffers 1044 are used to regenerate the clock signal as it propagates long distances across the processor. The paths through the H tree are matched in length to maintain even clock skew between the arms of the H tree network. Then, within regions, there is a further level of hierarchical clock splitting to connect the clock signal at the regional level to local circuits 1046. The root clock network often presents routing challenges since the clock paths must be matching in length, and also consumes significant power in the regenerating buffers 1044.

Figure 11:
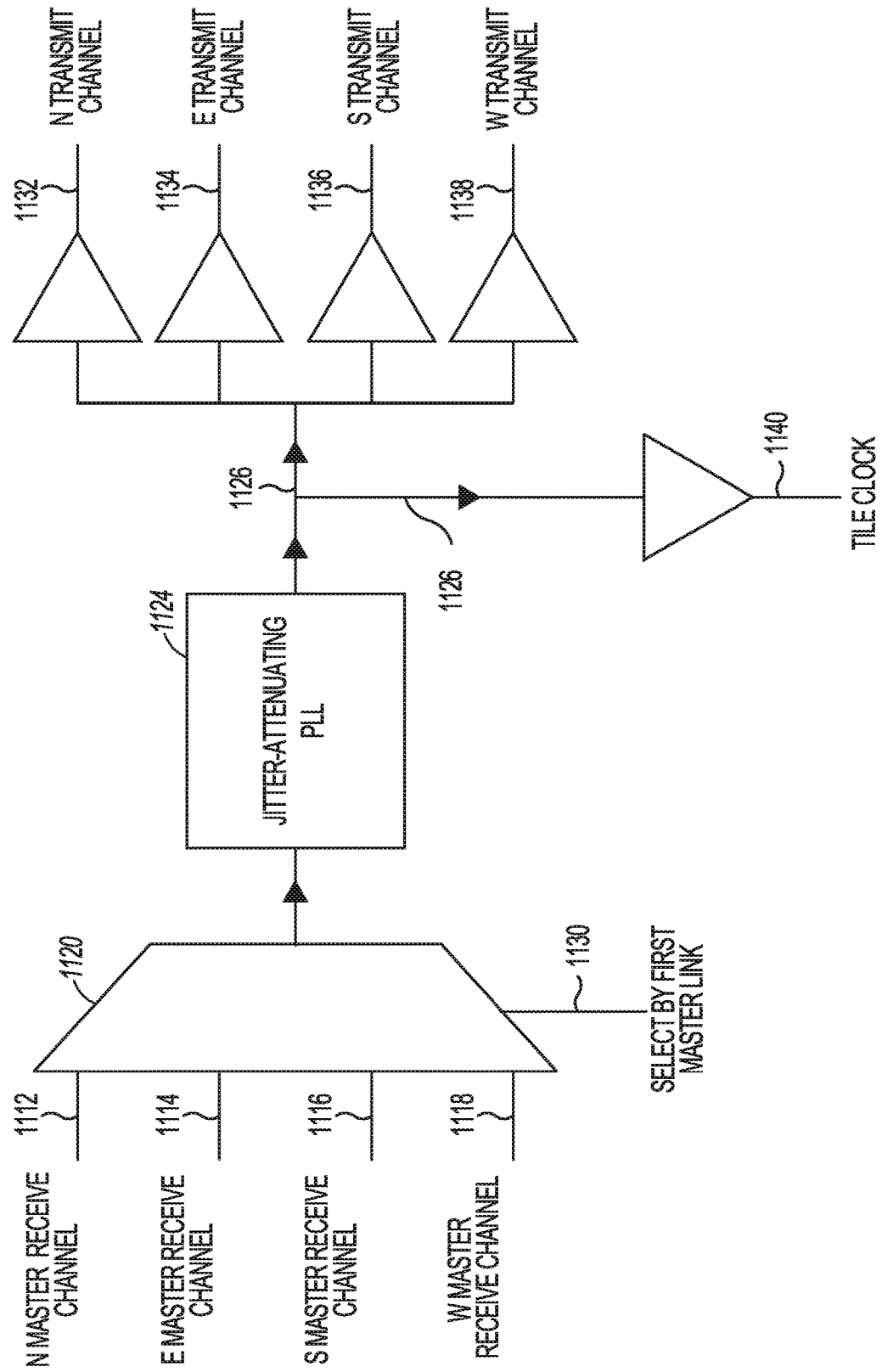
FIG. 11 is a diagram illustrating an example of using a photonic fabric to carry a root clock signal, according to some embodiments.

FIG. 11 is a diagram illustrating an example of using a photonic fabric to distribute a clock signal, such as a root clock signal, according to some embodiments. For some embodiments, a photonic fabric described herein is used to carry a clock signal within an ML processor (e.g., 100), such as a clock signal of a root clock network used by the ASIC (or other EIC, e.g., 101) of the ML processor. Referring now to FIG. 11, since the master links are always transmitted on channels 1112, 1114, 1116, and 1118, the receiving tile can use select by first master link 1130 to establish the clock source for the tile (e.g., 104). The clock signal is extracted from the incoming data stream on channels 1112, 1114, 1116, and 1118 by using clock data recovery (CDR) circuit 1120 and feeding into a jitter-attenuating PLL 1124 that produces a low jitter clock signal 1126 that is then used for the transmitters on all the other channels 1132, 1134, 1136 and 1138 in the tile as well as divided down and used as digital clock signal 1140 for the tensor processor, the DNN, and message router.

Each tile therefore establishes its own clock domain, and electrical connections between tiles use mesochronous clocking. This arrangement has several benefits over a digital global clock network: It saves power by eliminating the root clock network typical in processors; it reduces the complexity of the clock networks that must be routed around a processor and between several processors; and it reduces current spikes in the digital logic due to synchronized global clock transitions. The novel clock signal distribution mechanism of some embodiments extends between ML processors as well as within the tiles of a single ML processor.

Although the inventive concepts are described herein using various embodiments, other embodiments of these concepts can be devised by a person of ordinary skill in the art without departing from the scope of the present application. For example, in one approach, the DNN itself may be a PNN (photonic neural network), where the neural network layers are implemented using photonics (for example, MAC functions are performed using optical beam splitters and optical waveguides, and where intermediate output signals are optically combined for an optical output). Moreover, parts of the photonic network and/or photonic fabric may be implemented using electrical connections in addition to or instead of optical connection, for example, as back-up connections or for use during testing or during initialization of the ML accelerator.

In summary, according to various embodiments of the present inventive concepts, the present ML accelerator includes a novel hybrid electronic-photonic (or electro-photonic) NoC and a novel DNN, and an overall unique architecture for executing ML models and a novel clocking scheme. The presently disclosed ML accelerator results in significant reduction of power consumption while increasing processing speed by reducing power consumed for data movement and reducing energy consumption in MAC operations. Reducing power consumed for data movement is accomplished by maximizing data locality (e.g., by reducing data movement) in each ML processor and further by reducing energy losses when data movement is needed. Moreover, the novel clocking scheme in the present ML accelerator results in additional power savings.

For some embodiments, the clock signal distribution described herein is implemented with respect to a circuit package, such as an SIP. For instance, the circuit package can comprise an ASIC (e.g., 101), which comprises a plurality of processing elements (e.g., plurality of tiles) that include photonic-channel interfaces. Additionally, the circuit package can comprise a plurality of photonic channels connecting the plurality of processing elements to form at least part of an electro-photonic network (e.g., the network 130). According to various embodiments, of the plurality of photonic channels, a sub-plurality of photonic channels (e.g., channels 1112, 1114, 1116, 1118, 1132, 1134, 1136, 1138) is connected to an individual processing element (e.g., tile 104) of the plurality of processing elements.

To facilitate clock signal distribution of an embodiment, an individual processing element can select (e.g., via first master link 130), for the individual processing element, a master photonic channel (e.g., one of channels 1112, 1114, 1116, 1118) from the sub-plurality of photonic channels. For some embodiments, the individual processing element selects the master photonic channel during boot time of the individual processing element (e.g., using a negotiation protocol).

The individual processing element can select, for the individual processing element, a set of slave photonic channels (e.g., channels 1132, 1134, 1136, 1138) from the sub-plurality of photonic channels. For some embodiments, the individual processing element selects the set of slave photonic channels during boot time of the individual processing element (e.g., using a negotiation protocol). Additionally, for some embodiments, the individual processing element performs a channel alignment operation on the master photonic channel, the channel alignment operation being configured to adjust one or more settings of the individual processing element to compensate for clock skew.

The individual processing element can extract a received clock signal from the selected master photonic channel. For some embodiments, the individual processing element extracts the received clock signal from the master photonic channel by performing clock data recovery (e.g., by CDR circuit 1120) on an incoming bit stream received over the master photonic channel.

The individual processing element can generate, based on the received clock signal, a local clock signal (e.g., digital clock signal 1140) used by the individual processing element (e.g., tile 104) to perform one or more local operations on the individual processing element. A local operation on the individual processing element can be performed by at least one of a tensor processor (e.g., 108), a DNN (e.g., 106), or a message router (e.g., 110) of the individual processing element (e.g., tile 104). Accordingly, the individual processing element can comprise a tensor processor (e.g., 108), and the tensor processor can operate based on the local clock signal. The individual processing element can comprise a message router that includes photonic-channel interfaces, and the message router can operate based on the local clock signal. The individual processing element can comprise a hardware circuit for computing a dot product (e.g., DNN 106) between at least two vectors, and the hardware circuit can operate based on the local clock signal.

For some embodiments, the individual processing element (e.g., tile 104) comprises a jitter-attenuating phase-lock loop (PLL) (e.g., 1124), where the individual processing element uses the jitter-attenuating PLL to generate a low jitter clock signal based on the received clock signal. The individual processing element can generate the local clock signal based on the received clock signal by generating the local clock signal based on the low jitter clock signal.

Eventually, the individual processing element can transmit, over the set of slave photonic channels (e.g., channels 1132, 1134, 1136, 1138), a distributed clock signal to a set of the plurality of processing elements connected to the individual processing element, where the distributed clock signal is generated based on the received clock signal (e.g., output of CDR circuit 20). For instance, the individual processing element can transmit the distributed clock signal by transmitting one or more outgoing bit streams to the set of processing elements, where the one or more outgoing bit streams are generated based on the distributed clock signal. In this way, one or more processing elements receiving the outgoing bit stream (over the set of slave channels) can then independently extract the distributed clock signal from the outgoing bit stream.

For some embodiments, the individual processing element is connected to a second processing element (of the plurality of processing elements) configured to operate similarly to the individual processing element. For example, the second processing element can be connected to the individual processing element via an individual photonic channel of the set of slave photonic channels (of the individual processing element). The second processing element can select the individual photonic channel as a second master photonic channel for the second processing element. The second processing element can select, for the second processing element, a second set of slave photonic channels from a second sub-plurality of photonic channels that are connected to the second processing element. The second processing element can extract a second received clock signal from the second master photonic channel (e.g., from the outgoing bit stream received by the second processing element received via the second master photonic channel). The second processing element can generate, based on the second received clock signal, a second local clock signal used by the second processing element to perform one or more local operations on the second processing element. Thereafter, the second processing element can transmit, over the second set of slave photonic channels, a second distributed clock signal to a second set of the plurality of processing elements connected to the second processing element, where the second distributed clock signal is generated based on the second received clock signal.

FIG. 12 is a diagram illustrating an example architecture 1200 of a DNN, according to some embodiments. As shown, the architecture 1200 comprises a plurality of memory devices that includes sixty-four SRAM memory banks 1210-1 through 1210-64 (hereafter, collectively referred to as SRAM memory banks 1210), a switch fabric 1220 (e.g., SRAM fabric), a controller 1230, and an array of dot product units 1240, where each dot product unit comprises a plurality of fused multiple-accumulate (FMA) units that includes FMA unit 1250.

The architecture 1200 can perform compute intensive functions, such as convolutions and matrix multiplies (which are typically used in inner loops of a ML model), with minimum overhead per operation. In contrast to traditional technologies, such as register transfer machines for executing ML graphs, the architecture 1200 can optimally perform specific compute intensive functions with little overhead by removing overhead associated with general programmability. The architecture 1200 can provide close association to the SRAM memory banks 1210 that feed the switch fabric 1220, which can minimize movement of data to the math units (e.g., the array of dot product units 1240) while exchanging values between the math units. In this way, the architecture 1200 can provide near-memory compute architecture that also saves power consumption in comparison to conventional technologies.

According to some embodiments, the architecture 1200 represents a hardware circuit of DNN, where the hardware circuit comprises a combinatorial tree (e.g., as illustrated in FIG. 4), and a sequencer (e.g., 400). The combinatorial tree can use multiple-accumulate (MAC) units to generate one or more dot product values based on input values received at a top level of the combinatorial tree, and a sequencer 1211 can be configured to re-arrange the locations in the switch fabric 1220 of the input vectors received from a set of memory devices 1210. In this way, some embodiments can control the order of the weight values and operand values that are provided as input vectors to the top level (e.g., the left-most column in the 2 dimensional dot product array 1240). The combinatorial tree can comprise registers configured to maintain clock alignment of values flowing through the combinatorial tree. In FIG. 12, clock alignment of values is maintained with respect to clock 1280 connected to the array of dot product units 1240. As shown, each FMA of the array of dot product units 1240 is connected to the clock 1280.

The sequencer 1211 is operatively coupled to the switch fabric 1220 or memory devices that operatively couples the combinatorial tree to the set of memory devices 1210, such as local SRAM memory devices, which in this example are shown as 64 memory banks that each provide a 32-bit vector. The set of memory devices can comprise the SRAM memory banks 1210 or any other suitable local memory. The combinatorial tree can comprise an array of dot product units, such the array of dot product units 1240. Inputs of each dot product unit of the array form the top level of the combinatorial tree that receives the input values (e.g., 32-bit vectors).

The array of dot product units 1240, which can be configured to receive the input values (e.g., input vectors 1260), and to generate the one or more dot product values based on the input values as received by the top level of the combinatorial tree, where a single dot product unit can comprise two or more of the MAC units. A single MAC unit of the dot product unit has at least one accumulator. In some embodiments, a plurality of accumulators are configured to accumulate partial dot product values generated by the single MAC unit as values flow through the single MAC unit. The MAC units can comprise at least one FMA unit, such as FMA 1250.

For some embodiments, the sequencer 1211 is configured to provide vectors to the switch fabric 1220, from the set of memory devices 1210. In some embodiments, weight values and operand values (e.g., activation values) are provided by the switch fabric 1220 as a sequence of input vectors to the top level according to a controller (e.g., controller logic), which control an operation or configuration of the sequencer 1211, the clock, a tensor engine, or another component associated with the ASIC. For instance, the controller 1230 can implement the sequencer 1211 in hardware, firmware, software, or a combination of all of these, where the sequence of input vectors (e.g., 1260) provided to the array of dot product units 1240 is determined by the controller 1230. Depending on the embodiment, the sequencer 1211 can determine the sequence of input vectors provided to the top level based on a set of parameters, where the set of parameters comprises at least one of a stride value, a dilation value, or a kernel size value (e.g., which can be received or processed by the controller 1230).

The sequencer 1211 can be configured to generate an individual input vector (of the sequence of input vectors) by reading a plurality of weight values and a plurality of operand values read from the set of memory devices (e.g., the SRAM memory banks 1210) during a single or multiple clock cycles, where the individual input vector comprises the plurality of the weight values and the plurality of the operand values. According to various embodiments, the plurality of weight values and the plurality of operand values are read by the sequencer for a first time, and no memory bank collisions occur during the read by the sequencer because it permutes the input vectors in the switch fabric 1220 that provide input to the dot product engine 1240. Additionally, where the set of memory devices comprises memory banks, the sequencer can read from each of the memory banks during the single clock cycle, although other clock-based schemes are also possible. For some embodiments, each successive read of the set of memory devices, by the sequencer, results in reading of new weight values and new operand values from the set of memory devices not read by the sequencer during a previous clock cycle. Specifically, the switch fabric 1220 can read weight values and operand values (e.g., activation values) exactly once with the input data permuted so there are no bank conflicts. By reading individual weight values and operand values only once, there is a reduction in the number of times the individual weight values and operand values is accessed from the set of memory devices.

The array of dot product units 1240 can comprise data paths that cause at least two weight values to swap between adjacent rows of the array and propagate weight values down columns of the array. Additionally, a single MAC unit of a dot product unit can be operatively coupled to at least two adjacent MAC units of the dot product unit such that an output value generated by the single MAC unit is shared as an input value to each of the at least two adjacent MAC units.

Eventually, a logic (e.g., controller 1230) can cause a set of final dot product values to be generated for the weight values and the operand values after all of the sequence of input vectors have been inputted to the top level of the combinatorial tree. For instance, the set of final dot product values generated by the logic can be constructed from values stored in accumulators of the MAC units of the combinatorial tree. Additionally, the logic is configured to store the set of final dot product values to the set of memory devices 1210. Alternatively, the system can be programmed to execute deterministically and to write the values of the accumulators back to memory automatically after a given number of compute cycles. In this way, the stored set of final dot product values can be used to construct another input vector for the array of dot product units.

During operation, one or more weight values and one or more operand values (e.g., activation values) can be stored on the SRAM memory banks 1210. For some embodiments, the SRAM memory banks 1210 comprises 64 banks of 32-byte wide SRAM memories. The SRAM memory banks 1210 can feed an input of the switch fabric 1220. The switch fabric 1220 can reorganize data read (from the SRAM memory banks 1210) using a sequencer 1211, such that each successive memory read causes a new weight values or operand values to be delivered to the array of dot product units 1240 for performing a computation function (e.g., convolution or matrix multiplication). The switch fabric 1220 can have permuted the data read from the SRAM memory banks 1210 (for example using the controller, the sequencer or a combination of both) according to one or more parameters of an operation in progress (e.g., convolution or matrix multiply) and the step of the computation that is currently executing. Accordingly, a parameter can drive an order in which operand values (e.g., activation values) are applied to weight values. For instance, a parameter for a two-dimensional (2D) convolution operation can comprise a stride, a dilation, or a kernel size. An output of the switch fabric 1220 can drive an input of the array of dot product units 1240 with weight values and operand values as read from the switch fabric 1220. As values are read from the SRAM memory banks 1210, a pipeline of the switch fabric 1220 fills up with values and the values start to clock out of the switch fabric 1220 into the array of dot product units 1240.

For some embodiments, during each clock cycle, weight values and operand values (e.g., activation values) are read by the switch fabric 1220 as a set of vectors, passes through the switch fabric 1220 to the array of dot product units 1240, and permuted as the set of vectors pass through the switch fabric 1220. For convolution operations, the set of vectors read from the SRAM memory banks 1210 can be organized as patches (e.g., 8×8 patches) of channel vectors. For some embodiments, the switch fabric 1220 avoids bank collisions while reading from the SRAM memory banks 1210 by permuting the patches in memory. In this way, the switch fabric 1220 is able to read from all the SRAM memory banks 1210 at every clock cycle.

For some embodiments, each dot product unit of the array of dot product units 1240 is thirty-two FMA units deep. Additionally, for some embodiments, the array of dot product units 1240 comprises 64 rows by 32 columns of dot product units. During operation, the array of dot product units 1240 can perform 65536 FMA operations in each clock cycle. As shown, for some embodiments, each FMA unit (e.g., FMA unit 1250) in the array of dot product units 1240 comprises an accumulator 1252. In this example it is shown as a pair of accumulators (ACC0 and ACC1) configured to accumulate partial product values as weight values and operand values (e.g., activation values) flow through the FMA unit. In other implementations, other accumulator schemes can be used. For example, a FMA unit can receive as input two 8-bit values and generate 32-bit dot product value (stored in the accumulator 1252 of the FMA unit). In various embodiments, output accumulators of an FMA are kept stationary while values are streamed through the FMA unit. By keeping the output accumulators stationary, various embodiments avoid a significant amount of energy consumption because there is no need for arithmetic logic units and memory read and write operations associated with each FMA cycle and each calculation made by an FMA unit. For instance, the energy consumption of the FMA can be 130 fJ.

For some embodiments, each level of the array of dot product units 1240 includes a set of connections between adjacent FMA units, and a set of connections between adjacent FMA units between dot product values, which can permit weight values to be shuffled between FMAs. The shuffling of weight values can be controlled (e.g., via the controller 1230) by either one or more parameters, such as convolution parameters or matrix multiply dimensions. In various embodiments, the array of dot product units 1240 is combinatorial, which enables the array of dot product units 1240 to reduce or avoid energy costs of latching the data in registers at each stage of the compute within the array of dot product units 1240. For some embodiments, the array of dot product units 1240 comprises a set of pipeline registers (e.g., a small number of pipeline registers) used to keep data flow in the array of dot product units 1240 aligned with a clock signal driving the array of dot product units 1240. Additionally, for some embodiments, the array of dot product units 1240 comprises a set of data paths that permit swapping of weight values between rows of the array of dot product units 1240, and that permit propagation of weight values down through columns of the array of dot product units 1240, which facilitates supply of correct weight values to each operand value (e.g., activation value) as the operand values stream through the array of dot product units 1240. After all the weight values and operand values have passed through the array of dot product units 1240, computation of weight values and operand values by the array of dot product units 1240 can be considered complete, and resulting values in the accumulators of each FMA unit in the array of dot product units 1240 make up a set of final dot product values. These final dot product values can be written back to (e.g., stored) the SRAM memory banks 1210 and, subsequently, one or more of those stored values can be used as input to the array of dot product units 1240 during a future subsequent computation by the array of dot product units 1240.

Figure 13:
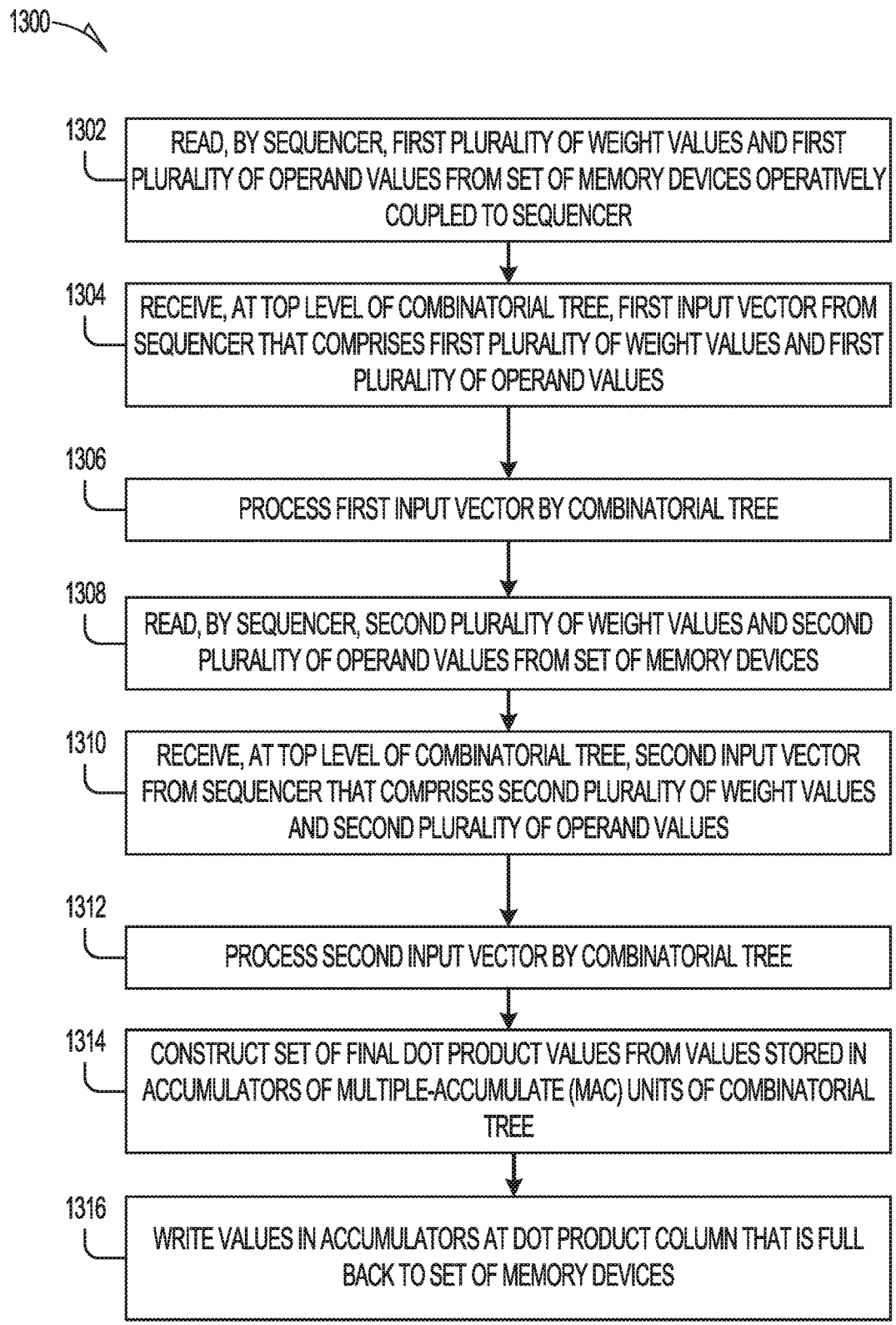
FIG. 13 is a flowchart illustrating an example method for operating a DNN, according to some embodiments.

FIG. 13 is a flowchart illustrating an example method 1300 for operating a DNN, according to some embodiments. It will be understood that example methods described herein may be performed by a standalone DNN or by a device that includes a DNN (e.g., the DNN 106), such as the ML processor 100. Additionally, example methods described herein may be implemented in the form of executable instructions stored on a machine-readable medium or in the form of electronic circuitry (e.g., logic), which can cause a DNN to operate in accordance with the method 1300. For instance, the operations of the method 1300 of FIG. 13 may be represented by executable instructions that, when executed by a controller of a DNN, cause the DNN to perform in accordance with the method 1300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 13, at operation 1302 a sequencer of a DNN reads a first plurality of weight values and a first plurality of operand values from a set of memory devices operatively coupled to the sequencer. At operation 1304, a first input vector from the sequencer is received at a top level of a combinatorial tree of the DNN, where the first input vector comprises the first plurality of weight values and the first plurality of operand values read at operation 1302. During operation 1306, the combinatorial tree processes the first input vector, where the combinatorial tree is configured to use MAC units to generate one or more dot product values based on values received through the top level. The sequencer, at operation 1308, reads a second plurality of weight values and a second plurality of operand values from the set of memory devices. At operation 1310, a second input vector from the sequencer is received at the top level of a combinatorial tree, where the second input vector comprises the second plurality of weight values and the second plurality of operand values. During operation 1312, the combinatorial tree processes the second input vector, where the first input vector and the second input vector are part of a sequence of input vectors to be received by the top level of the combinatorial tree. After a sequence of input vectors has been received by the top level of the combinatorial tree, at operation 1314, the DNN constructs a set of final dot product values from values stored in accumulators of the MAC units of the combinatorial tree.

This could comprise multiple steps depending on the size of the accumulator. In some embodiments, the accumulator holds 32 bits. Once sufficient input vectors flow through the dot product array to fill the accumulators, for example at the top level of the combinatorial tree (or elsewhere in the dot product array), then at operation 1316 the values in the accumulators of MAC units of the combinatorial tree (e.g., accumulators of a column of the array of dot product units that is full) can be written back to the set of memory devices used in operation 1302. Thereafter, the process can optionally repeat. Thus, the accumulator output can be used by one embodiment as the input to another processing cycle, thereby avoiding the use of an arithmetic logic unit or any memory accesses needed to process or store the intermediate or final results of any calculations made by a row or column of the combinatorial tree.

Figure 14:
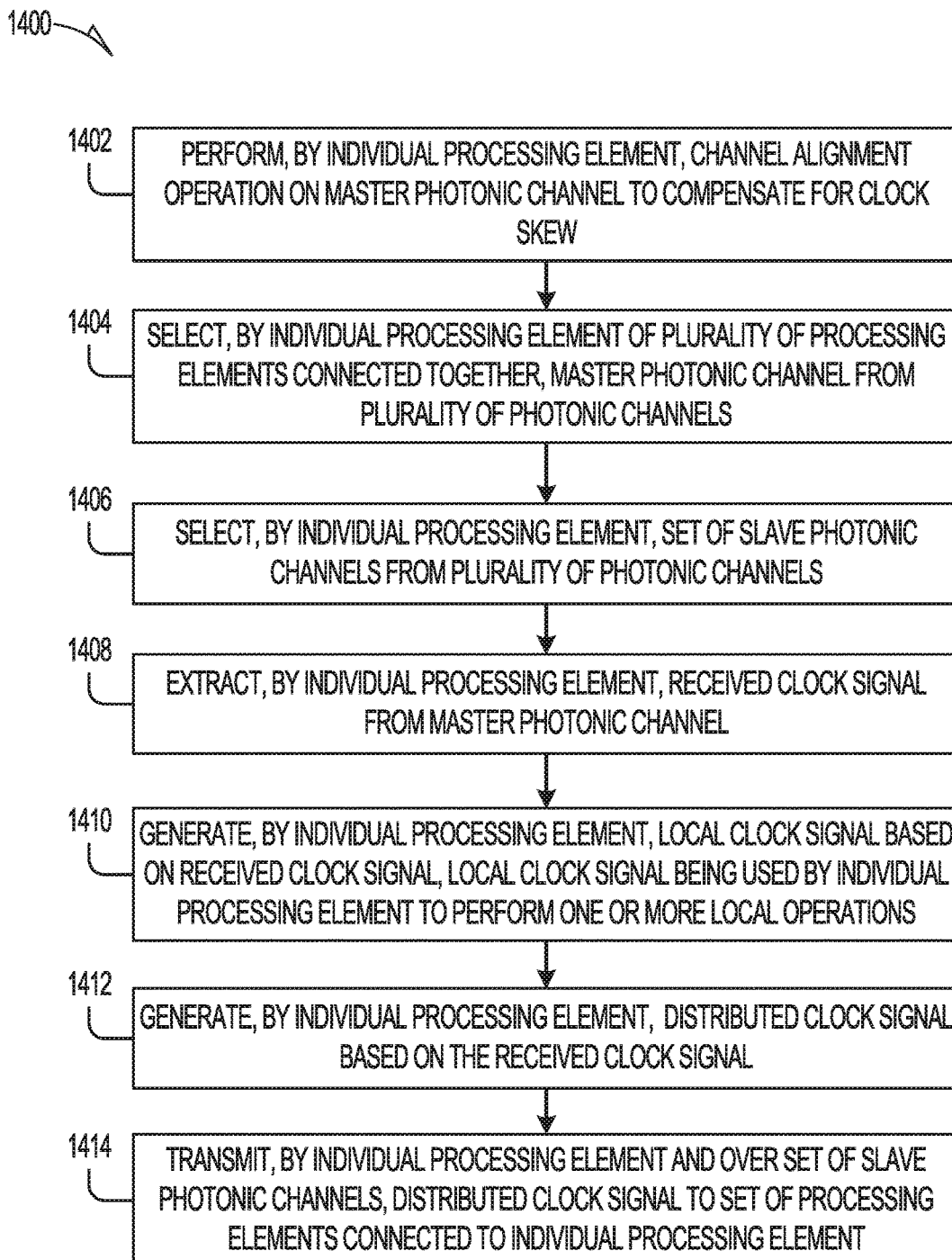
FIG. 14 is a flowchart illustrating an example method for clock signal distribution using an electro-photonic network, according to some embodiments.

FIG. 14 is a flowchart illustrating an example method 1400 for clock signal distribution using an electro-photonic network, according to some embodiments. It will be understood that example methods described herein may be performed by an individual processing element (e.g., tile 104) of a ML processor (e.g., 100). Additionally, example methods described herein may be implemented in the form of executable instructions stored on a machine-readable medium or in the form of electronic circuitry (e.g., logic), which can cause individual processing element to operate in accordance with the method 1400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 14, an individual processing element of a ML processor, at operation 1402, performs a channel alignment operation on the master photonic channel, where the channel alignment operation is configured to adjust one or more settings of the individual processing element to compensate for clock skew. At operation 1404, the individual processing element selects a master photonic channel from a plurality of photonic channels, where the master photonic channel is selected for the individual processing element. For some embodiments, the plurality of processing elements is part of an ASIC of a circuit package, and the plurality of processing elements is connected together by a plurality of photonic channels to form at least part of an electro-photonic network within the circuit package. During operation 1406, the individual processing element selects a set of slave photonic channels from the plurality of photonic channels, where the set of slave photonic channels is selected for the individual processing element. At operation 1408, the individual processing element extracts a received clock signal from the master photonic channel. Based on the received clock signal (extracted at operation 1408), the individual processing element generates a local clock signal used by the individual processing element to perform one or more local operations on the individual processing element. Based on the received clock signal (generated at operation 1410), at operation 1412, the individual processing element generates a distributed clock signal. At operation 1414, the individual processing element transmits, over the set of slave photonic channels, a distributed clock signal to a set of the plurality of processing elements connected to the individual processing element. For various embodiments, operation 1414 comprises transforming the distributed clock signal from an electrical form to an optical form using the photonic-channel interface of the individual processing element. The distributed clock signal is suitable for transmission across the set of slave photonic channels. Additionally, for some embodiments, operation 1414 comprises transforming the distributed clock signal from the optical form to the electrical form at the set of the plurality of processing elements, where the distributed clock signal is suitable for use as associated local clock signals by the set of the plurality of processing elements.

Figure 15:
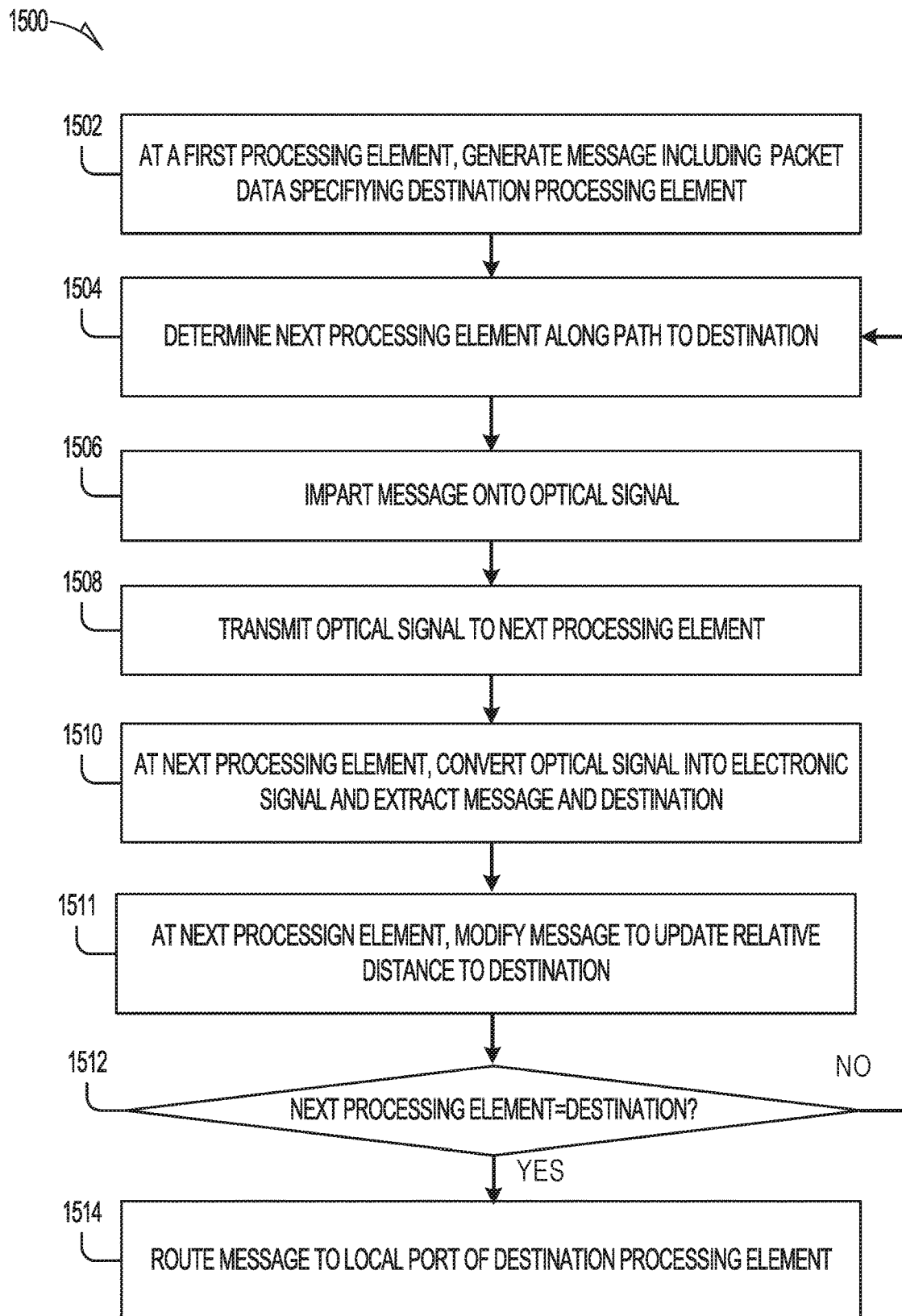
FIG. 15 is a flowchart illustrating an example method for transferring a message within an electro-photonic network, according to some embodiments.

FIG. 15 is a flowchart illustrating an example method 1500 for transferring a message within an electro-photonic network (e.g., network 130 of SIP 100), according to some embodiments. At operation 1502, a message is generated at one of the processing elements 104 of the network (herein also the "first processing element" or "source tile"). The message is a packet of binary information comprising a series of ones and zeros. A portion of the data comprised in the packet can include optionally data from the local memory of a tile, such as a weight or activation. This is typically called the payload of the packet. Another portion of the data comprised in the packet is a header, which can include routing information, such as an address, associated with a destination tile. It is also possible, alternatively, to provide the routing information as part of the payload, e.g., in a first portion separate from a second portion of the payload that carries the data (e.g., weights or activations). Therefore, the routing information in the packet can specify another processing element of the network (herein also the "second processing element" or "destination tile") as the destination of the message. Based on the routing information, a path through the network from the source tile to the destination tile can be determined. Unless the source and destination tiles are directly connected via a bidirectional photonic channel of the network, the path includes one or more intervening processing elements (herein also "third processing elements" or "intervening tiles") on route from the source tile to the destination tile. In some embodiments, the path is determined collectively by routers of the source and intervening tiles (by modifying at least one value in the routing information (e.g., in the header) of the packet at each hop along the route from the source to the destination). For example, in embodiments that specify the address of the destination tile in terms of a relative location, or distance, from the current tile, each message router may route the message to neighboring tile within the network that reduces that distance, e.g., in one of two dimensions, and update the packet data accordingly.

Accordingly, at operation 1504 (during its first execution), a router of the source tile (in a first iteration) determines the next tile along the path to the destination tile and routes the message within the source tile to a bidirectional photonic channel that connects the source tile to that next tile. At the interface between the source tile and that bidirectional photonic channel, the message is, at operation 1506, imparted onto an optical signal, e.g., by operating a modulator driver of the source tile to cause an associated modulator of the photonic channel to modulate the optical signal in accordance with the message. At operation 1508, the modulated optical signal carrying the message is transmitted to the next tile. At operation 1510, the optical signal is converted back into an electronic signal at an interface between the photonic channel and the next tile, e.g., by measuring the optical signal with a photodetector at the end of the photonic channel. In some embodiments, upon arrival at the EIC of the next tile, the routing information of the packet is modified at operation 1511 to reflect that the packet has moved one step toward the destination in one of a plurality of dimensions. Thereafter, the message router of the next tile has a packet with routing information whose fields have been modified to indicate the current number of steps remaining in a plurality of different dimensions toward a destination tile.

At operation 1512, it is determined whether the tile that received the message at operation 1510 is the destination or an intermediate tile. If the tile is an intermediate tile (e.g., the routing information fields in the header of the packet are non-zero, in one embodiment), the method 1500 loops back to operation 1504, where the intermediate tile (during the second and any subsequent execution), determines the next tile along the path to the destination. The message is then imparted onto an optical signal (at operation 1506) for transmission to that next tile (at operation 1508), and is, after conversion of the optical signal, extracted from the resulting electronic signal (at operation 1510). The method 1500 iterates through operations 1504-1512 until it arrives at the destination tile. Once the router of the destination tile determines that the message is at its destination, at operation 1514 (for example, if both fields in the packet having routing information are zero), the message (or its payload, such as, e.g., an activation streamed from the source tile) is routed to a local port within the destination tile, e.g., for transmission to a processing engine or memory of the destination tile.

Figure 16:
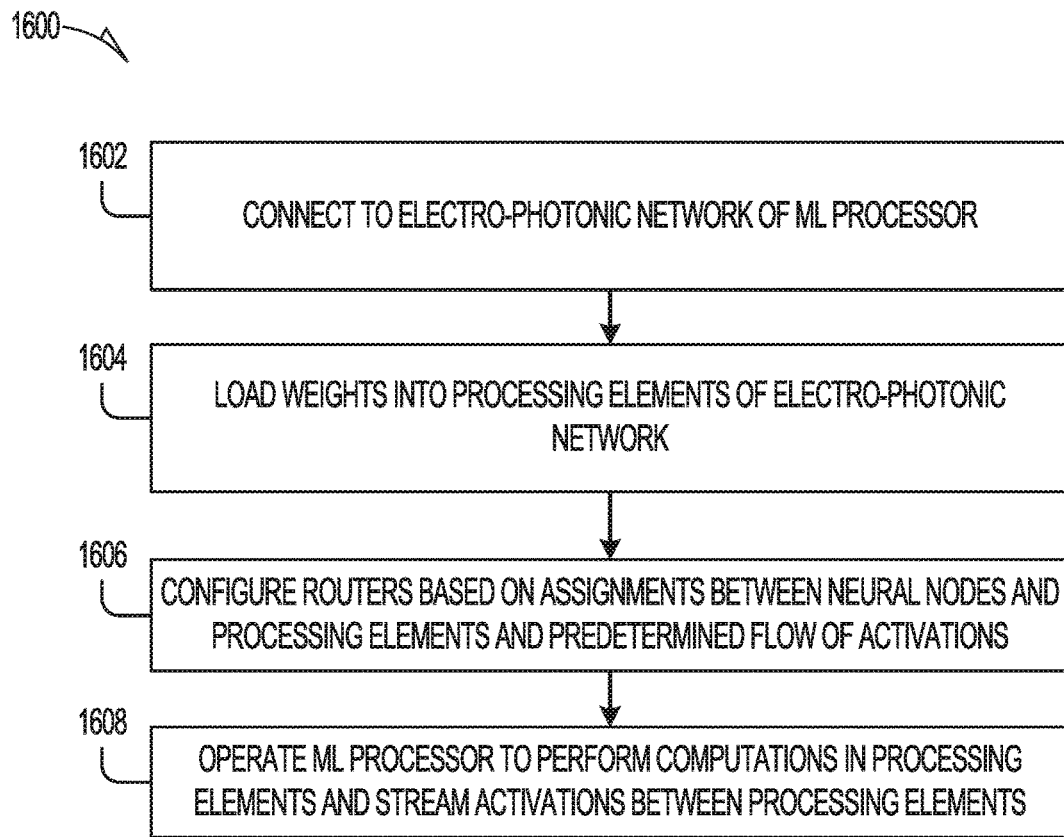
FIG. 16 is a flowchart illustrating an example method of implementing an artificial neural network (ANN) on an ML processor, according to some embodiments.

FIG. 16 is a flowchart illustrating an example method 1600 of implementing an ANN on an ML processor, according to some embodiments. The ANN includes a plurality of neural nodes with associated predetermined weights and a predetermined flow of activations between the nodes. The ML processor (e.g., implemented by SIP 100 of FIGS. 1A and 1B) includes an electro-photonic network comprising a plurality of processing elements (e.g., 104) connected by bidirectional photonic channels, each processing element comprising one or more processing blocks, memory communicatively coupled to the one or more processing blocks, and a message router including two or more photonic-channel interfaces. The method involves, at operation 1602, receiving input data that includes a representation of the ANN including the weights, to the electro-photonic network of the ML processor in machine readable form. A connection to the ML processor may be established, e.g., via a PCIE, ARM core, general-purpose processor, or other system of the ML processor that is electronically or optically coupled to the electro-photonic network. Operation 1602 may include, for example, providing data via tensor flow to a compiler which transforms it from human-readable form to machine-readable form.

At operation 1604, the weights of the ANN are loaded into the processing elements of the electro-photonic network based on an assignment between the neural nodes and the processing elements. The assignment may be determined at compile time (e.g., prior to connecting to the electro-photonic network at operation 1602). In another embodiment, the weights of the ANN are loaded into the local memories of the processing elements of the electro-photonic network by a scheduler that operates after compilation but before execution of the inference or model. In some embodiments, each neural node is assigned to one of the processing elements, where each processing element may implement one or more neural nodes. In other embodiments, one or more neural nodes are each assigned to multiple processing elements that collectively implement the node. The weights associated with each neural node are loaded into the memory of the one more processing elements assigned to implement that neural node, for example after the code is compiled but before the hardware executes.

At operation 1606, the processing elements, and more particularly, e.g., their message routers, are configured based on the assignment of nodes to processing elements in conjunction with the predetermined flow of activations between nodes within the ANN. The configuration may involve, for example, providing path-setup packet data to the routers in electronic form or via photonically transmitted messages. As a result of the configuration, output activations computed at each processing element will be routed to the respective processing element(s) that implement the neural node(s) in the ANN that receive these activations as inputs. The configuration is such that activations between neural nodes implemented by different ones of the processing elements are transferred optically between the processing elements via the bidirectional photonic channel, whereas activations between neural nodes implemented by a shared processing element are transferred electronically within the processing element. At operation 1608, the ML processor is operated to implement the nodes of the ANN, for example by executing the code and performing the computations on the associated weights and input activations in the processing engines, and streaming activations between the processing elements in accordance with routing decisions made by the configured routers.

The following numbered examples are illustrative embodiments, and not intended to be restrictive.
1. A circuit package comprising: an electronic integrated circuit comprising a plurality of processing elements, each processing element comprising a message router including photonic-channel interfaces; and a plurality of bidirectional photonic channels connecting the processing elements into an electro-photonic network, each bidirectional photonic channel interfacing at a first end with a photonic-channel interface of the message router of a first one of the processing elements and at a second end with a photonic-channel interface of the message router of a second one of the processing elements and being configured to optically transfer a packet between the message routers of the first and second processing elements.
2. The circuit package of example 1, wherein each bidirectional photonic channel comprises one or more unidirectional photonic links in both directions.
3. The circuit package of example 2, wherein each bidirectional photonic channel comprises multiple unidirectional photonic links in both directions, and wherein the multiple unidirectional photonic links in each direction are bonded together.
4. The circuit package of example 2 or example 3, wherein each unidirectional photonic link comprises an optical modulator at an input end, a photodetector at an output end, and an optical waveguide connecting the optical modulator to the photodetector, and wherein each photonic-channel interface comprises a modulator driver for each unidirectional photonic link with which it interfaces at the input end and a transimpedance amplifier for each unidirectional photonic link with which it interfaces at the output end.
5. The circuit package of example 4, wherein the optical modulators are electro-absorption modulators (EAMs).
6. The circuit package of example 4, wherein the optical modulators comprise at least one of a ring modulator, Mach-Zehnder modulator, quantum-confined Stark effect (QCSE) electro-absorption modulator.
7. The circuit package of any of examples 4-6, wherein the electronic circuit is implemented in an electronic circuit layer and the plurality of bidirectional photonic channels are implemented in a photonic circuit layer.
8. The circuit package of example 7, wherein the electronic circuit layer is implemented in a first semiconductor chip and the photonic circuit layer is implemented in a second semiconductor chip.
9. The circuit package of example 7 or example 8, wherein each modulator driver is placed directly above or below the optical modulator with which it is associated and each transimpedance amplifier is placed directly above or below the photodetector with which it is associated.
10. The circuit package of example 8, wherein distances between the optical modulators and their associated modulator drivers and between the photodetectors and their associated transimpedance amplifiers are smaller than 200 µm.
11. The circuit package of any of examples 8-10, further comprising, in the photonic circuit layer of the semiconductor chip, optical input waveguides supplying optical carrier signals provided by one or more laser light sources to the optical modulators of the photonic links, the optical carrier signals being modulated by the optical modulators in accordance with drive signals applied by the associated modulator drivers to generate modulated optical signals carrying the packet.
12. The circuit package of example 11, further comprising the one or more laser light sources integrated into the circuit package.
13. The circuit package of example 12, wherein the one or more laser light sources are integrated with the optical input waveguides in one or more photonic integrated circuits (PICs) in the photonic circuit layer.
14. The circuit package of example 12, wherein the one or more laser light sources are implemented in an interposer co-packaged with the semiconductor chips and are edge-coupled with one or more PICs in the photonic circuit layer that include the optical input waveguides.
15. The circuit package of example 11, wherein the one or more laser light sources are implemented externally to the circuit package and optically coupled via one or more optical fibers to one or more PICs in the circuit package.
16. The circuit package of example 15, wherein the one or more optical fibers are coupled to the one or more PICs via one or more fiber attach units (FAUs) located over grating couplers implemented in the PICs.

17. The circuit package of example 15, wherein the one or more optical fibers are edge-coupled to the one or more PICS.
18. The circuit package of any of examples 15-17, further comprising, in the photonic circuit layer of the semiconductor chip, one or more optical splitters each splitting an input optical carrier signal received from an associated one of the one or more laser light sources between multiple of the input optical waveguides.
19. The circuit package of any of examples 1-18, wherein the electronic integrated circuit is an application-specific integrated circuit (ASIC).
20. The circuit package of example 19, wherein the ASIC comprises digital and mixed-signal electronic circuitry.
21. The circuit package of example 19, wherein each processing element further comprises a dot product engine implementing a combinatorial tree of multipliers and adders for computing dot products between vectors.
22. The circuit package of example 21, wherein each processing element further comprises a tensor engine for obtaining and processing vectors computed as output of the dot product engine.
23. The circuit package of example 21 or example 22, wherein each processing element further comprises a memory system.
24. The circuit package of any of examples 19-23, further comprising at least one of a peripheral component interconnect express (PCIE) interface, an advanced RISC machine core, an image processor, or an external memory controller.
25. The circuit package of any of examples 19-24, further comprising high bandwidth memory (HBM), the ASIC further comprising a RAM controller communicatively coupling the processing elements to the HBM.
26. The circuit package of any of examples 1-25, wherein the message routers of the processing elements are configured to route a packet having routing information in a portion of the packet, wherein a path through the electro-photonic network is determined by using the routing information.
27. The circuit package of example 26 wherein the message router of each processing element is configured to determine, based on the routing information in the packet received on one of its photonic-channel interfaces, a destination of the packet, and to route the packet either to a local port if the destination is the local memory or a processing engine within the processing element or to another one of the photonic-channel interfaces if the destination is not the local memory or processing engine within the processing element.
28. The circuit package of example 26 or example 27, wherein the processing elements are arranged in a regular grid, and wherein the routing information in the packet specifies relative locations in first and second dimensions along the grid to a processing element that is the destination of the packet.
29. The circuit package of example 28, wherein each bidirectional photonic channels connects a pair of immediately adjacent processing elements in the grid in one of the first dimension or the second dimension, and wherein the message router of each processing element is configured to decrement a value in the routing information associated with the relative location in the first dimension when routing the packet to an immediately adjacent processing element along the first dimension and to decrement a value in the routing information associated with the relative location in the second dimension when routing the packet to an immediately adjacent processing element along the second dimension.
30. The circuit package of any of examples 26-29, wherein the plurality of bidirectional photonic channels are configured to connect the processing elements into an electro-photonic network having a grid topology defining at least two dimensions, wherein the routing information in the packet specifies coordinates in the at least two dimensions relative to a processing element that is the destination of the packet, and wherein the message router of each processing element, when routing the packet to a topologically immediately adjacent processing element along one of the at least two dimensions, modifies the routing information in the packet by decrementing a value associated with one of the at least two dimensions.
31. The circuit package of any of examples 1-30, wherein the electronic circuit is configured as an arrangement of tiles each corresponding to one of the processing elements.
32. The circuit package of example 31, wherein the tiles are rectangular tiles arranged in a rectangular grid.
33. The circuit package of example 32, wherein the plurality of bidirectional photonic channels is configured to directly connect each pair of immediately adjacent tiles in the rectangular grid to result in a quadrilateral mesh topology of the electro-photonic network.
34. The circuit package of example 33, wherein the plurality of bidirectional photonic channels is configured to further directly connect one or more pairs of non-adjacent tiles in the rectangular grid.
35. The circuit package of any of examples 33-35, further comprising bidirectional photonic channels configured to directly connect pairs of tiles on opposite edges of the rectangular grid to result in a wrapped toroidal mesh topology of the electro-photonic network.
36. The circuit package of any of examples 1-35, wherein the bidirectional photonic channels are configured to connect the processing elements into an electro-photonic network having a cubic grid topology.
37. A method comprising: at a first electronic processing element of an electro-photonic network, generating an electronic packet having a header and a payload, the header or a portion of the payload comprising routing information associated with a destination electronic processing element of the electro-photonic network; determining, based on the routing information, a path from the first electronic processing element to the destination electronic processing element via one or more intermediate electronic processing elements of the electro-photonic network, wherein the first, destination, and intermediate processing elements are connected by associated photonic channels; at the first processing element, routing the packet to a port connected via one of the photonic channels to a first intermediate processing element along the path, and transforming the packet from an electronic signal to an optical signal for transmission to the first intermediate processing element; at each of the one or more intermediate processing elements, transforming the optical signal back into an electronic signal, routing the electronic signal to a port connected via one of the photonic channels to a processing element, among the intermediate processing elements and the destination processing elements, that is next along the path, and transforming the electronic signal into an optical signal for transmission to the processing element that is next along the path; and at the destination processing element, transforming the optical signal back into an electronic signal.

38. The method of example 37, wherein transforming each electronic signal into an optical signal comprises operating a modulator driver of the respective electronic processing element to cause an associated modulator of the photonic channel to modulate the optical signal in accordance with the packet, and wherein transforming the optical signal back into an electronic signal comprises measuring the optical signal by a photodetector of the photonic channel.

39. The method of example 37 or example 38, wherein each of the first, intermediate, and destination electronic processing elements comprises a router, and wherein the path through the electro-photonic network is determined collectively by the routers of the first, intermediate, and destination electronic processing elements.

40. The method of example 39, wherein the routing information specifies the destination in terms of relative locations in first and second dimensions to the destination electronic processing element, the method further comprising, responsive to transmission of the packet from any of the first or intermediate electronic processing elements to the next electronic processing element along the path, modifying the routing information in the packet.

41. The method of example 39 or example 40, wherein the routers of the first, intermediate, and destination electronic processing elements each comprise a local port and ports associated with multiple photonic channels connecting the respective electronic processing element to multiple other electronic processing elements within the electro-photonic network, wherein the routers of the first and the intermediate electronic processing elements each direct the packet to the port associated with the photonic channel connected to the electronic processing element that is next along the path, and wherein the router of the destination electronic processing element directs the packet to its local port.

42. A system comprising: a first circuit package and a second circuit package each comprising an electronic integrated circuit (EIC) comprising a plurality of processing elements and a plurality of message routers capable of transmitting and receiving a message, and a plurality of intra-chip bidirectional photonic channels connecting the message routers into an intra-chip electro-photonic network that can operate on the message; and a plurality of inter-chip bidirectional photonic channels connecting the message routers of the first and the second circuit packages into an inter-chip electro-photonic network that can transmit the message from an EIC in the first circuit package to an EIC in the second circuit package.

43. The system of example 42, wherein each circuit package includes an electronic circuit layer in which the EIC is implemented and a photonic circuit layer in which the intra-chip bidirectional photonic channels are implemented.

44. The system of example 43, wherein each circuit package includes a first semiconductor chip implementing the electronic circuit layer and a second semiconductor chip implementing the photonic circuit layer.

45. The system of any of examples 42-44, wherein the plurality of intra-chip bidirectional photonic channels of each of the circuit packages are implemented using optical waveguides in a photonic integrated circuit (PIC) of the circuit package.

46. The system of any of examples 42-45, wherein the intra-chip bidirectional photonic channels each comprise one or more photonic links in each direction, each photonic link comprising, in the PIC, an optical modulator at an input end of the photonic link, a photodetector at an output end of the photonic link, and an optical waveguide connecting the optical modulator to the photodetector.

47. The system of example 46, wherein the message routers include photonic-circuit interfaces each for interfacing with one of the bidirectional photonic channels, each photonic-circuit interface comprising a modulator driver for each photonic link with which it interfaces at the input end of the photonic link and a transimpedance amplifier for each photonic link with which it interfaces at the output end of the photonic link.

48. The system of example 46 or example 47, wherein the plurality of inter-chip bidirectional photonic channels are implemented with optical fiber.

49. The system of example 48, wherein the first and second circuit packages each include one or more optical coupling structures for coupling the electro-photonic network of the first circuit package via the optical fiber to the electro-photonic network of the second circuit package.

50. The system of example 49, wherein the optical couplers include edge couplers in the PICS.

51. The system of example 49 or example 50, wherein the optical coupling structures include fiber attach units (FAUs) located over grating couplers in the PICs.

52. The system of any of examples 48-51, wherein the inter-chip bidirectional photonic channels are configured to transmit multiplexed optical signals.

53. The system of example 52, wherein the inter-chip bidirectional photonic channels each comprise directional photonic channels in each direction, each directional photonic channel between a first PIC of a first circuit package and a second PIC of a second circuit package comprising: in the first PIC, multiple optical modulators to create modulated optical signals at multiple respective wavelengths, a multiplexer to combine the modulated optical signals at the multiple wavelengths into a single multiplexed optical signal, and an optical coupling structure to couple the multiplexed optical signal into the optical fiber; and in the second PIC, an optical coupling structure to couple the multiplexed optical signal from the optical fiber into the second PIC, a demultiplexer to demultiplex the multiplexed optical signal into modulated optical signals at the multiple wavelengths, and multiple respective photodetectors to measure the modulated optical signals at the multiple wavelengths.

54. The system of any of examples 42-53, further comprising at least one single-wavelength light source for supplying an optical carrier signal to modulators of the intra-chip bidirectional photonic channels, and at least one multiple-wavelength light source for supplying optical carrier signals at multiple wavelengths to groups of modulators of the inter-chip bidirectional photonic channels.

55. The system of example 54, where the at least one single-wavelength light source and the at least one multiple-wavelength light sources comprise light sources integrated into the circuit packages.

56. The system of example 54, where the at least one single-wavelength light source and the at least one multiple-wavelength light sources comprise light sources provided externally to the circuit packages and optically couple via one or more optical fibers to one or more PICs in the circuit packages.

57. The system of any of examples 42-56, further comprising a plurality of additional circuit packages having an associated EIC with a plurality of associated processing elements, the first, second, and additional circuit packages arranged in a quadrilateral grid.

58. The system of example 57, wherein each of the intra-chip and inter-chip bidirectional photonic channel connects a pair of immediately adjacent processing elements in the quadrilateral grid to result in a quadrilateral mesh topology of the inter-chip electro-photonic network.

59. The system of example 58, wherein the plurality of inter-chip bidirectional photonic channels are further configured to directly connect pairs of processing elements on opposite edges of the quadrilateral grid to form an electro-photonic network having an extensible wrapped toroidal mesh topology.

60. The system of any of examples 42-59, wherein the message routers are configured to route the messages through the inter-chip and the intra-chip electro-photonic network, wherein when the message is sent from a first processing element to a second processing element that is not directly connected with the first processing element via a bidirectional photonic channel, the electronic is routed to the second processing element along a path through one or more third processing elements, wherein the message is at each of the third processing elements converted from the optical domain to the electronic domain and back into the optical domain at a message router associated with the respective third processing element.

61. The system of example 60, wherein the message routers are configured to determine a path through the electro-photonic network for each message based in part on a portion of the message associated with routing information.

62. A processing device implementing an artificial neural network (ANN) comprising a plurality of neural nodes having associated sets of weights, the processing device comprising: an electro-photonic network comprising a plurality of electronic processing elements connected by bidirectional photonic channels, each processing element comprising one or more processing engines, memory communicatively coupled to the one or more processing engines, and a message router interfacing with two or more of the bidirectional photonic channels and communicatively coupled to the memory, wherein: each neural node of the ANN is implemented by one or more of the processing elements; the set of weights associated with each neural node is stored in the memory of the one or more processing elements implementing that neural node; the message routers are configured, based on a predetermined flow of activations between the neural nodes, to stream a plurality of activations between the processing elements implementing the respective neural nodes during execution of the ANN; and the one or more processing engines within each processing element are configured to perform, for each neural node implemented by the processing element, computations on the associated set of weights stored in the memory of the processing element and input activations to that node streamed to the processing element to generate an output activation for the node during the execution of the ANN.

63. The processing device of example 62, wherein each processing element implements one or more of the neural nodes.

64. The processing device of example 62 or example 63, wherein at least one of the neural nodes is implemented by multiple of the processing elements jointly.

65. The processing device of any of examples 62-64, wherein activations between neural nodes implemented by the same processing element are exchanged via the memory of the processing element, and wherein activations between neural nodes implemented by different processing elements are exchanged via associated ones of the bidirectional photonic channels.

66. The processing device of any of examples 62-65, wherein the one or more processing engines comprise a dot product engine implementing a combinatorial tree of multipliers and adders configured to perform multiply-accumulate (MAC) operations.

67. The processing device of example 66, wherein the one or more processing engines further comprise a tensor engine configured to compute non-linear activations.

68. The processing device of any of examples 62-67, wherein the plurality of electronic processing elements is implemented on one or more electronic integrated circuits (EICs) each comprising multiple of the electronic processing elements, and wherein the bidirectional photonic channels connecting the electronic processing elements with each EIC are implemented as optical waveguides in an associated photonic integrated circuit (PIC) stacked with the EIC.

69. The processing device of example 68, wherein each EIC and its associated PIC are packaged together as a system-in-package (SIP).

70. The processing device of example 68 or example 69, wherein the plurality of electronic processing elements are implemented on multiple EICs, and wherein the bidirectional photonic channels connecting electronic processing elements on different ones of the multiple EICs are implemented with optical fiber.

71. The processing device of any of examples 68-70, wherein the plurality of electronic processing elements are arranged in a quadrilateral grid, and wherein the bidirectional photonic channels are collectively configured to connect pairs of immediately adjacent processing elements in the grid to result in a quadrilateral mesh topology of the electro-photonic network.

72. A method of implementing an artificial neural network (ANN) comprising a plurality of neural nodes with associated predetermined weights, the method comprising: connecting to an electro-photonic network comprising a plurality of processing elements connected by bidirectional photonic channels, each processing element comprising one or more processing engines, memory communicatively coupled to the one or more processing engines, and a message router including two or more photonic-channel interfaces and a communicative coupling to the memory; loading prior to runtime, based on an assignment between the neural nodes and the processing elements, the predetermined weights associated with each neural node into the memory of one or more processing elements assigned to implement the neural node; using the message routers at runtime, based on the assignments and on a predetermined flow of activations between the neural nodes within the ANN, to route the activations between the neural nodes implemented by the processing elements, wherein activations routed between nodes implemented by different source and destination elements among the processing elements are transformed, at the source element and at any intermediate processing element along a path from the source element to the destination element, from an electrical form to an optical form for transmission via the bidirectional photonic channels, and are transformed, at the destination element and any intermediate processing elements along the path, from an optical form to an electrical form.

73. The method of example 72, wherein the weights are loaded from memory external to the electro-photonic network into the memory of the processing elements via a PCIE interface.

74. The method of example 72 or 73, wherein activations between neural nodes implemented by a shared processing element are transferred electronically within the processing element.

75. The method of any of examples 72-74, wherein the assignment between the neural nodes and the processing elements is determined at compile time.

76. The method of any of examples 72-75, further comprising operating the electro-photonic network to: stream activations between the processing elements in accordance with routing decisions made by the configured routers; and, for each node, perform computations on the associated weights and input activations streamed to the node using the one or more processing engines of the one or more processing elements assigned to implement the node.

77. The method of any of examples 72-76, further comprising selectively activating photonic links within the bidirectional optical channels based on the flow of activations for reduced power consumption.

78. The method of example 77, wherein each bidirectional photonic channel comprises multiple photonic links, and wherein one of the links in each channel is kept active to serve as a master link.

79. The method of any of examples 72-78, wherein each bidirectional photonic channel comprises multiple photonic links in each direction, the method further comprising, during initialization of the electro-photonic network, establishing logical channels over at least some of the bidirectional photonic channels, wherein establishing a logical channel over a bidirectional photonic channel comprises bonding photonic links in each direction within that bidirectional photonic channel together to form a bonding group of links.

80. The method of example 79, wherein photonic links that are nonfunctioning are omitted from the bonding groups.

81. The method of example 79 or example 80, wherein a number of photonic links in the bonding group is determined based on bandwidth requirements associated with implementing the ANN.

82. A hardware circuit comprising: a combinatorial tree having a plurality of rows and a plurality of columns, the combinatorial tree using a plurality of hardware units to generate one or more dot product values based on input values received at a first column the combinatorial tree; a first memory device for storing the input values; a sequencer configured to obtain the input values from the first memory device and reorganize the input values in a switch fabric; a clock configured to control a time for when a portion of the reorganized input values is provided to the first column of the combinatorial tree from the switch fabric; and a plurality of hardware units where each hardware unit comprises an accumulator configured to accumulate the one or more dot product values, wherein during one or more subsequent time periods defined by the clock, additional portions of the reorganized input values are provided to accumulators of hardware units associated with the first column, and wherein during one or more additional time periods controlled by the clock, a value associated with each of the accumulators of the hardware units in the first column is written to the first memory device.

83. The hardware circuit of example 82, wherein the hardware units comprise at least one fused multiple-accumulate (FMA) unit.

84. The hardware circuit of any of examples 82-84, wherein the combinatorial tree comprises an array of dot product units configured to receive the input values, and to generate the one or more dot product values based on the input values as received by the first column, a single dot product unit of the array comprising two or more of the hardware units.

85. The hardware circuit of example 84, further comprising a control circuit, the array of dot product units comprising data paths, the control circuit being configured to use the data paths to cause at least two weight values to swap between two neighboring columns of the array or to propagate a weight value from a first row of the array to a second row of the array.

86. The hardware circuit of any of examples 82-85, wherein the sequencer includes the switch fabric that operatively couples the combinatorial tree to the first memory device.

87. The hardware circuit of any of examples 82-86, wherein the sequencer determines a sequence of input vectors provided to the first column based on a set of parameters, the set of parameters comprising at least one of a stride value, a dilation value, or a kernel size value.

88. The hardware circuit of any of examples 82-87, wherein the sequencer is configured to generate an individual input vector of the sequence of input vectors by reading a plurality of weight values and a plurality of operand values read from the first memory device during one or more clock cycles, the individual input vector comprising the plurality of the weight values and the plurality of the operand values.

89. The hardware circuit of example 88, wherein the first memory device comprises memory banks, and wherein the plurality of weight values and the plurality of operand values read by the sequencer during the one or more clock cycles are selected for the reading such that: the plurality of weight values and the plurality of operand values are permuted by the sequencer in the switch fabric after receipt from the memory bank, and each of the weight values and the operand valued are read by the sequencer in a single pass.

90. The hardware circuit of example 88, wherein the first memory devices comprise memory banks, and wherein the plurality of weight values and the plurality of operand values read by the sequencer during one or more clock cycles are selected for the reading such that: the plurality of weight values and the plurality of operand values are permuted by the sequencer in the switch fabric after receipt from the memory bank, and each of the weight values and the operand values are read by the sequencer in a single pass; and data is read from each of the memory banks, wherein a number of rows of the memory banks is substantially equivalent to a number of rows in the first column of the combinatorial tree.

91. The hardware circuit of example 88, wherein each successive read of the first memory device, by the sequencer, results in reading of new weight values and new operand values from the first memory device not read by the sequencer during a previous clock cycle.

92. The hardware circuit of any of examples 82-91, wherein a single hardware unit is operatively coupled to at least two adjacent hardware units such that an output value generated by the single hardware unit is shared as an input value to each of the at least two adjacent hardware units.

93. The hardware circuit of any of examples 82-92, wherein the accumulator comprises a plurality of accumulators configured to accumulate partial dot product values generated by a single hardware unit as values flow through the single hardware unit.

94. The hardware circuit of any of examples 82-93, wherein the combinatorial tree comprises registers associated with the hardware units configured to maintain clock alignment of values flowing through the hardware units.

95. The hardware circuit of any of examples 82-94, comprising logic that is configured to generate a set of final dot product values for the input values after all of a sequence of input vectors have been inputted to the combinatorial tree, the set of final dot product values being constructed from values stored in accumulators of the hardware units of the combinatorial tree.

96. The hardware circuit of example 95, wherein the logic is configured to store the set of final dot product values to the first memory device.

97. The hardware circuit of any of examples 82-96, wherein the input values comprise at least one weight value and at least one operand value.

98. The hardware circuit of any of examples 82-97, wherein the hardware circuit is part of a photonic integrated circuit (PIC).

99. A method comprising: reading, by a sequencer, a first plurality of weight values and a first plurality of operand values from a set of memory devices operatively coupled to the sequencer; receiving, at a first column of a combinatorial tree, a plurality of first input vectors from the sequencer, the first plurality of input vectors comprising the first plurality of weight values and the first plurality of operand values; processing the first plurality of input vectors by math units at the first column of the combinatorial tree, the math units being associated with each of the input vectors, each of the math units having at least one accumulator, the combinatorial tree being configured to generate a dot product value in an accumulator of each of the math unit based on values received by the math units at the first column of the combinatorial tree; reading, by the sequencer, a second plurality of weight values and a second plurality of operand values from the set of memory devices; receiving, at the first column of the combinatorial tree, a second plurality of input vectors from the sequencer, the second plurality of input vectors comprising the second plurality of weight values and the second plurality of operand values; processing the second plurality of input vectors by the math units at the first column of the combinatorial tree, the first plurality of input vectors and the second plurality of inputs vector being part of a sequence of input vectors to be received by the math units in the first column of the combinatorial tree; and after all of the sequence of input vectors has been received by the first column of the combinatorial tree and processed by associated math units, providing a set of final dot product values by retrieving a value from each accumulator in each of the math units residing in every row of the first column of the combinatorial tree.

100. The method of example 99, wherein the at least one accumulator comprises a plurality of accumulators in each of the math units, the plurality of accumulators being configured to accumulate partial dot product values generated by individual math units as values flow through the individual math units.

101. A hardware circuit comprising: an array of dot product units organized as a combinatorial tree that generates dot product values based on weight values and activation values received as input by the array of dot product units, the array of dot product units comprises 64 rows by 32 columns of dot product units, each dot product unit being configured to receive as input two 8-bit values and having an accumulator; and a switch fabric operatively coupling the array to a set of memory devices, the set of memory devices storing a plurality of weight values and a plurality of activation values, the switch fabric being configured to provide 64 input vectors as input to a first column of the array, during a first clock sequence comprising one or more clock cycles, wherein one or more additional clock sequences cause the switch fabric to provide a plurality of additional sets of 64 input vectors to the first column of the array, and wherein when each of the accumulators in the first column of the array has 32 bits, writing each value from each accumulator back into the set of memory devices.

102. The hardware circuit of example 101, wherein the dot product units comprise a plurality of FMA units.

103. The hardware circuit of example 101 or example 102, wherein the dot product units are configured to receive a 32-byte input.

104. The hardware circuit of any of examples 101-103, wherein the set of memory devices comprises 64 banks of 32-byte wide memory devices.

105. A circuit package comprising: an application-specific integrated circuit (ASIC) comprising a plurality of processing elements that include photonic-channel interfaces; and a plurality of photonic channels connecting the plurality of processing elements via the photonic-channel interfaces to form at least part of an electro-photonic network, a sub-plurality of the plurality of photonic channels being connected to an individual processing element of the plurality of processing elements, the individual processing element being configured to: select, for the individual processing element, a master photonic channel from the sub-plurality of photonic channels; select, for the individual processing element, a set of slave photonic channels from the sub-plurality of photonic channels; extract a received clock signal from the master photonic channel; generate, based on the received clock signal, a local clock signal used by the individual processing element to perform one or more local operations on the individual processing element; and transmit, over the set of slave photonic channels, a distributed clock signal to a set of the plurality of processing elements connected to the individual processing element, the transmitting the distributed clock signal comprising transforming the distributed clock signal from an electrical form to an optical form using the photonic-channel interface of the individual processing element, the transmitting the distributed clock signal further comprising transforming the distributed clock signal from the optical form to the electrical form at the set of the plurality of processing elements, the distributed clock signal being suitable for transmission across the set of slave photonic channels and for use as associated local clock signals by the set of the plurality of processing elements, the distributed clock signal being generated based on the received clock signal.

106. The circuit package of example 105, wherein the individual processing element comprises a jitter-attenuating phase-lock loop (PLL), wherein the individual processing element uses the jitter-attenuating PLL to generate a low jitter clock signal based on the received clock signal, and wherein the generating of the local clock signal based on the received clock signal comprises generating the local clock signal based on the low jitter clock signal.

107. The circuit package of example 105 or 106, wherein the individual processing element selects the master photonic channel during boot time of the individual processing element.

108. The circuit package of any of examples 105-107, wherein the individual processing element selects the set of slave photonic channels during boot time of the individual processing element.

109. The circuit package of any of examples 105-108, wherein the individual processing element is configured to: perform a channel alignment operation on the master photonic channel, the channel alignment operation being configured to adjust one or more settings of the individual processing element to compensate for clock skew.

110. The circuit package of any of examples 105-109, wherein the individual processing element extracts the received clock signal from the master photonic channel by performing clock data recovery on an incoming bit stream received over the master photonic channel.

111. The circuit package of any of examples 105-110, wherein the individual processing element transmits the distributed clock signal to the set of processing elements by transmitting one or more outgoing bit streams to the set of processing elements, the one or more outgoing bit streams being generated based on the distributed clock signal.

112. The circuit package of any of examples 105-111, wherein the individual processing element comprises a tensor processor and a DNN, wherein each of the tensor processor and the DNN is configured to operate based on the local clock signal, and wherein a packet is capable of being transferred between the DNN and the tensor processor using the local clock signal.

113. The circuit package of any of examples 105-112, wherein the individual processing element comprises a message router that includes the photonic-channel interface, the message router being configured to operate based on the local clock signal.

114. The circuit package of any of examples 105-113, wherein the individual processing element comprises a hardware circuit for computing one or more dot products between at least two vectors, the hardware circuit being configured to operate based on the local clock signal.

115. The circuit package of any of examples 105-114, wherein the individual processing element is a first processing element, the sub-plurality of photonic channels is a first sub-plurality of photonic channels, the master photonic channel is a first master photonic channel, the set of slave photonic channels is a first set of slave photonic channels, the received clock signal is a first received clock signal, the local clock signal is a first local clock signal, and the distributed clock signal is a first distributed clock signal; and wherein a second sub-plurality of the plurality of photonic channels being connected to a second processing element, the second processing element being included in the set of processing elements connected to the first processing element, the second sub-plurality of the plurality of photonic channels including an individual photonic channel of the set of slave photonic channels that connects the first processing element to the second processing element, the second processing element being configured to: select, for the second processing element, a second master photonic channel from the individual photonic channel; select, for the second processing element, a second set of slave photonic channels from the second sub-plurality of photonic channels; extract a second received clock signal from the second master photonic channel; generate, based on the second received clock signal, a second local clock signal used by the second processing element to perform one or more local operations on the second processing element; and transmit, over the second set of slave photonic channels, a second distributed clock signal to a second set of the plurality of processing elements connected to the second processing element, the transmitting the second distributed clock signal comprising transforming the second distributed clock signal from the electrical form to the optical form using the photonic-channel interface of the individual processing element, the transmitting the second distributed clock signal further comprising transforming the second distributed clock signal from the optical form to the electrical form at the second set of the plurality of processing elements, the second distributed clock signal being suitable for transmission across the second set of slave photonic channels and for use as associated local clock signals by the second set of the plurality of processing elements, the second distributed clock signal being generated based on the second received clock signal.

116. The circuit package of example 115, wherein the first processing element comprises a first set of components, the second processing element comprises a second set of components, the first set of components comprising at least one of a first tensor processor, a first message router that includes a photonic-channel interface, or a first hardware circuit for computing one or more first dot products between at least two vectors, the second set of components comprising at least one of a second tensor processor, a second message router that includes a photonic-channel interface, or a second hardware circuit for computing one or more second dot products between at least two vectors, the first set of components being configured to operate based on the first local clock signal, and the second set of components being configured to operate based on the second local clock signal.

117. A method comprising: selecting, by an individual processing element of a plurality of processing elements, a master photonic channel from a plurality of photonic channels, the master photonic channel being selected for the individual processing element, the plurality of processing elements being part of an application-specific integrated circuit (ASIC) of a circuit package, the plurality of processing elements being connected together by a plurality of photonic channels to form at least part of an electro-photonic network within the circuit package; selecting, by the individual processing element, a set of slave photonic channels from the plurality of photonic channels, the set of slave photonic channels being selected for the individual processing element; extracting, by the individual processing element, a received clock signal from the master photonic channel in a digital format; based on the received clock signal in the digital format, generating, by the individual processing element, a local clock signal used by the individual processing element to perform one or more local operations on the individual processing element using a digital portion of the ASIC; and transmitting, by the individual processing element and over the set of slave photonic channels, a distributed clock signal to a set of the plurality of processing elements connected to the individual processing element, the distributed clock signal being generated based on the received clock signal in the digital format, the transmitting comprising: transforming the distributed clock signal from a digital format to an optical format; routing the distributed clock signal in the optical format across the set of slave photonic channels; receiving the distributed clock signal in the optical format at photonic interfaces of the set of the plurality of processing elements; and transforming the distributed clock signal to the digital format in the set of the plurality of processing elements using associated photonic channel interfaces.

118. The method of example 117, wherein the individual processing element comprises a jitter-attenuating phase-lock loop (PLL), wherein the individual processing element uses the jitter-attenuating PLL to generate a low jitter clock signal based on the received clock signal, and wherein the generating of the local clock signal based on the received clock signal comprises generating the local clock signal based on the low jitter clock signal.

119. The method of example 117 or example 118, wherein the selecting of the master photonic channel is performed during boot time of the individual processing element.

120. The method of any of examples 117-119, wherein the selecting of the set of slave photonic channels during boot time of the individual processing element.

121. The method of any of examples 117-120, comprising: performing, by the individual processing element, a channel alignment operation on the master photonic channel, the channel alignment operation being configured to adjust one or more settings of the individual processing element to compensate for clock skew.

122. The method of any of examples 117-121, wherein the extracting of the received clock signal from the master photonic channel comprises performing clock data recovery on an incoming bit stream received over the master photonic channel.

123. The method of any of examples 117-122, wherein the transmitting of the distributed clock signal to the set of processing elements comprises transmitting one or more outgoing bit streams to the set of processing elements, the one or more outgoing bit streams being generated based on the distributed clock signal.

124. The method of any of examples 117-123, wherein the individual processing element comprises a set of components, the set of components comprising at least one of a tensor processor, a message router that includes photonic-channel interfaces, or a hardware circuit for computing a dot product between at least two vectors, the set of components being configured to operate based on the local clock signal.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A circuit package comprising:
  a circuit including a plurality of processing elements that include photonic-channel interfaces; and
  a plurality of photonic channels connecting the plurality of processing elements via the photonic-channel interfaces to form at least part of an electro-photonic network, a sub-plurality of the plurality of photonic channels being connected to an individual processing element of the plurality of processing elements, the individual processing element being configured to:
  select, for the individual processing element, a master photonic channel from the sub-plurality of photonic channels;
  select, for the individual processing element, a set of slave photonic channels from the sub-plurality of photonic channels;
  extract a received clock signal from the master photonic channel;
  generate, based on the received clock signal, a local clock signal used by the individual processing element to perform one or more local operations on the individual processing element; and
  transmit, over the set of slave photonic channels, a distributed clock signal to a set of the plurality of processing elements connected to the individual processing element, the transmitting the distributed clock signal comprising transforming the distributed clock signal from an electrical form to an optical form using the photonic-channel interface of the individual processing element, the transmitting the distributed clock signal further comprising transforming the distributed clock signal from the optical form to the electrical form at the set of the plurality of processing elements, the distributed clock signal being suitable for transmission across the set of slave photonic channels and for use as associated local clock signals by the set of the plurality of processing elements, the distributed clock signal being generated based on the received clock signal.

2. The circuit package of claim 1, wherein the individual processing element comprises a jitter-attenuating phase-lock loop (PLL), wherein the individual processing element uses the jitter-attenuating PLL to generate a low jitter clock signal based on the received clock signal, and wherein the generating of the local clock signal based on the received clock signal comprises generating the local clock signal based on the low jitter clock signal.

3. The circuit package of claim 1, wherein the individual processing element selects the master photonic channel during boot time of the individual processing element.

4. The circuit package of claim 1, wherein the individual processing element selects the set of slave photonic channels during boot time of the individual processing element.

5. The circuit package of claim 1, wherein the individual processing element is configured to:
perform a channel alignment operation on the master photonic channel, the channel alignment operation being configured to adjust one or more settings of the individual processing element to compensate for clock skew.

6. The circuit package of claim 1, wherein the individual processing element extracts the received clock signal from the master photonic channel by performing clock data recovery on an incoming bit stream received over the master photonic channel.

7. The circuit package of claim 1, wherein the individual processing element transmits the distributed clock signal to the set of processing elements by transmitting one or more outgoing bit streams to the set of processing elements, the one or more outgoing bit streams being generated based on the distributed clock signal.

8. The circuit package of claim 1, wherein the individual processing element comprises a tensor processor and a DNN, wherein each of the tensor processor and the DNN is configured to operate based on the local clock signal, and wherein a packet is capable of being transferred between the DNN and the tensor processor using the local clock signal.

9. The circuit package of claim 1, wherein the individual processing element comprises a message router that includes the photonic-channel interface, the message router being configured to operate based on the local clock signal.

10. The circuit package of claim 1, wherein the individual processing element comprises a hardware circuit for computing one or more dot products between at least two vectors, the hardware circuit being configured to operate based on the local clock signal.

11. The circuit package of claim 1,
wherein the individual processing element is a first processing element, the sub-plurality of photonic channels is a first sub-plurality of photonic channels, the master photonic channel is a first master photonic channel, the set of slave photonic channels is a first set of slave photonic channels, the received clock signal is a first received clock signal, the local clock signal is a first local clock signal, and the distributed clock signal is a first distributed clock signal; and
wherein a second sub-plurality of the plurality of photonic channels being connected to a second processing element, the second processing element being included in the set of processing elements connected to the first processing element, the second sub-plurality of the plurality of photonic channels including an individual photonic channel of the set of slave photonic channels that connects the first processing element to the second processing element, the second processing element being configured to:
select, for the second processing element, a second master photonic channel from the individual photonic channel;
select, for the second processing element, a second set of slave photonic channels from the second sub-plurality of photonic channels;
extract a second received clock signal from the second master photonic channel;
generate, based on the second received clock signal, a second local clock signal used by the second processing element to perform one or more local operations on the second processing element; and
transmit, over the second set of slave photonic channels, a second distributed clock signal to a second set of the plurality of processing elements connected to the second processing element, the transmitting the second distributed clock signal comprising transforming the second distributed clock signal from the electrical form to the optical form using the photonic-channel interface of the individual processing element, the transmitting the second distributed clock signal further comprising transforming the second distributed clock signal from the optical form to the electrical form at the second set of the plurality of processing elements, the second distributed clock signal being suitable for transmission across the second set of slave photonic channels and for use as associated local clock signals by the second set of the plurality of processing elements, the second distributed clock signal being generated based on the second received clock signal.

12. The circuit package of claim 11, wherein the first processing element comprises a first set of components, the second processing element comprises a second set of components, the first set of components comprising at least one of a first tensor processor, a first message router that includes a photonic-channel interface, or a first hardware circuit for computing one or more first dot products between at least two vectors, the second set of components comprising at least one of a second tensor processor, a second message router that includes a photonic-channel interface, or a second hardware circuit for computing one or more second dot products between at least two vectors, the first set of components being configured to operate based on the first local clock signal, and the second set of components being configured to operate based on the second local clock signal.

13. A method comprising:
selecting, by an individual processing element of a plurality of processing elements, a master photonic channel from a plurality of photonic channels, the master photonic channel being selected for the individual processing element, the plurality of processing elements being part of a circuit of a circuit package, the plurality of processing elements being connected together by a plurality of photonic channels to form at least part of an electro-photonic network within the circuit package;

selecting, by the individual processing element, a set of slave photonic channels from the plurality of photonic channels, the set of slave photonic channels being selected for the individual processing element;

extracting, by the individual processing element, a received clock signal from the master photonic channel in a digital format;

based on the received clock signal in the digital format, generating, by the individual processing element, a local clock signal used by the individual processing element to perform one or more local operations on the individual processing element using a digital portion of the circuit; and transmitting, by the individual processing element and over the set of slave photonic channels, a distributed clock signal to a set of the plurality of processing elements connected to the individual processing element, the distributed clock signal being generated based on the received clock signal in the digital format, the transmitting comprising:

transforming the distributed clock signal from a digital format to an optical format;

routing the distributed clock signal in the optical format across the set of slave photonic channels;

receiving the distributed clock signal in the optical format at photonic interfaces of the set of the plurality of processing elements; and transforming the distributed clock signal to the digital format in the set of the plurality of processing elements using associated photonic channel interfaces.

14. The method of claim 13, wherein the individual processing element comprises a jitter-attenuating phase-lock loop (PLL), wherein the individual processing element uses the jitter-attenuating PLL to generate a low jitter clock signal based on the received clock signal, and wherein the generating of the local clock signal based on the received clock signal comprises generating the local clock signal based on the low jitter clock signal.

15. The method of claim 13, wherein the selecting of the master photonic channel is performed during boot time of the individual processing element.

16. The method of claim 13, wherein the selecting of the set of slave photonic channels during boot time of the individual processing element.

17. The method of claim 13, comprising:

performing, by the individual processing element, a channel alignment operation on the master photonic channel, the channel alignment operation being configured to adjust one or more settings of the individual processing element to compensate for clock skew.

18. The method of claim 13, wherein the extracting of the received clock signal from the master photonic channel comprises performing clock data recovery on an incoming bit stream received over the master photonic channel.

19. The method of claim 13, wherein the transmitting of the distributed clock signal to the set of processing elements comprises transmitting one or more outgoing bit streams to the set of processing elements, the one or more outgoing bit streams being generated based on the distributed clock signal.

20. The method of claim 13, wherein the individual processing element comprises a set of components, the set of components comprising at least one of a tensor processor, a message router that includes photonic-channel interfaces, or a hardware circuit for computing a dot product between at least two vectors, the set of components being configured to operate based on the local clock signal.

* * * * *